United States Patent [19]

Wagner

[11] Patent Number: 4,989,073
[45] Date of Patent: Jan. 29, 1991

[54] SYSTEM FOR COMPENSATING TIMING ERRORS DURING SAMPLING OF SIGNALS

[75] Inventor: Steven D. Wagner, Belmont, Calif.

[73] Assignee: Ampex Corporation, Redwood City, Calif.

[21] Appl. No.: 291,331

[22] Filed: Dec. 28, 1988

Related U.S. Application Data

[63] Continuation of Ser. No. 125,508, Nov. 25, 1987, abandoned.

[51] Int. Cl.[5] .............................................. H04N 9/89
[52] U.S. Cl. ..................................... 358/19; 358/320; 358/326
[58] Field of Search .................. 358/19, 320, 326, 13, 358/17

[56] References Cited

U.S. PATENT DOCUMENTS

| | | |
|---|---|---|
| 4,053,926 | 10/1977 | Lemoine et al. |
| 4,054,903 | 10/1977 | Ninomiya ........................... 358/19 |
| 4,069,499 | 1/1978 | Ninomiya et al. |
| 4,122,487 | 10/1978 | Beaulieu et al. ..................... 358/13 |
| 4,165,524 | 8/1979 | Ninomiya et al. |
| 4,212,027 | 7/1980 | Lemoine et al. ..................... 358/17 |
| 4,214,262 | 7/1980 | Mizukami ............................. 358/19 |
| 4,255,759 | 3/1981 | Ohmori et al. ....................... 358/19 |
| 4,291,322 | 9/1981 | Kato et al. ............................ 358/19 |
| 4,393,413 | 7/1983 | Kaneko .................................. 358/19 |
| 4,404,583 | 9/1983 | Tatami .................................. 358/19 |
| 4,527,145 | 7/1985 | Haussmann et al. ................ 358/19 |
| 4,612,568 | 9/1986 | Hollander et al. ................... 358/19 |
| 4,635,097 | 1/1987 | Tatami .................................. 358/19 |
| 4,675,724 | 6/1987 | Wagner ................................. 358/19 |
| 4,682,209 | 7/1987 | Nillesen ................................ 358/19 |

Primary Examiner—John W. Shepperd
Attorney, Agent, or Firm—George B. Almeida

[57] ABSTRACT

At the input to a video signal time base corrector, the phase error is sampled during each burst interval and is used to control the operation of an analog-to-digital convertor to compensate for phase errors at the start of each line. Progressive phase errors are predicted during each line and compensated. Any residual phase error at the start of a line is detected and applied to a phase error compensator for eliminating the residual phase error. The residual phase error and the video signal are processed through separate signal paths, and the frequency and phase characteristics of the residual phase error path are adjusted to those of the video signal path.

25 Claims, 10 Drawing Sheets

FIG. 1 TIME BASE CORRECTOR 100

FIG. 3   FREQUENCY ACCUMULATOR 300

FIG. 5   SINE WAVE GENERATOR 500

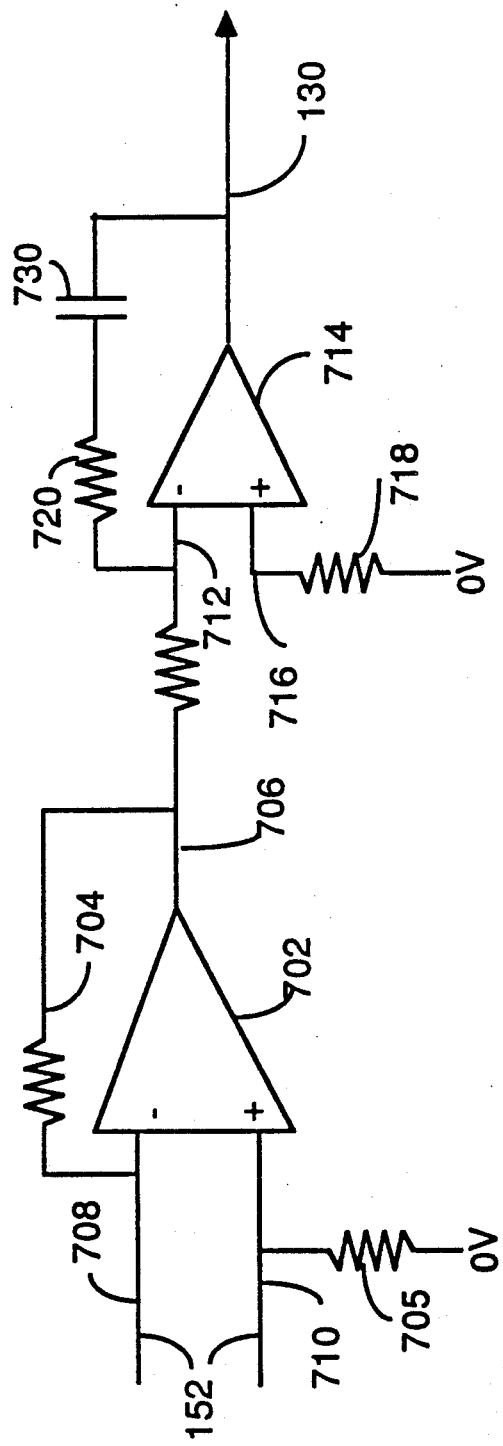
FIG. 7   FILTER 700

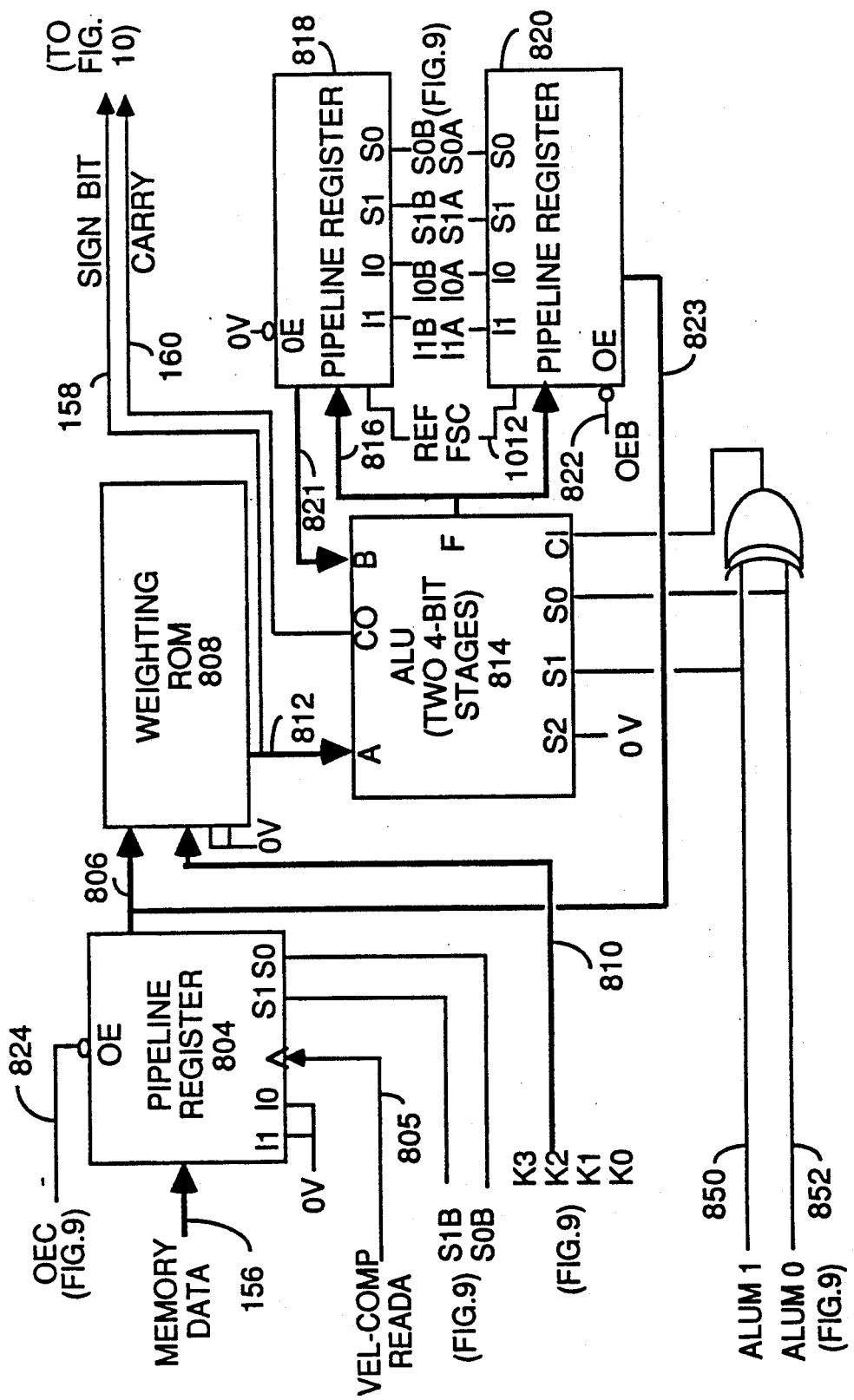

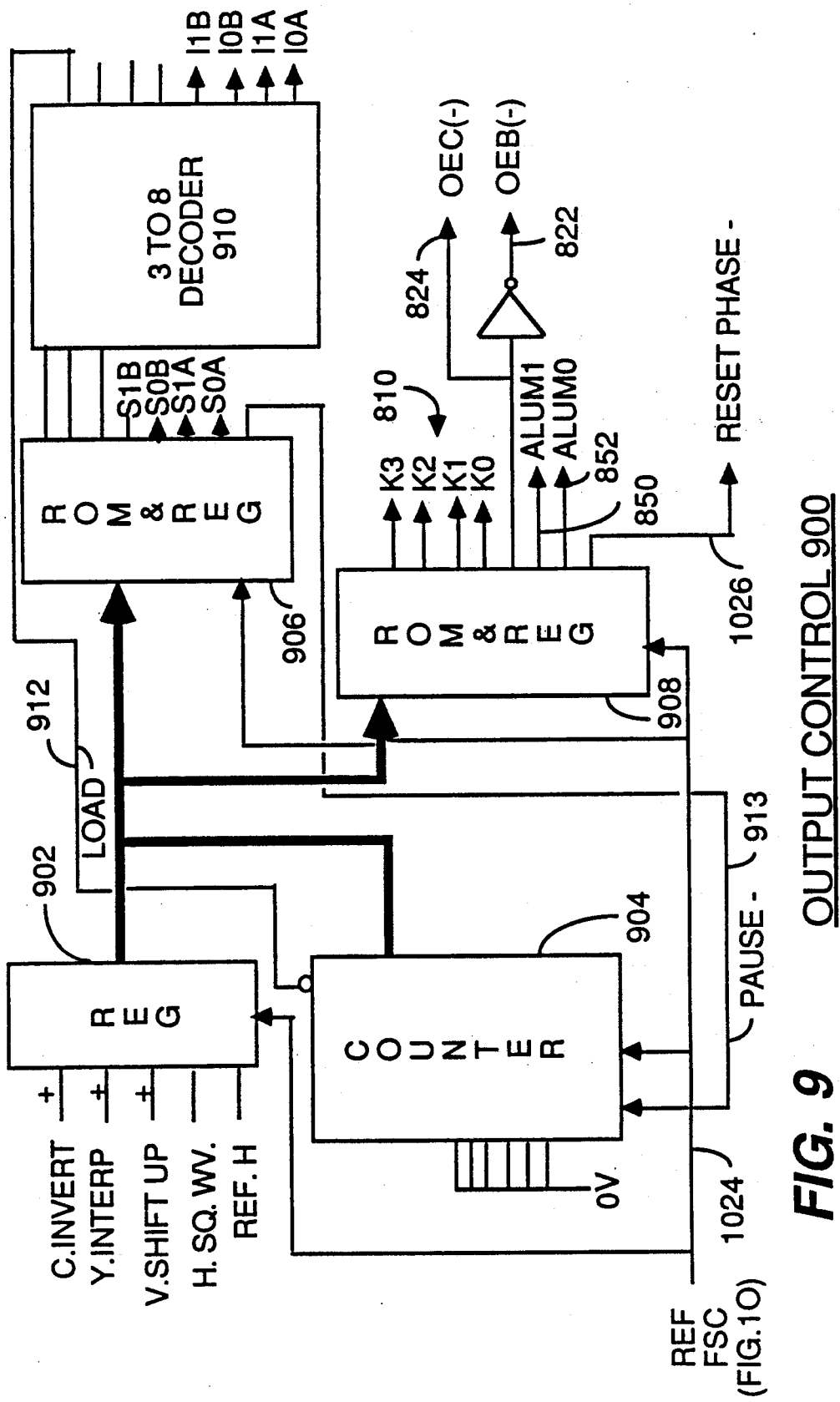
FIG. 9     OUTPUT CONTROL 900

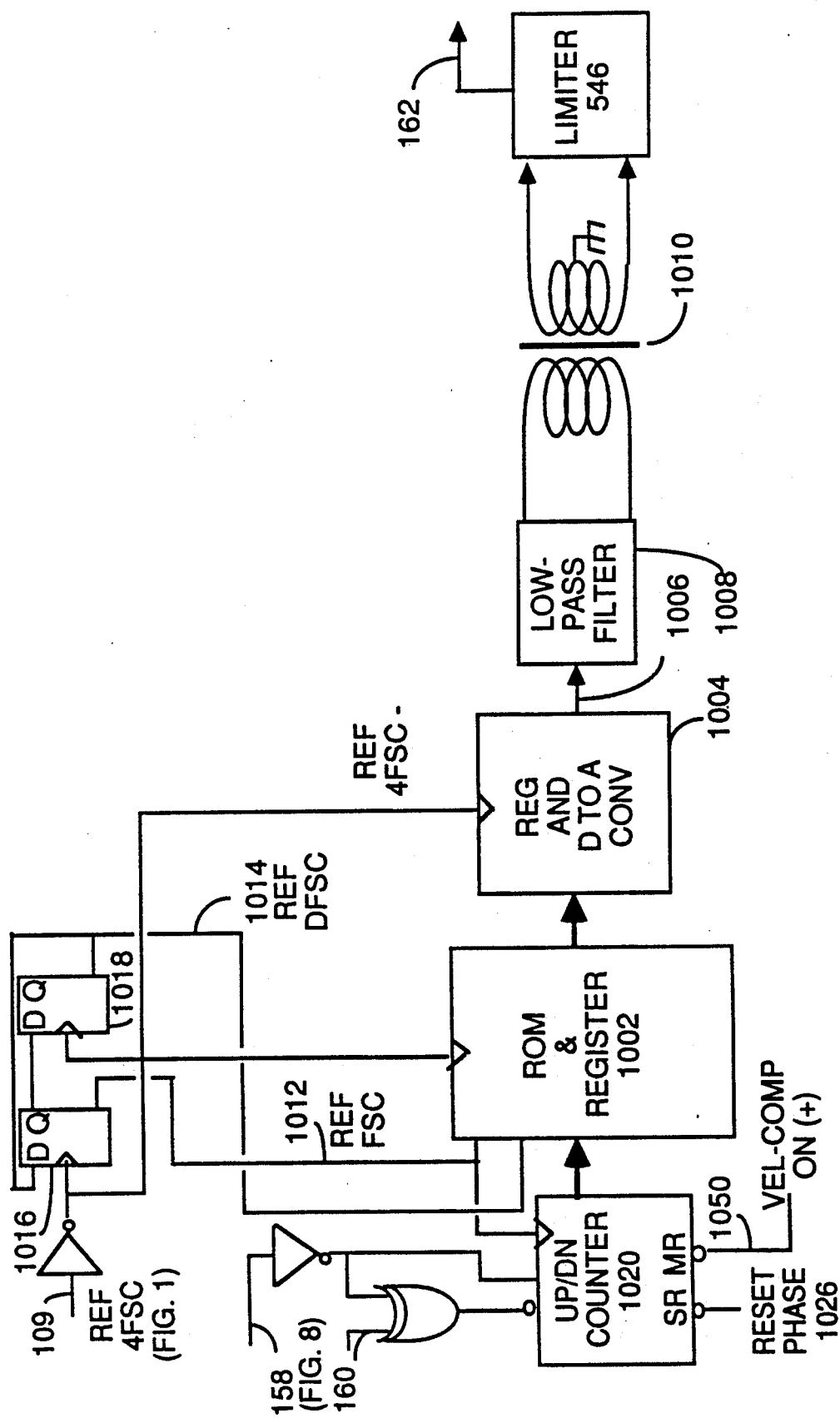

SYSTEM FOR COMPENSATING TIMING ERRORS DURING SAMPLING OF SIGNALS

This is a continuation of co-pending application Ser. No. 125,508 filed on Nov. 25, 1987 now abandoned.

The invention relates to correction of signal timing errors, and more particularly to the correction of timing errors in signals as they are sampled for conversion between analog and digital forms.

In color television recording systems it is usually necessary to correct timing errors that are caused by variation in the tape playback speed and thereby eliminate any frequency and phase errors that appear in the signal played back. To provide the desired correction, prior-art systems typically utilize a device called a "time base corrector".

Conventional time base correctors for color video signals correct timing errors by sampling an incoming, uncorrected video signal with an analog-to-digital convertor controlled by an oscillator forced by a phase-locked loop to follow the frequency of the signal's color burst and thereby correct the signal's timing errors. An example of this is described in U.S. Pat. No. 4,212,027 issued to Maurice G. Lemoine and dated July 8, 1980. The system disclosed in this patent captures digital samples of the video signal's magnitude during each color burst synchronizing component at times determined by a stable reference clock. The samples, reproduced repeatedly in synchronism with the stable reference clock, are then passed through a digital-to-analog convertor, filtered, and re-digitized to create a new timing signal (phase-shifted with respect to the stable reference clock by an amount corresponding to the timing error at burst time) that samples the video signal in perfect synchronism with the color burst at the start of each line.

The digitized video signal still contains progressive timing errors called "velocity errors". These can produce a progressive phase shift of the video information during a horizontal line. A technique that corrects velocity errors is found in the advanced video processor system marketed by the Ampex Corporation under the trademark "Zeus". In that system, the incoming analog video signal is passed through a suitable delay so that phase error measurements can be taken at both the beginning and the end of horizontal lines simultaneously prior to sampling and conversion to digital form. Logic associated with the analog-to-digital convertor then interpolates between these and previous phase error values to apply to the analog-to-digital convertor continuous phase corrections as the video signal is sampled. This system thereby corrects all objectionable timing errors, including progressive or velocity errors. However, the need to provide a delay at the input of the system makes this a relatively expensive solution to the correction of velocity errors. It would be desirable to provide a time base correction system that does not require such a delay arrangement at its input.

If not corrected at the input of the system, velocity errors usually are removed as the video is sampled a second time; for example, as the video is processed through a digital-to-analog convertor. A stable reference clock drives the digital-to-analog convertor through a phase shifter. A voltage ramp having a slope proportional to the phase drift that occurs across each line adjusts the phase of operation of the output digital-to-analog convertor gradually as each line is processed and thereby compensates for velocity errors in the line. U.S. Pat. No. 4,053,926 issued to Maurice G. Lemoine and Leonard A. Pasdera on Oct. 11, 1977 teaches how this may be done. The gradual adjustment of phase is accomplished with an analog voltage ramp generator which requires careful alignment and which may be subject to drift. (The drift in signal phase that occurs across a line will be called the "phase error value" for that line.)

The above-described approaches have practical shortcomings. The complexity of the Zeus advanced video processor has been noted. The remaining approaches need careful alignment and are subject to drift. Overall performance may depend upon the precision tracking of the phase comparator, the phase shifters, and the analog phase ramp generator.

A large amount of velocity error in the signal following its initial digitization may preclude video processing of the signal, or introduce objectionable artifacts in the signal during its processing to effect interlace or color phasing of the video. The phase error values of adjacent lines may vary by large amounts. Video signal processing undertaken to effect interlace and color phasing typically combines information from adjacent lines. If two lines vary significantly in their phase error values, video signal processing may combine information from one line with non-corresponding information from another line, and this may produce noticeable degradation of the video signal. It would be desirable to achieve a better correction of velocity errors when the signal is first sampled, thereby reducing the magnitude of the later corrections and minimizing the degradation that can be caused by video signal processing.

The need for such correction occurs when recorded video information is played back with a field sequence other than the field sequence at which it was recorded. Such playback occurs in record and reproduce apparatus arranged to create special motion effects, such as slow, still, fast and reverse motion. The playback circuitry associated with such devices capable of such playback necessarily discards some video lines, fields and frames in the case of fast and reverse motion playback, and replicates some fields and frames multiple times in the case of slow and still motion playback Frequently, this process of discarding or replicating lines, fields and frames produces a distorted video signal with incorrect interlace or color phase alignment of adjacent lines, fields and frames This misalignment can produce jitter and other undesired side effects when the video is supplied to a utilization device without further correction. It may be corrected by properly processing the video signal to correct these defects so that the video is entirely stable both in interlace and in color phase. Systems for making these corrections using digital filtering and processing circuitry applied to digitized video are well-known, and commonly found in digital time base correction systems arranged to process video signals provided by helical scan video tape recorders. Such recorders vary the velocity of tape transport to alter the field sequence to create desired special motion effects. The process of discarding or replicating lines, fields and frames to create desired special motion effects is commonly referred to as variable (tape) speed processing.

Correction of the aforementioned undesired side effects is greatly simplified if the harmful effects of progressive or velocity errors are corrected before such processing is performed. However systems capable of doing this have several disadvantages. If the digitized video is processed with the use of comb filters or other line-based filters, to compensate for interlace or color phase misalignments introduced by slow or fast rate signal playback operations, the digitized phase error value will no longer properly adjust the phase of the output digital-to-analog convertor sampling clock signal to properly correct for the phase drift within each line. As described previously, the video signal processing compensates for interlace or color phase misalignments by combining information taken from multiple lines of the video to form new video output lines. This video signal processing thereby also combines the phase errors taken from multiple lines into a new phase error on each new video output line. A single phase error on a single line at the input to the time base corrector thereby can become a series of phase errors spread over several lines at the output of the time base corrector. Conventional time base correctors are therefore unable to compensate properly for the phase errors on each line using phase error correction values at the digital-to-analog convertor when the video is so processed.

One solution to this problem involves converting the phase error values into analog voltages and passing those voltages through serially-interconnected "sample-and-hold" analog circuits at the output of the time base corrector system so that analog voltages representing several phase error values are presented all at once. By weighting and summing several of these analog voltages using weighting resistors, a new analog voltage is obtained that represents a weighted average of the phase error values corresponding to several lines. This new phase error value is then converted into a ramp voltage and used to shift the phase of the video output digital-to-analog convertor in a way that can correct for the phase drift in the new video output lines, whose phase errors are similarly attributable to the errors on several lines of video input. For small phase error values, a system of this kind can provide satisfactory time base correction. But drift is still unavoidable with so much analog signal processing, and such an arrangement still requires careful alignment. Also, if the phase errors are large, such a system can become quite complex to compensate for the interlace and color phase misalignment related errors. A system having a single fixed set of weighting resistors lacks the flexibility to provide precise compensation for whatever type of signal processing is employed, particularly when the phase error values are large, and when different signal processing strategies are employed to compensate for differing combinations of interlace and color phase error.

Accordingly, an object of the present invention is the development of a system which precisely measures and compensates for velocity errors in a highly precise manner that is stable, that requires minimal adjustment, and that is relatively immune to drift.

A further object of the present invention is to provide a time base corrector that can perform both velocity compensation and variable speed playback compensation without having to know the burst phase error preceding and following each line before the line is digitally sampled and therefore without requiring substantial delays in the video signal path prior to digitization.

Another object of the present invention is to achieve an adaptive digital time base correction system that can employ selectable phase error values to correct precisely for time base errors after the video signal is subject to signal processing that alters the errors.

Briefly described, this and other objects are achieved in a system that adjusts the phase of a clock signal used to sample a video signal to compensate for timing errors by sampling each color burst component, and deriving from the samples the phase of the sampled color burst relative to the sampling clock signal. The phase of the sampling clock signal is then adjusted to match the phase of the sampled color burst component, and this adjustment is carried out prior to the sampling of the video information that follows the sampled color burst component. The phase of the sampling clock is further adjusted in accordance with the phase of the sampled color burst components to progressively change the phase of the sampling clock signal during the sampling of the video information following each sampled color burst component.

In one embodiment of a system constructed in this fashion, a digital value is generated which indicates the precise phase error between the reference phase of an analog-to-digital convertor sampling clock, and the phase of the color burst signal, at the start of each line of video. This digital value is used to correct the phase of the oscillator which provides the sampling clock to the A to D convertor so that the A to D conversion of the video information on each line is done with no objectionable phase error at the start of each line. The phase error values are also integrated digitally to provide a progressive, in time, correction value that is used to adjust the phase of the sampling clock to reduce objectionable progressive phase drift in the sampling of the video information in the analog-to-digital convertor.

When employed in a time base corrector, the digital phase error values corresponding to each line are also saved in a memory at the same time that the corresponding video lines are stored within a memory. The stored phase error values are used to remove any objectionable residual timing errors remaining or subsequently introduced to the video signal. To this end, these precise digital phase error values are presented, multiple values at a time, to a phase error compensator. By examining (for example) two phase error values preceding a line and two phase error values following the line, and by computing a smooth curve that passes through these four values, the phase error compensator is able to determine the amount by which the phase of the sampling clock controlling the output digital-to-analog convertor must be shifted at each point along each horizontal line to produce the desired correction. The phase error compensator then corrects the phase by supplying precisely-timed pulses to a digital counter that precisely adjusts the phase of the sampling clock signal which drives the digital-to-analog convertor in accordance with its count. By generating these pulses at the right times during the presentation of each horizontal line, the compensator is able to compensate for objectionable progressive or velocity errors still present in the video signal.

A time base corrector so designed achieves accuracy and stability by precisely measuring the phase error digitally, and by then using digital phase shifters at both convertors to achieve precise phase compensation. In addition, time base compensation at the input analog-to-digital convertor provides a further reduction in the magnitude of velocity errors.

To this end, present invention also contemplates providing means for processing the phase error values (the values indicating the change in phase of the burst signal from line to line) which provides a signal transfer characteristic the same as or similar to that of the means for processing the digitized video signal from which the error values were taken. This selection of transfer characteristic results in the phase errors which remain after the analog-to-digital conversion experiencing the same or similar phase and frequency effects as the video signal as it is being processed. For example, if the net effect of the video signal processing is to sum together the corresponding values taken from several lines of video weighted in a particular way, then the digital filtering applied to the phase error values for these lines are similarly weighted and summed. This filtering alters the phase error signal to correspond to the altered phase error of the processed video signal. Likewise, if the video signal processing introduces a phase shift (a time delay or time advance) into the video, then a similar phase shift is introduced into the phase error values by assigning more weight to earlier or to later values. By arranging the digital filter circuit to provide a selectable transfer function that approximates that of the video signal processing circuitry, a precise compensation can be provided for the phase error values so that the correct velocity compensation performed by altering the phase of the video output digital-to-analog convertor is obtained regardless of how the video signal is processed. A more detailed description of the invention, together with further objects and advantages of the invention, is set forth in the drawings and in the detailed description which follows. The invention is defined with particularity in the claims annexed to and forming a part of this specification.

BRIEF DESCRIPTION OF THE DRAWINGS

For a better understanding of the invention, reference will be made to the drawings wherein:

FIG. 7 is a schematic diagram of the filter 700 which appears in FIG. 1;

FIG. 8 is a block diagram of the phase error compensation 800 shown in FIG. 1;

FIG. 9 is a block diagram of the output control 900 in FIG. 1; and

FIG. 10 is a circuit diagram of the sine wave generator 1000 shown in FIG. 1.

DESCRIPTION OF THE PREFERRED EMBODIMENTS

Figure 1:
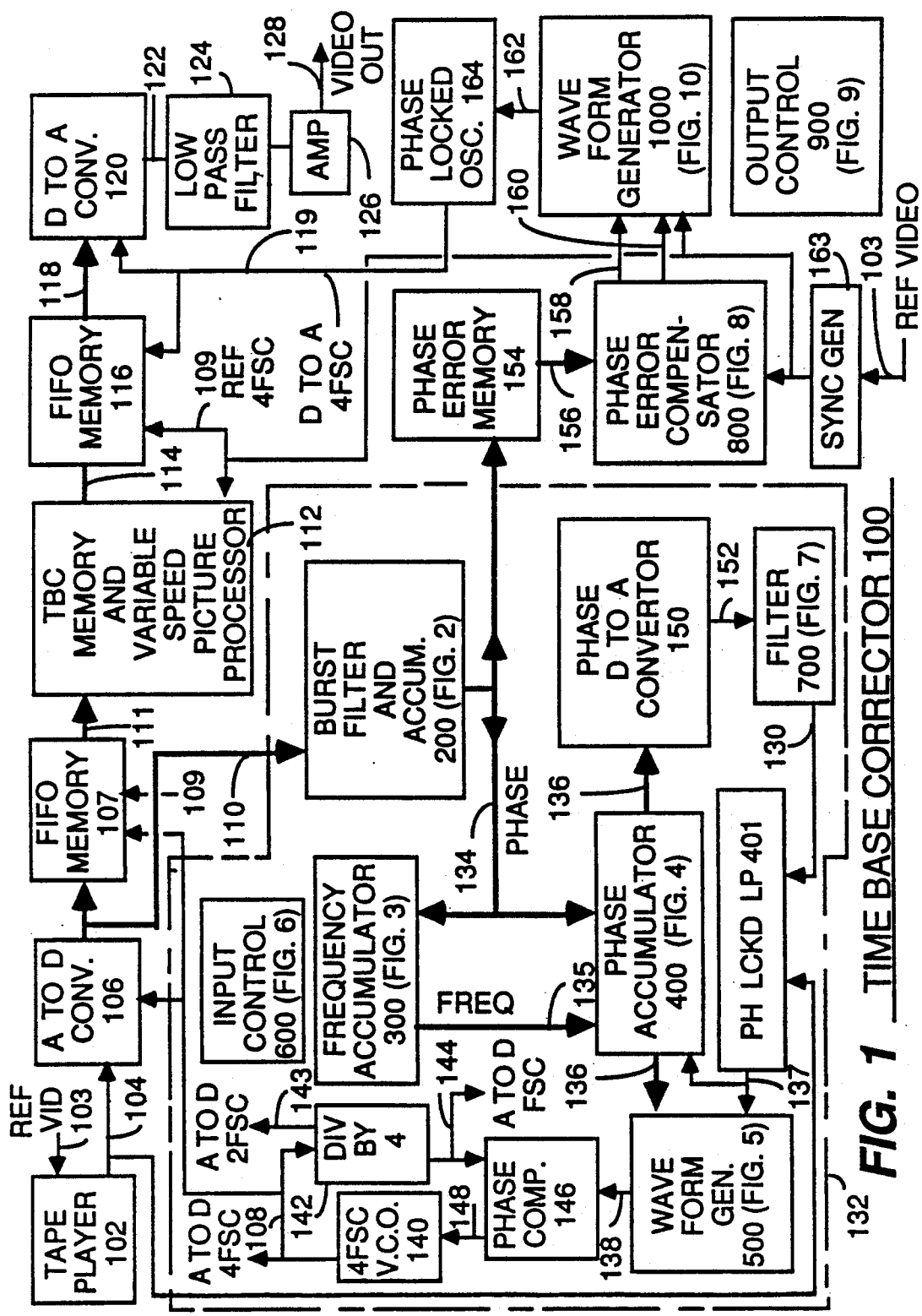
FIG. 1 is a block diagram representation of a time base corrector 100 designed in accordance with the present invention.

In the detailed description which follows, a very important role is played by the color subcarrier and "burst" signals, which are signals having a frequency of approximately 3.58 MHz. A digital time base corrector includes an analog-to-digital convertor 106 (FIG. 1) (hereafter, A-to-D convertor) at its input and a separate digital-to-analog convertor 120 (hereafter, D-to-A convertor) at its output. These, in general, run at slightly different speeds, both producing and utilizing digital signals that fluctuate at four times 3.58 MHz, at twice this rate, and at this rate. In addition, two other oscillators are utilized which generate 3.58 MHz signals.

In the preferred embodiment of the invention, the incoming analog video signal is sampled four times during each cycle of the color burst signal, so the data sampling rate is four times the above frequency, or roughly 14.3 MHz. Likewise, during each subcarrier cycle, four digitized video samples are presented to the D-to-A convertor 120 which produces the video output during each cycle of the color burst signal. Separate signals control these separate operations, which are not precisely synchronized. The 14.3 megacycle signal that controls the A-to-D conversion process will hereafter be designated as the "A TO D 4FSC" signal, where "FSC" stands for "frequency of the color subcarrier," and the "4" means "4 times FSC." The signal that controls the D-to-A conversion process is called the "D TO A 4FSC" signal.

An analog phase locked loop (PLL) 401 (FIG. 1) which contains a voltage-controlled oscillator (VCO) generates a signal "VCO 4FSC" which is kept in synchronism with the burst signal of the tape player's analog video signal and serves as a frequency reference base for the A TO D 4FSC signal. A sync generator 163 (FIG. 1) is locked to a video reference signal provided by the television studio or station and, in turn, generates a stable reference signal "REF 4FSC" that serves as a frequency reference base for the D TO A 4FSC signal. All of these signals, and their relationships, are described below in full detail.

Since the incoming video is sampled at four times the color subcarrier frequency rate, the invention utilizes signals fluctuating just as fast, twice as fast, and four times as fast as the subcarrier signal FSC. These signals are referred to as "FSC," "2FSC," and "4FSC" Unless otherwise noted, these signals are all digital square wave signals that are used to control the digital processing of digitized signal samples. If a signal is actually an analog signal, that fact will be noted. Throughout this description, all block diagram elements are formed from one or more conventional digital logic elements. Part numbers are supplied where an element is not strictly conventional. Circuit details are disclosed using conventional circuit elements, while logic signal processing is shown using conventional AND, OR, NOT, and XOR logic elements. The drawings sometimes indicate whether a signal is a normal signal or an inverted signal. A normal signal is present when positive and absent when negative. Inverted signals are present when negative and absent when positive. Normal signals are sometimes indicated by the presence of a plus sign on a signal line or by the fact that they enter a logic element directly without an intervening inversion circle. Inverted signals are sometimes indicated by a minus sign on a signal line or by the fact that they enter a logical element through an inverting circle. In general, OR logic gates are used to combine signals, while AND logic gates are used where one signal is controlled or "gated" by other signals. In the detailed description that follows, the polarity of signals (plus or minus) is not normally mentioned, but only whether the signals are "present" or "absent," since absolute signal polarity is generally apparent in the drawings and is also not critical to providing an understanding of the invention. Normal signals could be substituted for inverted signals, and vice versa.

Heavy lines in the drawings are multiwire digital signal busses. Light lines are single wire signal paths. Where important to an understanding of the invention, the detailed description indicates the number of wires in a buss. If not otherwise mentioned, a buss contains eight wires. Unless otherwise noted, all logical circuit elements are constructed with transistor-transistor logic (TTL) of conventional design, or comparable logic capable of operations at the 4FSC speed that is required to implement some portions of the present invention, or at whatever speed is indicated by the signals applied to the circuit elements.

FIG. 1 presents an overview description of a time base corrector 100 designed in accordance with the present invention. The time base corrector 100 is connected to the ANALOG VIDEO signal 104 output of a video tape player 102 of conventional design. Both the tape player 102 and the time base corrector 100 receive video color, horizontal, and vertical synchronizing signals from a station reference signal generator (not shown) on a line 103, which is coupled to a sync generator 163, also of generally conventional design, which is locked to the station reference signal. Control mechanisms (not shown) within the tape player 102 control the speed of its capstan motor to keep the ANALOG VIDEO signal 104 in general synchronism with the reference signal generator 163, although at any given moment the ANALOG VIDEO signal 104 may not be presented at precisely the right speed or velocity. The purpose of the time base corrector 100 is to correct all such velocity errors and present a VIDEO OUT signal 128 that is in precise synchronism with the reference signal generator 163.

The tape player 102 provides the ANALOG VIDEO signal 104 to the A-to-D convertor 106 which is clocked by the A TO D 4FSC signal 108, whose generation is explained below. The A-to-D convertor 106 samples the incoming video signal four times during each color subcarrier cycle and thereby generates four 8-bit digital samples during each such cycle. These samples, called the DIGITIZED VIDEO signal 110, flow from the A-to-D convertor 106 through a FIFO memory 107 to the time base corrector memory and the variable speed picture processor, both of which are labelled 112, where the digitized video samples are stored and processed in whatever way is necessary to provide for chroma re-encoding and the like. The input of the FIFO memory 107 is driven by the A TO D 4FSC signal 108 in synchronism with the A TO D convertor 106, and the output of the FIFO memory 107 is driven by the REF 4FSC signal 109 which flows from the sync generator 163 that also drives the processor 112. The output 114 of the processor 112 flows into a FIFO memory 116 which also has its input driven by the REF 4FSC signal 109. The output 118 of the FIFO memory 116 is driven by the separate D TO A 4FSC signal 119 which is typically running at a slightly different phase than the REF 4FSC signal 109. The output 118 of the memory 116 flows into a D-to-A convertor 120 which is also driven by the D TO A 4FSC signal 119. The convertor 120 generates an analog video output signal 122 which, after filtering by a low-pass filter 124 and amplification by an amplifier 126 (which also combines the analog video output signal 122 with appropriate synchronizing and burst signals derived from the sync generator 163) becomes the video output 128 of the time base corrector 100.

The tape player 102 has flowing into it a reference video signal 103 generated by the station reference signal generator of previous mention. The ANALOG VIDEO 104 flows into a phase-locked loop (PLL) 401. The loop 401 is controlled by an analog phase error signal 130 that is generated by the time base corrector 100 to compensate for low frequency, long-term errors in the playback signal from the tape player 102. The phase-locked loop 401 generates the signal VCO 4FSC which has a phase correction time constant equal to about ten horizontal timing intervals. This means that any phase error between the burst of the ANALOG VIDEO signal 104 and the timing of the A to D convertor 106 is corrected by the phase-locked loop 401 within ten to twenty scanning lines. The VCO 4FSC signal 137 which flows from the phase-locked loop 401, after further frequency and phase corrections, becomes the A TO 4FSC signal 108 that drives the A to D convertor 106.

Time-variant phase or frequency errors, commonly designated velocity errors, are predictably compensated for by progressively changing the phase of the clock signal corresponding to the A TO D 4FSC signal 108 to effect the sampling of the video information following the sampled color burst component. Any residual phase errors then are measured, stored, and subsequently used to adjust the phase of the D TO A 4FSC signal 119 which drives the D-to-A convertor 120, as will be explained. To this end, the elements labeled 132 in FIG. 1 constitute a digital phase error measurement and correction system. The digitized video signal 110 is fed into a burst filter and accumulator 200. During the color burst interval, this burst filter and accumulator 200 is enabled to sample the digitized video 110 and to compute precisely the phase error of the A-to-D convertor 106 with respect to the color burst phase of the incoming ANALOG VIDEO signal 104 flowing from the tape player 102. The digitized phase error value appears as an 8-bit phase error data value which appears as the PHASE signal 134. At the end of each color burst interval and before the onset of the immediately-following horizontal scanning interval, this phase error value is passed to a phase accumulator 400, which combines it with previously computed phase error values and stores the combined phase error values as a new phase setting for the digitally-controlled oscillator (to be described) that generates the A TO D 4FSC signal 108. The phase accumulator 400 cooperating with the waveform generator 500, and under the control of the VCO 4FSC signal 137 just described, initiates the generation of a square wave of frequency FSC that is phase shifted with respect to the VCO FSC signal 137 by an amount corresponding to the combined phase error values stored in the phase accumulator 400, so that the A to D convertor 106 can sample the incoming analog video signal 104 at a consistent phase reference point with respect to the phase of the color subcarrier component of the video signal at the start of each horizontal line.

The A TO D 4FSC signal 108 is actually generated by a voltage-controlled oscillator 140. The A TO D 4FSC signal 108 flows into a divide-by-four counter 142 which generates the A TO D 2FSC signal 143 and A TO D FSC signal 144 which are used by other components of the corrector 100. The A TO D FSC signal 144 and the square wave signal 138 from the waveform generator 500 are both fed into a phase comparator 146.

Figure 4:
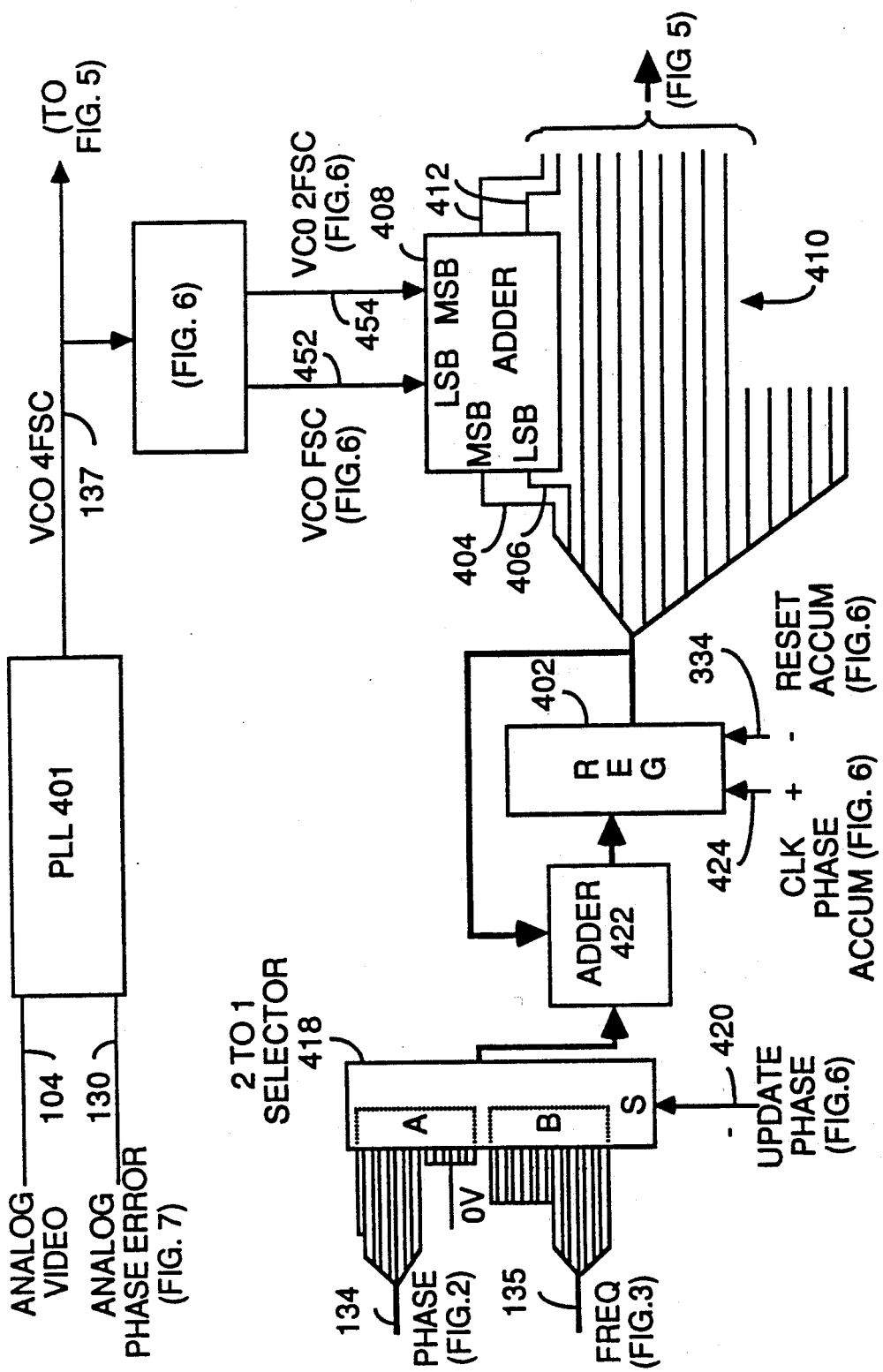
FIG. 4 is a block diagram representation of the phase accumulator 400 in FIG. 1.

The phase comparator 146 compares the phase of these two signals and generates an error signal 148 which is filtered and used to adjust the 4FSC voltage-controlled oscillator 140 to lock the three signals A TO D FSC, A TO D 2FSC, and A TO D 4FSC into precise phase synchronization with the square wave signal 138. The A TO D 4FSC signal 108 then controls the operation of the A-to-D convertor 106. The phase-clocked loop formed of the components 146, 140 and 142 has a very fast settling time (approximately 2 microseconds) and accordingly the phase of the A to D 4FSC signal 108 is precisely adjusted immediately after the termination of each color burst interval Thus, the A-to-D convertor 106 operates to sample the incoming analog video signal 104 starting at the same precise point on each horizontal line The sine wave digital values on signal line 136 also flow from the phase accumulator 400 to a phase D-to-A convertor 150 which generates an analog phase error signal 152. This signal 152 flows through a filter 700 and becomes the analog error signal 130 which controls the static phase shift of the phase-locked loop 401 (FIG. 4). The filter 700 is given characteristics such that the VCO 4FSC signal 137 generated by the phase-locked loop 401 responds to long-term phase and frequency errors, while short-term phase and frequency errors in the ANALOG VIDEO 104 are corrected by the PHASE signal 134 and by additional time-variant phase, or frequency adjusting circuitry that is described below.

If the tape player 102 is producing the ANALOG VIDEO signal 104 at a slightly different frequency than the proper subcarrier frequency, then there will be a phase error at the beginning of every line that is corrected by the circuitry just described. The circuitry just described, which causes the time base corrector A-to-D convertor 106 to begin sampling the incoming signal 104 at the same point on each line relative to the contained color subcarrier component, permits a phase error to build up gradually during the course of each line to a fairly large error value at the end of each line. This time variant phase error is then corrected at the start of the next line. When a series of lines all began with a phase error adjustment of the same sense, this indicates that the frequency of the A TO D 4FSC signal 108 and VCO 4FSC signal 137 is not quite equal to the frequency of the burst signal that is presented by the tape player 102. To provide more accurate compensation, the phase of the A TO D 4FSC voltage-controlled oscillator 140 is adjusted progressively in time. This is accomplished by a frequency accumulator 300.

Each time the burst filter and accumulator 200 presents a digital phase error value as the PHASE signal 134, the phase error value is fed into a frequency accumulator 300 where the successive phase error values are weighted, summed, and accumulated in the manner of a digital reset (or integral) controller. During the scanning of each horizontal line, the resulting weighted and summed value is fed into the phase accumulator 400 as the FREQ signal 135 and is continuously added to the phase value that is stored within the accumulator 400, thereby producing a progressive, time-variant phase change, i.e., a phase ramp, and the phase ramp is presented over the signal lines 136 to the waveform generator 500. The phase accumulator 400 thus adds this small correction value to its stored phase value continuously during each horizontal line and thereby progressively changes the phase of the square/wave to progressively shift the phase of the square wave signal 138. In this manner, the phase of the voltage-controlled oscillator 140 is progressively advanced or retarded to match that of the video signal that is presented by the tape player 102. This compensation minimizes the phase drift during each horizontal scan line following the sampled color burst component.

The magnitude of the weighted and summed FREQ signal 135 presented by the frequency accumulator to the phase accumulator 400 is limited by a mechanism (described below) which prevents the sum from exceeding predetermined positive and negative limits. Large frequency errors are corrected by the phase locked loop 401.

The phase error measurement and compensation system 132 just described utilizes both analog and digital synchronization techniques to compensate for the phase error at the start of each line and, through predicted phase adjustments over the next line, to compensate partially for phase drift during the digitization of each line. That is, the system 132 is always predicting the phase error across each line at the very start of the line through examination of the phase errors on the previous lines and, therefore, is unable to provide complete correction due to a lack of information concerning what will occur during the line. Accordingly, the phase error value measured at the start of every line (which appears as the PHASE signal 134) is fed into a phase error memory 54 which operates in parallel with the time base corrector memory and processor 112 to store one 8-bit phase error value for every line of video that is stored within the memory and processor 112. These stored phase error values may then be used to provide a final correction by adjusting the precise phase of the D-to-A convertor 120 as it converts the digitized video samples for each line back to an analog signal. More particularly, the D to A convertor begins converting the data for each line in precise synchronism with the REF 4FSC signal 109 provided by the sync generator 163, since the phase error at the start of each line is zero. Then the phase of the D TO A 4FSC signal 119, which drives the D TO A convertor 120, is gradually shifted away from phase synchronism with the REF 4FSC signal 109 to correct any phase error that builds up over the length of a line.

The phase error values, in due course, flow from the memory 154 over a signal line 156 to a phase error compensator 800. The phase error compensator 800 is actually a microprogrammable digital computer that is able to perform digital filtering upon multiple phase error values in real time. The compensator 800 generates a SIGN signal 158 and a CARRY signal 160 which together control the precise phase of operation of a sine wave generator 1000. The CARRY signal indicates when the timing of the D-to-A convertor 120 needs to be advanced or retarded, and the SIGN signal indicates whether to advance or retard the timing. The sine wave generator 1000 generates a square wave signal 162. This signal 162 is fed into a phase-locked oscillator 164 similar in all respects to elements 140, 142, and 146 described previously, which then generate the D TO A 4FSC signal 119 that controls the precise timing of the D-to-A convertor 120. In this manner, precise correction of all remaining phase errors is achieved.

The phase errors do not simply flow directly through the compensator 800. The compensator 800 continuously adjusts the phase of the phase locked oscillator 164 throughout the length of each horizontal line, carefully "curve-fitting" the phase correction of the generated square wave 162 in accordance with four separate phase error values, two taken from preceding and two taken from following color burst sampling points surrounding the line to be corrected. The compensator 800 is thereby able to correct not only for the phase drift that can occur during each horizontal line in a linear manner but is also able to generate nonlinear phase corrections during each line to gain an even closer adjustment of the phase at every point in the transmitted video signal to compensate as fully as possible for all phase errors.

The phase error measurement and correction system 132 is controlled by an input control logic 600 which utilizes counters, timing signals, and microprograms stored in read-only memories or ROMS to control the operation of the elements 200, 300, and 400. Likewise, the phase error compensator 800 is controlled by an output control 900 that contains similar microprogrammed elements. The output control 900 is also coupled to the time base correcting memory and variable speed picture processor 112, since the output control 900 needs to know precisely what type of digital filtering or video signal processing, if any, is applied to the video signal to compensate for interlace or color phase errors. The control 900 causes the compensator 800 to come up with a corresponding set of filters for use in filtering the phase error values so that the video signal processing does not alter the accuracy of the phase error correction performed by the D to A convertor 120, as is explained below.

Figure 2:
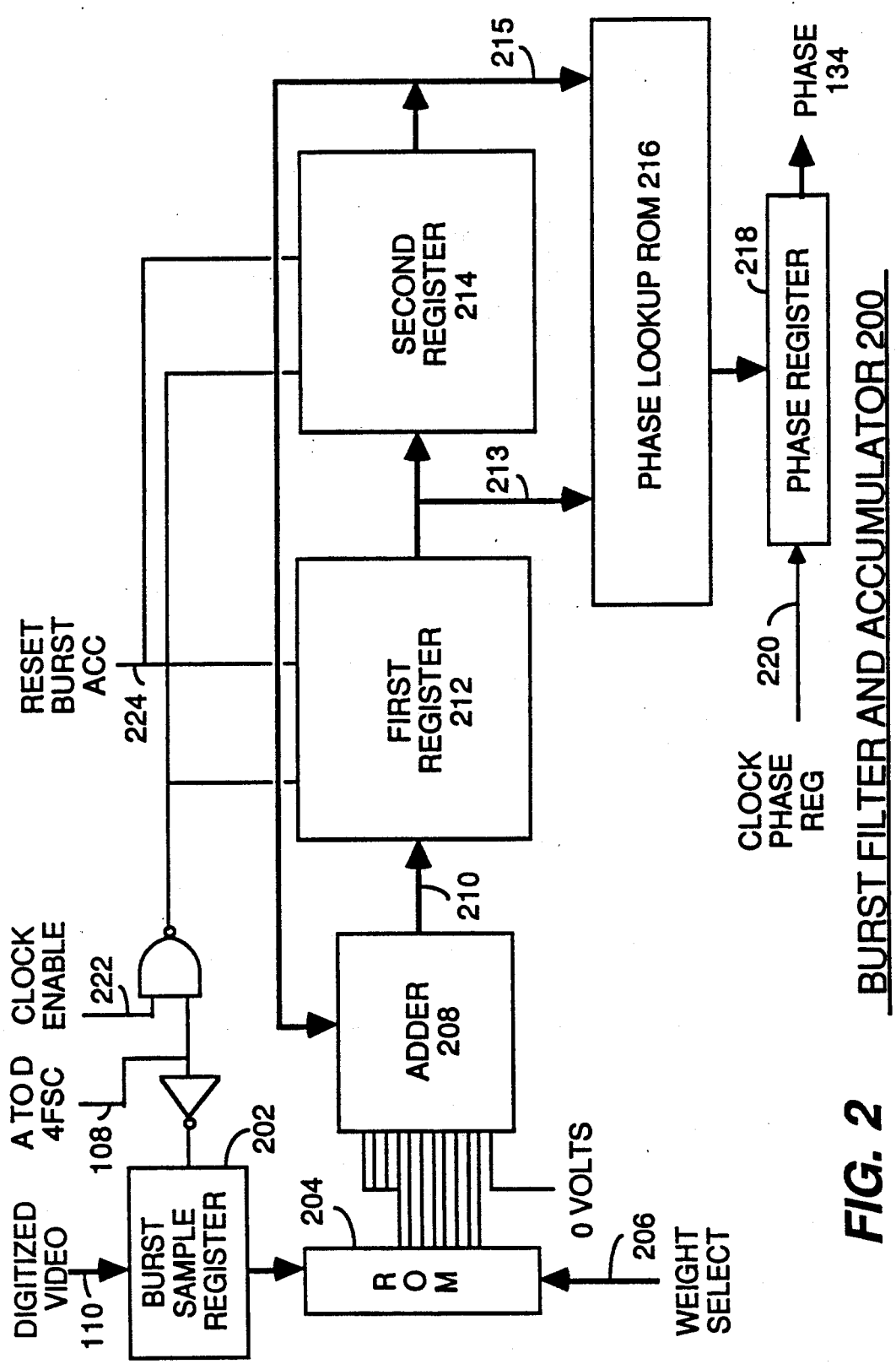
FIG. 2 is a partly block and partly logic diagram representation of the burst filter and accumulator 200 in FIG. 1.

Referring now to FIG. 2, the burst filter and accumulator 200 is actuated during the color burst signal interval to examine the digitized video values captured by the A-to-D convertor 106 (FIG. 1). During the color burst interval, the DIGITIZED VIDEO signal 110 flows into a burst sample register 202 over eight wires, with four 8-bit samples being presented during each cycle of the color subcarrier signal. The burst sample register 202 is clocked by the A TO D 4FSC signal 108. The output of the burst sample register 202 thus presents an 8-bit binary number four times during each cycle of the color burst. These sample values are applied to a portion of the address inputs to a read-only memory 204.

The function of the read-only memory 204 is to multiply the digital samples by predetermined constants, and to thereby weight some of the sample values more heavily than other values. In addition, the read-only memory 204 reverses the sign of every pair of input values with respect to the preceding pair, so that differencing alternate values actually computes their sum. The constant selected is determined by the remainder of the address signals flowing into the read-only memory 204 which are called the WEIGHT SELECT signals 206 and which originate in FIG. 6. In the preferred embodiment of the invention, the WEIGHT SELECT signals 206 are applied to three address leads of the ROM and thereby permit any one of up to four different weighting values, plus a sign value, to be selected. Basically, the weighting is done so that the sample values taken from the central region of the color burst signal are weighted more heavily than are the sample values taken from the beginning and end of the color burst interval so that a Gaussian weighting of the incoming samples is achieved, improving the stability and accuracy of the burst signal filter in the presence of video noise and analog-to-digital roundoff error.

The burst filter and accumulator 200 contains an adder 208 whose input connects to the ROM 204 output and whose output 210 feeds into a first register 212 the output 213 of which flows into a second register 214. The output 215 from the second register 214 is then fed back into a second input of the adder 208. Accordingly, the output 215 from the second register 214 may be added to the output presented by the ROM 204 by means of the adder 208, with the resulting value presented at 210 for storage in the first register 212.

The purpose of the burst filter and accumulator 200 is to determine the precise phase error in the timing of the A-to-D convertor 106 in FIG. 1 by examining carefully the digital samples of the incoming video taken during the color burst interval.

Briefly described, a first value flows from the burst sample register 202 to the weighting ROM 204 and passes through the adder 208 to the first register 212. The registers 212, 214 are cleared prior to burst accumulation. When a second value flows from the register 202, the first value flows from the first register 212 to the second register 214, and the second value passes through the ROM 204 and adder 208 and into the first register 212. The first value in the second register 214 is now in position to be subtracted from (or added to the negation of) a third value from the register 202 by means of the adder 208; and subsequently, the second value, presently in the first register 212, is shifted into the second register 214 where the fourth value presented by the register 202 and ROM 204 can be subtracted from it. In this manner, the sum of the differences between alternative pairs is accumulated in one of the registers 212 and 214 and the summation of the difference between the remaining alternate pairs is accumulated in the second register 212 or 214. These two summations are then presented jointly as a 16-bit address which is presented to the 64K phase lookup read-only memory 216. The memory 216 simply decodes this combined address value into a phase value which is presented to a phase register 218 as an 8-bit number that varies from $-127$ to $+127$ as the phase error varies from $-90$ through $+90$ degrees. The phase register 218 is clocked by a CLOCK PHASE REG signal 220 that originates in FIG. 6. In this manner, at the termination of the color burst interval and preceding the commencement of each horizontal scanning line, the precise phase discrepancy between the sampling times of the A-to-D convertor 106 and the phase of the color burst signal at the start of the line is presented as the PHASE signal 134, in the form of an 8-bit binary number.

Given two samples X and Y of digitized burst that are 90 degrees apart, the phase error P is given by the following formulas:

If sample X is greater than zero, then $P = \arctan(Y/X)$ degrees

If X is less than zero, then
If Y is greater than zero, then $P = 90$ degrees
If Y is less than zero, then $P = -90$ degrees Here, X and Y are the values in the two registers 212 and 214. The phase lookup ROM 216 accepts these two values, including a sign bit with each value, and simply "looks up" the solution to one of the three equations, scaling the answer so that $+90$ degrees is $+127$ and $-90$ degrees is $-127$. It is quite simple to compute the values that must be stored at each location in the ROM 216 from the above equations.

Figure 3:
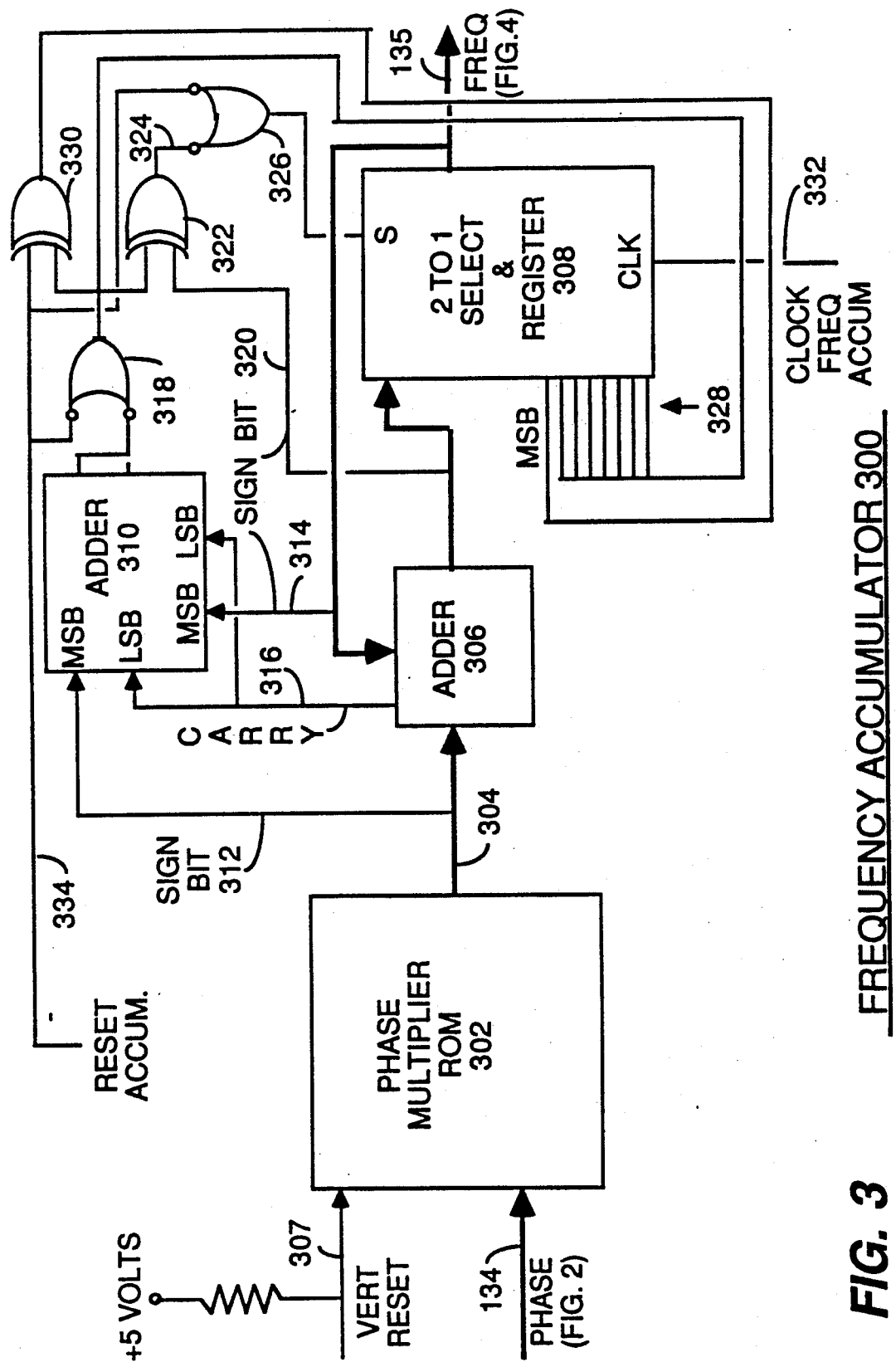
FIG. 3 is a partly block and partly logic diagram representation of the frequency accumulator 300 in FIG. 1.

FIG. 3 discloses the details of the frequency accumulator 300. The frequency accumulator 300 accepts as its primary input signal the PHASE signal 134 which presents the line-to-line phase error values that were generated in FIG. 2. The accumulator 300 generates as its output the FREQ signal 135 which presents an eight-bit frequency value that is used to vary the frequency of the oscillator 140 (FIG. 1) which controls the A-to-D convertor 106 (FIG. 1).

Each phase error value taken at the end of each color burst interval is applied by PHASE signal 134 as the address input to a phase multiplier ROM 302 which scales the error value and presents it as a signed 8-bit value at an output 304 that leads to an adder 306. During vertical retrace intervals, a vertical reset signal VERT RESET 307, generated by vertical synchronizing logic (not shown in the drawings), is applied as the remaining ninth address signal input to the ROM 302, essentially disabling the ROM 302 by forcing zero values upon the line 304 so that no phase error samples are accepted during vertical retrace when none are present in the PHASE signal 134 (there are no color burst during vertical retrace).

The phase error values presented to the adder 306 pass through the adder 306 and into a register 308 having a 2-to-1 selector at its input. Successive digital phase values appropriately weighted by the ROM 302 are then added into the register 308 by the adder 306, since the FREQ signal 135 from the register 308 is fed back into the alternate input of the adder 306. In this manner, the signed phase error values, appropriately scaled by the ROM 302, are continuously summed in the register 308 which functions essentially as an integrator or a digital reset controller. As the phase errors fluctuate positively and negatively, the frequency error value stored within the register 308 grows and shrinks, but at a slow rate. When there is no phase error, the contents of the register 308 remains stable. The FREQ signal 135 is then used to alter the frequency of the voltage-controlled oscillator 140 which controls the A TO D convertor 106 (see FIG. 1.)

The remaining elements in FIG. 3, including the fact that the register 308 has two inputs, simply prevent the count value in the register 308 from either overflowing or underflowing, thereby causing erroneous operation of the frequency accumulator 300. Any suitable mechanism for preventing overflow or underflow may be used in place of that shown.

Briefly described, a one-stage adder 310 in its more significant stage sums the sign bits 312 and 314 of the numbers presented to the adder 306 and then adds to this sum the carry 316 signal generated by the adder 306. Thus, the adders 310 and 306 form a 9 bit adder. (The carry 316, presented to both inputs of the adder's less significant stage, cause a "carry" to reach the more significant stage.) This sum of three signal bits passes through a gate 318 and is compared to the sign bit 320 of the adder 306 output by an exclusive-or gate 322. These two values normally differ, so the output 324 of the gate 322 normally passes through the gate 326 and causes the register 308 to select the adder 306 output as its input. But if the sign bits 312 and 314 are zero (indicating positive numbers coming in) when the sign bit 320 is positive (indicating an overflow coming out), the output of the gate 318 and the sign bit 320 then match, and so the gate 322 switches the register 308 to input 328, where seven "1" data bits (from gate 318) and a "0" or positive sign bit (from the gate 318 inverted by the gate 330) appear. So the register 308 receives +127, and it cannot overflow.

Likewise, when negative values are fed into the adder 306, the positive sign bits 312 and 314 and the carry 316 are added by the adder 310 to give a high output which, inverted by the gate 318, becomes a zero input to the gate 322 that does not match the positive sign bit 320 flowing from the adder 306; so the register 308 selects the adder 306 output. But when an "underflow" occurs, the sign bit 320 falls and causes the inputs to the gate 322 to match. The gate 322 forces the register 308 to select the input 328, where the low-level output of the gate 318 appears as seven "0" data bits and, after the output of the gate 318 is inverted by the gate 330, a "1" or negative sign bit. So the register 308 receives −128, and it cannot underflow.

The register 308 is pulsed by a CLOCK FREQ. ACCUM signal 332 which comes once each horizontal line to add another weighted phase error value into the frequency value that is maintained within the register 308. A negative RESET ACCUM. Signal 334 passes through the gates 318, 330, and 326 during vertical retrace to present all "1"s to the alternate input of the register 308, and this signal 334 forces the register 308 to select this value and reset itself to essentially zero count. So the frequency accumulator 300 is reset during vertical retrace.

Figure 5:
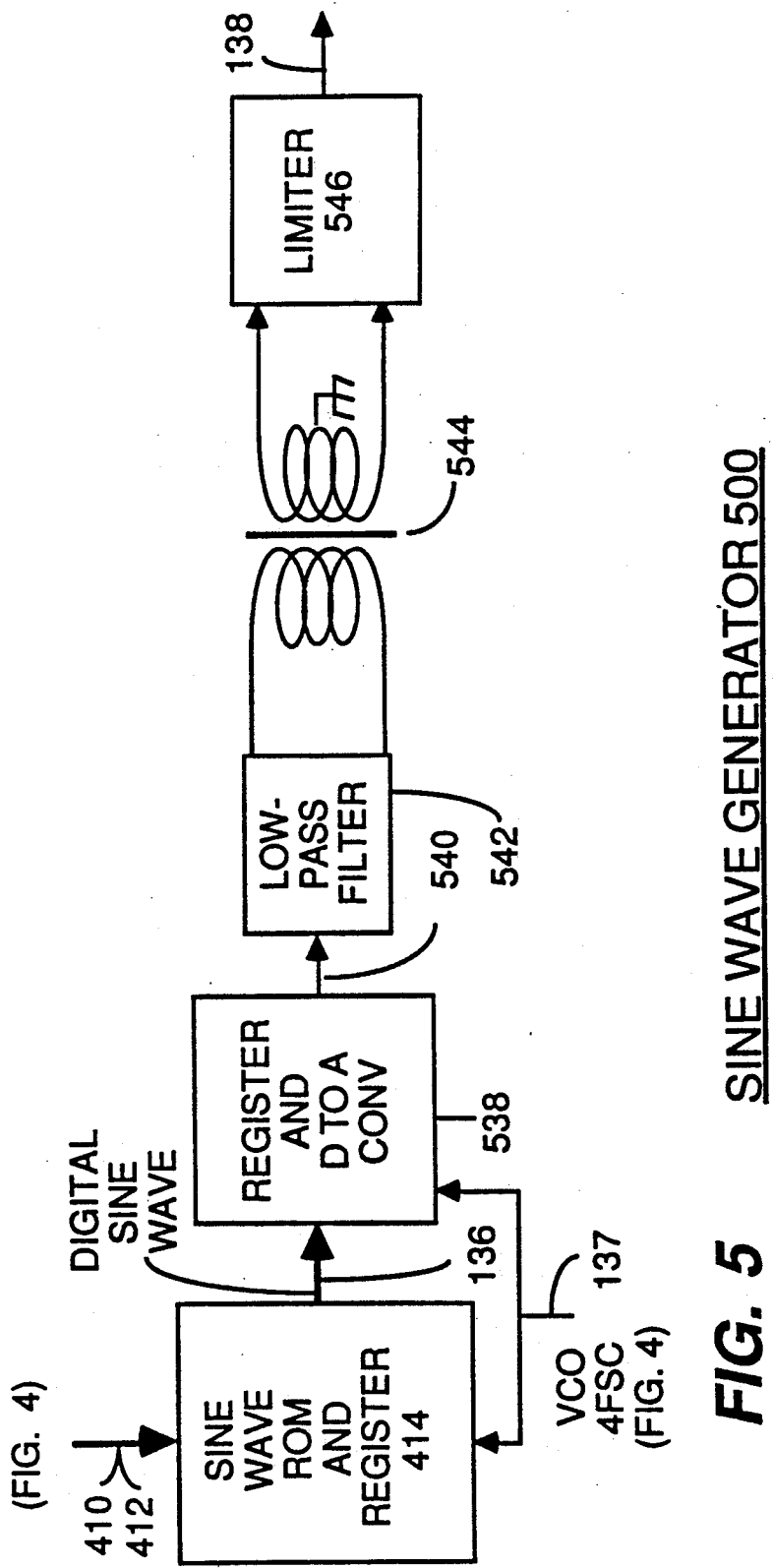
FIG. 5 is a partly block and partly schematic diagram representation of the waveform generator 500 shown in FIG. 1.

FIG. 4 reveals the details of the phase accumulator 400 which controls the generation of the square wave 138 that ultimately controls the precise operation of the A-to-D convertor 106 (FIG. 1). A register 402 contains a 16-bit binary number that determines the precise phase of the waveform generator 500. The two most significant bits 404 and 406 of the register 402 output are fed into an adder 408 and are added to the signals VCO 2FSC 454 and VCO FSC 452 by the adder 408. In this manner, the 14 wires from the register 402 and the two wires 412 from the adder 408 combine to provide a 16-bit signal 410, 412 which extends to the input to the ROM and register 414, depicted in FIG. 5. (Only the ten most significant bits reach the register 414.) The ROM portion of the ROM and register 414 contains, in essence, a sine table. The address inputs to the ROM and register 414 are provided with a phase angle value obtained from the adder 408 and the register 402. The sine of this value, selected from the ROM and register 414, is then presented four times during each color subcarrier cycle as the DIGITAL SINE WAVE signal 136, as shown in FIG. 5.

Assume that the register 402 contains zero as the initial phase offset value. Then the adder 408 and register 402 present the values

0000000000

0100000000

1000000000

1100000000 to the ROM and register 414, which has ten address input leads. The ROM and register 414 responds to these values by generating the sine of zero, 90, 180, and 270 (or minus 90) degrees at 136, or the following values:

0—10000000

90—11111111

180—10000000

270—00000000 where "10000000" represents zero, which is the sine of 0 and 180 degrees; "11111111" corresponds to "+1" which is the sine of 90 degrees; and "00000000" corresponds to "−1" which is the sine of 270 degrees. When later passed through the waveform generator 500 (FIG. 5), these digital values produce an analog sine wave (at 540 in FIG. 5), with zero phase shift, referenced to VCO FSC.

Immediately following the color burst interval on each horizontal line, and prior to the commencement of the video data on each line, a digital phase error value is presented by the PHASE signal 134 to a multiplexer, or selector, 418. An UPDATE PHASE signal 420 causes the selector 418 to select this phase error value at the nine most significant of its 16 inputs, as is shown in FIG. 4, and to pass this value directly to the adder 422 where this value is added to the current value in the register 402, the current value corresponding to the cumulation of the phase errors detected previously. The resulting sum is then returned to the register 402. The register 402 now contains the total precise phase error in the incoming analog video 104. The phase error value in the register 402 is now added, by means of the adder 408, to the 0, 90, 180, and 270 degree phase values so that the ROM and register 414 is presented with phase values corresponding to a sine wave that no longer begins at 0, 90, 180, and 270 degrees, but at some positive or negative phase offset from these positions. The ROM and register 414 dutifully transforms these new phase shifted values into the corresponding digital sine values, and these values shift the phase of the square wave 138 that is produced by the waveform generator 500 (FIG. 5). The square wave 138 then causes the 4FSC voltage-controlled oscillator 140 (FIG. 1) to immediately shift the phase of the A TO D 4FSC signal 108 so that the phase error in the operation of the A-to-D convertor 106 is immediately corrected. Sampling of the incoming ANALOG VIDEO signal 104 then begins with the A-to-D convertor 106 operating in precise phase synchronism with the incoming signal's color burst signal, in the sense that it is sampling at the same phase relative to this line's color burst signal as on all other lines.

During subsequent burst intervals, the phase error indicated by the PHASE signal 134 is again added to the current phase value in the register 402 by means of the selector 418 and adder 422. Accordingly, the present invention always begins scanning each horizontal line with the A-to-D convertor 106 (FIG. 1) operating in precise phase synchronism with the incoming video signal's burst signal.

If the color burst signal in the incoming ANALOG VIDEO signal 104 is operating at a slightly different frequency than the 4FSC voltage-controlled oscillator 140, then during the course of digitizing a horizontal line there is a gradual increase in the phase error of the operation of the A-to-D convertor 106. A frequency error of this type is indicated by the burst filter and accumulator 200 always detecting a new phase error of the same size and polarity as it scans each new burst interval on each incoming line. The frequency accumulator 300 gradually sums these phase error values over multiple lines and produces the FREQ signal 135 which indicates the magnitude of the frequency error.

At all times other than immediately following the burst interval at the start of each horizontal line, the UPDATE PHASE signal 420 switches the selector 418 so that the selector 418 accepts as its input, on the least significant of the 16 bits of its input, the FREQ signal 135 that indicates the frequency error. The adder 422 and register 402, operating under the control of the CLK PHASE ACCUM signal 424 (generated in FIG. 6), then adds this frequency error value into the least significant part of the phase error value within the register 402 continuously during the course of the processing of each horizontal scan line so that the phase error value within the register 402 gradually shifts in a way that slowly shifts the phase of the digital sine wave values which flow from the register and ROM 414. In practical effect, the frequency of the generated sine wave is thereby adjusted up or down to bring the frequency of the 4FSC voltage-controlled oscillator 140 into frequency synchronism with the frequency of the color subcarrier signal within the ANALOG VIDEO signal 104. This circuitry thereby cancels out much of the phase drift which would otherwise occur during each line due to frequency errors in the operation of the A-to-D convertor 106.

The waveform generator 500 is shown in FIG. 5. The digital phase angle 410, which is the phase offset in the register 402 added to the phase angle represented by the VCO FSC signal 452 and the VCO 2FSC signal 454 by the adder 408, is applied to the sine wave ROM and register 414 which looks up the sine of the resultant angle and provides an 8-bit digital sine wave value 136 that represents the sine of the phase angle. This value 136 is fed into a register and D-to-A convertor 538 which transforms the digital value into an analog sine wave signal 540. The D-to-A convertor 538 output 540 is fed through a low-pass filter 542 which removes alias components and forms a clean analog sine wave that is applied to a transformer 544 that drives a limiter 546. The limiter 546 then produces the square wave signal 38 which flows back to the phase comparator 146 (FIG. 1). The signal 138 is the timing reference for the A TO D FSC signals.

Figure 6:
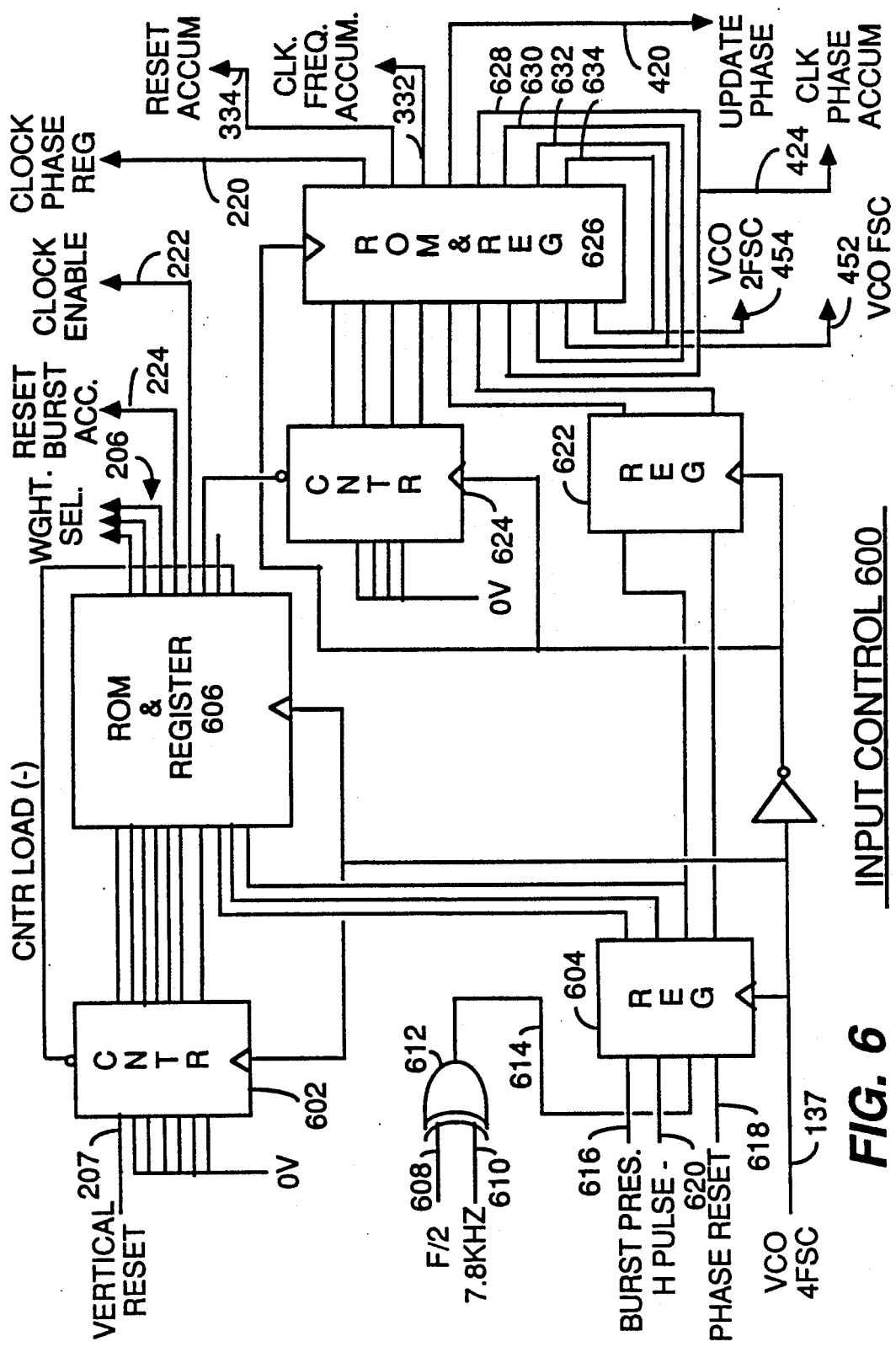
FIG. 6 is a block diagram representation of the input control 600 shown in FIG. 1.

The burst filter accumulator 200 and the frequency accumulator 300 are controlled by a counter, register, and ROM logic system that comprises the input control 600 shown in FIG. 6. The burst filter and accumulator 200 is controlled by the counter 602, register 604, and ROM and register 606. The register 604 selects the proper program, and the counter 602 then sequences through the program steps to perform the computation of the phase error during the burst signal intervals. A signal F/2 608 indicates during slow motion effects when the burst phase is inverted, and a signal 7.8 KHz 610 identifies burst phase on odd and even lines. These two signals 608 and 610 are combined by an exclusive OR logic gate 612 to provide a signal 614 that indicates the phase of the color burst. A BURST PRESENT signal 616, generated by analog circuitry (not shown), indicates when the burst is present, and a PHASE RESET signal 618 is a vertical timing pulse that indicates when the logic shown is to be reset during a vertical timing interval. An H PULSE signal 620 signals the horizontal sync pulse interval. All of these signals, save the signal 618, are combined to select different programs within the ROM and register 606, which is otherwise sequenced by the counter 602 to generate the necessary timing signals to control the measurement of burst phase error during the color burst interval.

The PHASE RESET signal 618 passes on to a register 622 which, together with a counter 624, controls the ROM and register 626 that governs the operations of the frequency accumulator 300 shown in FIG. 3, and the phase accumulator of FIG. 4. Basically, the register 622 simply provides a means for resetting the ROM and register 626 at the end of each field. The counter 624 steps through successive program steps during each horizontal blanking interval for effecting control of the phase error detection and signal processing by accumulators 200, 300 and 400. The program steps themselves contain address data which, flowing over signal lines 628 to 634, form a portion of the address of the ROM 626, so that the ROM and register 626 continues to function during the horizontal line intervals between horizontal blanking intervals, and thereby continuously provides VCO clock signals.

FIG. 7 presents the details of the filter 700 which filters the output signal 152 flowing from the phase D-to-A convertor 150 in FIG. 1. The unfiltered analog phase signal 152, in both uninverted and inverted form, is applied to the inputs 708 and 710 of an operational amplifier 702. A resistor 704 couples the output 706 to the first input 708 of the amplifier 702, the input 708 being the inverted signal input. A second resistor 705 couples the non-inverted input 710 of the amplifier 702 to ground potential. The output 706 of the amplifier 702 is applied through a resistor to an input 712 of a second operational amplifier 714. The remaining non-inverting input 716 of the amplifier 714 is connected to ground by a resistor 718. The output 130 of the amplifier 714 is coupled back to the input 712 by means of a series circuit comprising a resistor 720 connected in series with a capacitor 730. This second operational amplifier 714 is given a long time constant (in the neighborhood of 10 to 30 horizontal lines) so that the analog phase error signal 130 fluctuates relatively slowly as it controls the phase-locked loop 401 (FIG. 1). The time constant of this filter can be adjusted to set how much of the phase error correction is accomplished by the analog phase error signal 130 and the phase-locked loop 401, and how much is left for the digital phase and frequency correction circuitry described above to handle.

While the above-described circuitry eliminates much of the phase and frequency errors by adjusting the operation of the A-to-D convertor 106, the circuitry cannot eliminate all errors. The circuitry has available only the phase errors at the beginning of previously-scanned lines and at the beginning of the current line. The circuitry cannot accurately predict in every case what will happen to the phase during the current scanning line. Accordingly, the final correction process, which eliminates the remaining phase errors, is postponed until the digitized video signal is re-converted into an analog video signal suitable for broadcast use by the D-to-A convertor 120.

The phase error values measured at the start of each horizontal line are fed into the phase error memory 154 (FIG. 1) where they are stored, with one sample corresponding to the phase error at the end of each line, at the same time that the corresponding digitized video information for each horizontal line is stored within and processed by the time base corrector memory and variable speed picture processor 112. As the digitized values are fed out of the processor 112 over the line 114 and into the FIFO memory 116, and from the memory 116 over the line 118 to the digital-to-analog convertor 120, the phase error values in the memory 154 are fed over the line 156 to the phase error compensator 800, the details of which appear in FIG. 8.

Briefly described in overview, the phase error compensator 800 is a custom microprocessor that is constructed from conventional bit-sliced arithmetic logic elements and pipeline registers. It is able to accept and store multiple samples of the phase error values. It can interpolate between these values and compute the phase error compensation that is needed at every point along each horizontal line by means of a "curve fitting" process, from the four points defined by the two color bursts immediately preceding, and the two color bursts immediately following, the line to be corrected. The phase error compensator 800 fits a smooth phase error correction curve through sets of four phase error values for each line and then extracts from that curve, on the portion of the curve that corresponds to the portion of the scanning line that is being presented to the video output 128, the necessary phase adjustments that must be made to the output circuit phase-locked oscillator 164 (FIG. 1) to control the digital-to-analog convertor 120 in such a manner as to cancel out the remaining phase errors in the digitized video signal through its operation.

The phase error compensator 800 is also designed so that it corrects for errors which result when the variable speed picture processor 112 processes the digitized video to compensate for variable speed processing of the incoming video signal, as when slow motion or fast motion effects are generated. This filtering typically involves the use of digital comb filters to separate the chrominance from the luminance and then processing of the chrominance to correct for color phase errors between fields or frames and processing of the luminance to correct for interlace mismatch between fields and frames. Briefly described, whatever type of digital signal processing is performed by the picture processor 112 upon the elements of a series of lines, that same type of processing is performed by the compensator 800 upon the phase error values for those lines. Thus, the transfer function of the compensator 800 is adjusted to the transfer function of the picture processor 112, the latter being determined by the variable speed playback operation of the tape player 102. If the picture processor 112 takes digital samples from multiple lines, weights them, and combines them through the action of a line averaging filter, such as a comb filter, then the phase error compensator 800 also takes phase error values from multiple lines, weights them, and combines them in a similar manner. This combining of the error values from different lines causes what would have been a rapid response of the phase error compensator 800 to a sharply-defined incoming phase error, to be transformed into a more gradual response that corresponds to the gradual phase error changes that actually appear at the output of the picture processor 112 due to its processing of the video samples. If the picture processor combines lines in such a manner that the data value produced on a given line is a weighted sum of values taken from other lines that, in effect, pushes forward or back the time position information on a scanning line, then the phase error compensator 800 similarly sums weighted error values taken from multiple lines with the weighting similarly causing the values to be shifted forward or back in time in a corresponding manner. The phase error compensator 800 thus applies the same essential type of filtering to the phase error values that the processor 112 applies to the digitized video signal and thereby causes the phase error values to adjust the phase of the oscillator 164 (FIG. 1) in a way that keeps the error correction action performed by the D-to-A convertor 120 (FIG. 1) in sync with the nature of the phase error in the video signal that the D-to-A convertor 120 is processing.

Referring now to FIG. 8, the details of the phase error compensator 800 are shown. The MEMORY DATA 156 flowing from the phase error memory 154 (FIG. 1) enters a pipeline register 804 which is clocked to load an error value by the VEL-COMP-READA signal 805 once during each horizontal timing interval. In the preferred embodiment of the invention, the pipeline register 804 is part number 29C520 manufactured by Logic Devices, Inc. It contains four serially-connected data registers into which data values may be fed serially and out of which they may be retrieved individually under the control of output selection inputs S1 and S0. It can also operate as a "pipeline" register with data values being serially shifted through its registers. The data output 806 of the pipeline register 804 is fed into eight of the address leads of weighting ROM 808 where the value may be multiplied by an appropriate constant determined by the output control 900 (FIG. 9). The remaining address inputs K0, K1, K2, and K3 on lines 810 of the weighting ROM 808 select the weighting constant and are generated by the output control 900. A weighted output value is presented by the ROM 808 as an 8-bit data value at an output 812 which flows into an arithmetic logic unit 814.

In the preferred embodiment of the invention, the arithmetic logic unit 814 is formed from two Fairchild arithmetic logic units, part numbers F 382, hooked in parallel to form an 8-bit ALU system. The unit 814 is also controlled by the output control 900 (FIG. 9) which provides inputs to S1 and S0 that select an operation and to CI, the carry input. The S1 input comes from the ALUM1 signal 850, and the S0 input comes from the ALUM0 signal 852. The carry input is the exclusive-OR of these two signals.

The output 816 flowing from the arithmetic logic unit 814 is fed into two pipeline registers 818 and 820 which are identical to the pipeline register 804 described previously. These registers also have I0 and I1 controls that permit incoming data to be directed to any internal register, and they are clocked by the REF FSC signal 1012. The output 821 of the pipeline register 818 feeds back into the alternate input of the arithmetic logic unit 814 so that it may be added to the values presented at the output of the weighting ROM 808 and then stored within either of the pipeline registers 818 and 820. The output 823 of the pipeline register 820 is fed back and joined to the bus 806 flowing from the pipeline register 804 so that the output value of the register 820 may be fed through the weighting ROM 808 back into the arithmetic logic unit 814. Signals OEB 822 and OEC 824 determine which of the pipeline registers 804 and 820 has access to the bus 806 and to the input of the weighting ROM 808, and the logic in FIG. 9 only allows one of the two signals OEC and UEB to enable its corresponding pipeline register at any one time. Briefly described in overview, phase error values presented by the phase error memory 154 (FIG. 1) flow serially into the pipeline register 804 and are stored, in FIFO manner, so that phase error values from four lines are present within the register 804 at any given time. These values may then be weighted by the ROM 808 and summed by the arithmetic logic unit 814 and pipeline register 818 to provide newly-computed values that are derived from the error values for multiple lines. The phase error values may also be fed through the pipeline register 820 and may then be weighted and added to other values flowing from the pipeline register 818, and in this manner the compensator 800 can perform multiplication. The precise nature of the filtering that is performed by the compensator 800 is determined by the precise nature of the picture processing that is performed by the picture processor 112. Whatever happens to video data values at corresponding positions on successive horizontal lines when those data values are processed by the processor 112, essentially that same process is applied by the phase compensator 800 to the phase error values for those same lines, with the possible exception of processes having minimal deleterious effect upon the time base correction process. Thus, the picture processor 112 may digitally combine information taken from a larger number of lines than the compensator 800 needs to combine simply because the addition of more lines to the combining process by the phase compensator 800 may produce only a minimal improvement in the operation of the time base corrector 100 and may therefore be unnecessary.

A very simple example will illustrate the nature of the filtering techniques that are applied by the phase error compensator 800. Assume, for example, that three successive input lines are processed and contain no phase error at the start of each line. These lines are immediately followed by three lines all of which contain ten degrees of positive phase error, thus indicating a sudden ten degree shift in the frequency of the color burst signal that is associated with the incoming video. In the course of these lines being processed by the variable speed picture processor 112, assume that the variable speed picture processor 112 sums and averages the information on pairs of adjoining lines to correct for some error that is caused by variable speed processing. Accordingly, the first two lines of video that flow out of the picture processor 112 have no phase error associated with them, but the third line has a five-degree phase error shift which results because it is the sum of a line having no error and a line having a ten-degree error. Subsequent lines then have a ten-degree error shift. This example, which is simpler than the actual picture processing carried out by the processor 112, suffices to illustrate the principles of the invention and how it would be applied to compensate for any type of picture processing.

If the digital phase error values are applied to the digital-to-analog convertor 120 directly with no compensation, then the line having a five-degree phase error is not properly corrected, for the phase error values go directly from no correction over each line to a ten-degree correction and do not correct this line by the proper five-degree amount. Accordingly, the phase error compensator 800 averages the phase error values from successive lines by summing half the value of adjoining pairs and by using the resulting sums to control the output circuitry. In this manner, the phase error values used by the compensator 800 in controlling the phase locked oscillator 164 have phase errors of zero degrees, zero degrees, five degrees, ten degrees, and so on. These are the proper values required to allow the digital-to-analog convertor 120 to best correct for phase errors. In the preferred embodiment of the invention, up to six lines may be simultaneously processed digitally by the picture processor 112. The phase error compensator does not need to be so precise, so it may correspondingly process and sum up to four phase error values to produce corrected phase error values to control the phase locked oscillator 164.

To correct for luminance signal errors that result from improper interlace match between adjacent fields of video, three possible different filtering actions by the picture processor 112 may occur: no correction, if the interlace is proper; a conversion of an even interlace into an odd one; or a conversion of an odd interlace into an even one. Whenever the picture processor 112 makes such a correction, the phase error compensator 800 must make a similar correction. The video processing done to correct for interlace errors involves typically combining luminance information taken from four lines, with one of the middle two of the four lines being weighted quite heavily and the other three lines being weighted quite lightly. This processing of the video produces either an advance or a delay in the presentation of the video at the system output. A similar phase advance or delay must be introduced into the stream of phase error values by the phase error compensator 800 which must assign comparable weighting values to the phase error values for four distinct lines stored within the pipeline register 804 and then sum those values to produce a phase-shifted, filtered output. This type of correction affects the time of presentation of the error values, and the net effect is to introduce a phase shift into the error phase signal equivalent and to reduce slightly the amplitude of high frequency components of the phase error signal equivalent.

To correct for chrominance signal errors that result from improper color signal phase between adjacent fields or frames of video, the picture processor 112 has two options: Either the chrominance is not altered, or the chrominance is extracted, its phase is reversed, and it is reintroduced into the combined video. This process of phase reversal can attenuate high frequencies in the vertical components of the video, essentially introducing a notch filter at 7.8 KHz. To compensate for this, the phase error compensator 800 must combine weighted values of the phase errors taken from adjacent lines together to produce a comparable notch filtering effect.

In general, the phase error compensator 800 must correct both the frequency response and the phase or timing response of the phase error signal essentially in the same way that the picture processor 112 corrects the frequency response and the phase or timing of the digitized video. In other words, compensator 800 and picture processor 112 are arranged to have corresponding signal transfer characteristics. The filtering modes that are implemented in the preferred embodiment of the invention are the following: The picture processor 112 uses digital comb filters to separate the chrominance and luminance components of the video from each other. With respect to the chrominance, it may be necessary to reverse its phase and add it back into the luminance to thereby compensate for an error in the color signal phase of successive fields of video. This process can produce no attenuation, or it can attenuate the high frequencies in the vertical components of the video, essentially introducing a notch filter at 7.8 KHz. With respect to the luminance, the interlace may be proper, in which case there is no conversion; or an odd field may have to be converted into an even one or an even one into an odd one. This produces three possible luminance cases. Taken together with the two possible chrominance cases, we have the need for six different possible algorithms that must be selectable by the phase error compensator 800 for the processing of phase error values for any given field of video.

Of course, it will be appreciated that line averaging filters other than comb filters can be utilized in embodiments where no objectionable residual phase errors remain after the timing error correction performed at the A to D convertor 106. Moreover, the aforedescribed corresponding transfer function adjustment of the phase error compensator 800 can be utilized in embodiments where all time-variant phase or velocity error correction is performed after the video signal is processed by picture processor 112.

Algorithm selection is accomplished by the output control (FIG. 9) which selects different filtering programs stored in ROMs depending upon what type of video signal processing is being applied to the field currently being processed by the processor 112. A register 902, having five outputs, and a counter 904, having 6 outputs, together generate eleven address signals for a pair of ROMs and registers 906 and 908 (2K by 8-bit ROMs) which generate all of the signals used to control the logic shown in FIG. 8. A 3-to-8 decoder 910 accepts three of the outputs from the register 906 and decodes them into four signals for the compensator 800 (FIG. 8) and a load signal 912 which controls the resetting of the counter 904. The signals flowing into the register 902 from the picture processor 112 control which filtering program is selected within the ROMs 906 and 908 and used to control the phase error compensator 800. The counter 904 sequences through the selected program to control the actual filtering process.

The HSQWV signal is a square wave that indicates generally when each horizontal retrace interval occurs and thereby permits preparatory computations to be made (curve-fitting computations, for example) during retrace. During each horizontal scan, starting when the REF.H signal indicates the precise start of a line, the compensator 800 continually sums small values corresponding to the rate of phase drift. A positive value signals a positive phase drift. A SIGN bit 158 of the value presented at 812 by the weighting ROM 808 passes to the sine wave generator 1000 (FIG. 10) where it determines the direction of count of an up/down counter 1020 that corrects the D to A convertor 120 phase. Each time the counter in the arithmetic logic unit 814, which is an 8-bit counter, overflows, the CARRY bit 160 is provided by the arithmetic logic unit and is coupled to FIG. 10. This carry bit increments or decrements the up/down counter 1020, which is an 8-bit counter. Each time the arithmetic logic unit counter overflows, the counter 1020 increments or decrements depending on the direction of overflow. Therefore, the two 8-bit counters cooperate to count over a range corresponding to that of a 16-bit counter. In this manner, counter 1020 is able to advance or retard the phase of the D to A convertor 120 in increments of about ⅛ of a degree. In this manner, the compensator 800 does curve fitting and weighting during blanking intervals and real-time phase correction during each horizontal line interval of video information.

The remaining signals entering the register 902 select different programs. The C.INVERT signal, from the picture processor 112, signals chrominance inversion picture processing to correct for color phase error between fields or frames. The Y.INTERP signal, from the same source, signals luminance (or Y) correction for interlace mismatch, with the V.SHIFT UP signal indicating the direction of the correction (odd to even field or even to odd field). The counter 904 can be reset to zero count by a program-generated LOAD signal 912, and it may also be halted by a program-generated PAUSE signal 913 until freed by fluctuation of a signal flowing into the register 902. When the output control 900 pauses, the phase error compensator may continue to function, repeatedly generating sums as explained above to correct the phase of the phase locked oscillator 164 in real time.

The details of the sine wave generator 1000 are set forth in FIG. 10. The sine wave generator 1000 applies a digital phase value to a ROM and register 1002 four times during each color subcarrier cycle. The ROM and register 1002 contains a sine lookup table similar to that contained in the ROM and register 414 (FIG. 4), and the ROM and register 1002 thereby converts the phase values applied to the address inputs of the ROM and register 1002 into sine values. The sine values are supplied to a register and D-to-A converter 1004 which supplies an analog signal at 1006. The signal 1006 then is filtered by a low-pass filter 1008 to provide a sine wave, which is applied through a transformer 1010 to a limiter 1046 out of which flows the square wave signal 162. This signal 162 then controls the operation of the D-to-A convertor 120 in FIG. 1 via the phase-locked oscillator 164.

The two most significant address inputs 1012 and 1014 of the ROM and register 1002 are coupled to a pair of D-type flip-flops 1006 and 1018 which are interconnected to form a "divide-by-4" counter. This counter is driven by the REF 4FSC signal 109 which is applied to the clock inputs of the two flip-flops 1016 and 1018. The Q output of the flip-flop 1016 is applied to the D input of the flip-flop 1018, and the inverted Q output of the flip-flop 1018 is applied to the D input of the flip-flop 1016. This arrangement forms a Johnson counter of conventional design. In four counts, this counter generates the REF FSC signal 1012 and a delayed version of that same signal, called the REF DFSC signal 1014. These signals are applied to the most significant inputs of the ROM and register 1002. The ROM and register 1002 is programmed differently than the ROM and register 414 in FIG. 4 to compensate for the difference between the REF FSC signal 1012 and REF DFSC signal 1014 (that drive the ROM and register 1002) and the VCO FSC 452 and VCO 2FSC 454 signals (that drive the ROM and register 414 in FIG. 4). But in both cases, these signals generate four different memory address ranges in which sine wave values are stored, and hence the two circuits are functionally similar. The address ranges are simply switched around due to the different nature of the timing signals.

Assuming for the moment that the up/down counter 1020 presents a zero count, the ROM and register 1002 has data presented to its address inputs which represent phase angles of 0 degrees, 90 degrees, 180 degrees and 270 degrees and which are translated into sine values that produce a square wave at 162 having zero phase shift. The phase of this square wave is then varied by the count value presented by the up/down counter 1020 which feeds the less-significant eight address inputs of the ROM and register 1002. The SIGN bit 158 generated by the phase error compensator 800 (FIG. 8) determines the direction of counting, and the CARRY bit 160 from the same source determines when the counter is incremented or decremented. By manipulating the SIGN bit 158 and CARRY bit 160, the phase error compensator 800 can add to or subtract from the phase error value that is included in the square wave which appears at 162. A RESET PHASE signal 1026 is actuated at the start of every line to clear the up/down counter 1020 and thereby set the phase compensation to zero at the start of each line. The up/down counter 1020 is driven by the REF FSC signal 1012 that flows from the flip-flop 1016.

Some of the read-only memories used in implementing the preferred embodiment of the present invention contain programs in binary code that control the operations of many of the circuits which have been described. Other read-only memories contain data values used for multiplication or for trigonometric conversion. While the general principals of operation have been set forth in the case of each of these circuits, the precise details of how the system operates in the preferred embodiment may be determined by examining the program code which is set forth below. All of the tables that follow contain an address, written as an octal number, in the left-hand column. Each address is followed by 16 data bytes, organized left-to-right as eight two-byte pairs. Each pair of bytes is presented as four hexadecimal digits, with the byte in the pair having the lowest address presented to the right in the pair, and with the byte in the pair having the higher address presented to the left. Hence, the members of a byte pair are organized right-to-left, while the pairs are arranged left-to-right, in order of increasing ROM address. An asterisk indicates that one or more rows have been omitted because they are identical to a previous row. So each row presents sixteen byte values corresponding to sequential memory locations (relative to the indicated address) of 1, 0, 3, 2, 5, 4, 7, 6, 9, 8, 11, 10, 13, 12, 15, 14. Note again the indicated addresses are in octal, while the data bytes are in hexadecimal.

TABLE 1

U54: ROM And Latch 606 (FIG. 6)

Burst weighting coefficient control ROM.

| address | data | | | | | | | |
|---|---|---|---|---|---|---|---|---|
| 0000000 | 0000 | 0000 | 0000 | 0000 | 0000 | 0000 | 0000 | 0000 |
| * | | | | | | | | |
| 0001000 | e9e9 | e9e9 | e9e9 | e9e9 | e9e9 | e9e9 | e9e9 | e9e9 |
| 0001020 | eaea | ebeb | ecec | eded | eeee | efef | f0f0 | f1f1 |
| 0001040 | f2f2 | f3f3 | f4f4 | f5f5 | f6f6 | f7f7 | f8f8 | f9f9 |
| 0001060 | fafa | fbfb | fcfc | fdfd | fefe | ffff | 0100 | 0201 |
| 0001100 | 0302 | 0403 | 0504 | 0605 | 0706 | 0807 | 0908 | 0a09 |
| 0001120 | 0b0a | 0c0b | 0d0c | 0e0d | 0f0e | 100f | 1110 | 1211 |
| 0001140 | 1312 | 1413 | 1514 | 1615 | 1716 | 1717 | 1717 | 1717 |
| 0001160 | 1717 | 1717 | 1717 | 1717 | 1717 | 1717 | 1717 | 1717 |
| * | | | | | | | | |
| 0001420 | 1616 | 1515 | 1414 | 1313 | 1212 | 1111 | 1010 | 0f0f |

TABLE 1-continued
U54: ROM And Latch 606 (FIG. 6)

| address | | | | | | | | |
|---|---|---|---|---|---|---|---|---|
| 0001440 | 0e0e | 0d0d | 0c0c | 0b0b | 0a0a | 0909 | 0808 | 0707 |
| 0001460 | 0606 | 0505 | 0404 | 0303 | 0202 | 0101 | ff00 | feff |
| 0001500 | fdfe | fcfd | fbfc | fafb | f9fa | f8f9 | f7f8 | f6f7 |
| 0001520 | f5f6 | f4f5 | f3f4 | f2f3 | f1f2 | f0f1 | eff0 | eeef |
| 0001540 | edee | eced | ebec | eaeb | e9ea | e9e9 | e9e9 | e9e9 |
| 0001560 | e9e9 | e9e9 | e9e9 | e9e9 | e9e9 | e9e9 | e9e9 | e9e9 |
| * | | | | | | | | |
| 0002000 | bbbb | bbbb | bbbb | bbbb | bbbb | bbbb | bbbb | bcbb |
| 0002020 | bfbe | c2c1 | c5c4 | c8c7 | cbca | cecd | d1d0 | d4d3 |
| 0002040 | d7d6 | dad9 | dddc | e0df | e3e2 | e6e5 | e9e8 | eceb |
| 0002060 | efee | f2f1 | f5f4 | f8f7 | fbfa | fefd | 0200 | 0503 |
| 0002100 | 0806 | 0b09 | 0e0c | 110f | 1412 | 1715 | 1a18 | 1d1b |
| 0002120 | 201e | 2321 | 2624 | 2927 | 2c2a | 2f2d | 3230 | 3533 |
| 0002140 | 3836 | 3b39 | 3e3c | 413f | 4442 | 4545 | 4545 | 4545 |
| 0002160 | 4545 | 4545 | 4545 | 4545 | 4545 | 4545 | 4545 | 4545 |
| * | | | | | | | | |
| 0002400 | 4545 | 4545 | 4545 | 4545 | 4545 | 4545 | 4545 | 4445 |
| 0002420 | 4142 | 3e3f | 3b3c | 3839 | 3536 | 3233 | 2f30 | 2c2d |
| 0002440 | 292a | 2627 | 2324 | 2021 | 1d1e | 1a1b | 1718 | 1415 |
| 0002460 | 1112 | 0e0f | 0b0c | 0809 | 0506 | 0203 | fe00 | fbfd |
| 0002500 | f8fa | f5f7 | f2f4 | eff1 | ecee | e9eb | e6e8 | e3e5 |
| 0002520 | e0e2 | dddf | dadc | d7d9 | d4d6 | d1d3 | ced0 | cbcd |
| 0002540 | c8ca | c5c7 | c2c4 | bfc1 | bcbe | bbbb | bbbb | bbbb |
| 0002560 | bbbb | bbbb | bbbb | bbbb | bbbb | bbbb | bbbb | bbbb |
| * | | | | | | | | |
| 0003000 | a4a4 | a4a4 | a4a4 | a4a4 | a4a4 | a4a4 | a4a4 | a6a4 |
| 0003020 | aaa8 | aeac | b2b0 | b6b4 | bab8 | bebc | c2c0 | c6c4 |
| 0003040 | cac8 | cecc | d2d0 | d6d4 | dad8 | dedc | e2e0 | e6e4 |
| 0003060 | eae8 | eeec | f2f0 | f6f4 | faf8 | fefc | 0200 | 0604 |
| 0003100 | 0a08 | 0e0c | 1210 | 1614 | 1a18 | 1e1c | 2220 | 2624 |
| 0003120 | 2a28 | 2e2c | 3230 | 3634 | 3a38 | 3e3c | 4240 | 4644 |
| 0003140 | 4a48 | 4e4c | 5250 | 5654 | 5a58 | 5c5c | 5c5c | 5c5c |
| 0003160 | 5c5c | 5c5c | 5c5c | 5c5c | 5c5c | 5c5c | 5c5c | 5c5c |
| * | | | | | | | | |
| 0003400 | 5c5c | 5c5c | 5c5c | 5c5c | 5c5c | 5c5c | 5c5c | 5a5c |
| 0003420 | 5658 | 5254 | 4e50 | 4a4c | 4648 | 4244 | 3e40 | 3a3c |
| 0003440 | 3638 | 3234 | 2e30 | 2a2c | 2628 | 2224 | 1e20 | 1a1c |
| 0003460 | 1618 | 1214 | 0e10 | 0a0c | 0608 | 0204 | fe00 | fafc |
| 0003500 | f6f8 | f2f4 | eef0 | eaec | e6e8 | e2e4 | dee0 | dadc |
| 0003520 | d6d8 | d2d4 | ced0 | cacc | c6c8 | c2c4 | bec0 | babc |
| 0003540 | b6b8 | b2b4 | aeb0 | aaac | a6a8 | a4a4 | a4a4 | a4a4 |
| 0003560 | a4a4 | a4a4 | a4a4 | a4a4 | a4a4 | a4a4 | a4a4 | a4a4 |
| * | | | | | | | | |
| 0004000 | | | | | | | | |

TABLE 2
U36: Phase Multiplier ROM 302 (FIG. 3)

Phase to frequency scaling ROM.

| address | data | | | | | | | |
|---|---|---|---|---|---|---|---|---|
| 0000000 | 0000 | 0101 | 0202 | 0303 | 0404 | 0505 | 0606 | 0707 |
| 0000020 | 0808 | 0909 | 0a0a | 0b0b | 0c0c | 0d0d | 0e0e | 0f0f |
| 0000040 | 1010 | 1111 | 1212 | 1313 | 1414 | 1515 | 1616 | 1717 |
| 0000060 | 1818 | 1919 | 1a1a | 1b1b | 1c1c | 1d1d | 1e1e | 1f1f |
| 0000100 | 2020 | 2121 | 2222 | 2323 | 2424 | 2525 | 2626 | 2727 |
| 0000120 | 2828 | 2929 | 2a2a | 2b2b | 2c2c | 2d2d | 2e2e | 2f2f |
| 0000140 | 3030 | 3131 | 3232 | 3333 | 3434 | 3535 | 3636 | 3737 |
| 0000160 | 3838 | 3939 | 3a3a | 3b3b | 3c3c | 3d3d | 3e3e | 3f3f |
| 0000200 | c1c0 | c2c1 | c3c2 | c4c3 | c5c4 | c6c5 | c7c6 | c8c7 |
| 0000220 | c9c8 | cac9 | cbca | cccb | cdcc | cecd | cfce | d0cf |
| 0000240 | d1d0 | d2d1 | d3d2 | d4d3 | d5d4 | d6d5 | d7d6 | d8d7 |
| 0000260 | d9d8 | dad9 | dbda | dcdb | dddc | dedd | dfde | e0df |
| 0000300 | e1e0 | e2e1 | e3e2 | e4e3 | e5e4 | e6e5 | e7e6 | e8e7 |
| 0000320 | e9e8 | eae9 | ebea | eceb | edec | eeed | efee | f0ef |
| 0000340 | f1f0 | f2f1 | f3f2 | f4f3 | f5f4 | f6f5 | f7f6 | f8f7 |
| 0000360 | f9f8 | faf9 | fbfa | fcfb | fdfc | fefd | fffe | 00ff |
| 0000400 | 0000 | 0000 | 0000 | 0000 | 0000 | 0000 | 0000 | 0000 |
| * | | | | | | | | |
| 0001000 | | | | | | | | |

TABLE 3
U44: ROM and Latch 414 (FIG. 4)

Sine table lockup ROM.

| address | data | | | | | | | |
|---|---|---|---|---|---|---|---|---|
| 0000000 | 8180 | 8282 | 8483 | 8585 | 8786 | 8988 | 8a89 | 8c8b |
| 0000020 | 8d8d | 8f8e | 9090 | 9291 | 9493 | 9594 | 9796 | 9897 |
| 0000040 | 9a99 | 9b9b | 9d9c | 9e9e | a09f | a1a1 | a3a2 | a4a4 |

TABLE 3-continued

U44: ROM and Latch 414 (FIG. 4)

| | | | | | | | |
|---|---|---|---|---|---|---|---|
| 0000060 | a6a5 | a7a7 | a9a8 | aaaa | acab | adad | afae | b0b0 |
| 0000100 | b2b1 | b3b2 | b5b4 | b6b5 | b7b7 | b9b8 | baba | bcbb |
| 0000120 | bdbc | bebe | c0bf | c1c0 | c2c2 | c4c3 | c5c4 | c6c6 |
| 0000140 | c8c7 | c9c8 | caca | cccb | cdcc | cece | cfcf | d1d0 |
| 0000160 | d2d1 | d3d2 | d4d4 | d5d5 | d7d6 | d8d7 | d9d8 | dad9 |
| 0000200 | dbdb | dcdc | dddd | dede | dfdf | e0e0 | e1e1 | e2e2 |
| 0000220 | e3e3 | e4e4 | e5e5 | e6e6 | e7e7 | e8e8 | e9e9 | eaea |
| 0000240 | ebea | eceb | edec | eded | eeee | efef | f0ef | f1f0 |
| 0000260 | f1f1 | f2f2 | f3f2 | f3f3 | f4f4 | f5f4 | f5f5 | f6f6 |
| 0000300 | f7f6 | f7f7 | f8f7 | f8f8 | f9f9 | f9f9 | fafa | fafa |
| 0000320 | fbfa | fbfb | fcfb | fcfc | fcfc | fdfd | fdfd | fdfd |
| 0000340 | fefe | fefe | fefe | fefe | ffff | ffff | ffff | ffff |
| 0000360 | ffff | ffff | ffff | ffff | ffff | ffff | ffff | ffff |
| * | | | | | | | | |
| 0000420 | ffff | ffff | ffff | ffff | feff | fefe | fefe | fefe |
| 0000440 | fdfe | fdfd | fdfd | fcfd | fcfc | fcfc | fbfb | fbfb |
| 0000460 | fafa | fafa | f9fa | f9f9 | f8f9 | f8f8 | f7f7 | f7f7 |
| 0000500 | f6f6 | f5f6 | f5f5 | f4f4 | f3f4 | f3f3 | f2f2 | f1f2 |
| 0000520 | f1f1 | f0f0 | efef | eeef | edee | eded | ecec | ebeb |
| 0000540 | eaea | e9ea | e8e9 | e7e8 | e6e7 | e5e6 | e4e5 | e3e4 |
| 0000560 | e2e3 | e1e2 | e0e1 | dfe0 | dedf | ddde | dcdd | dbdc |
| 0000600 | dadb | d9d9 | d8d8 | d7d7 | d5d6 | d4d5 | d3d4 | d2d2 |
| 0000620 | d1d1 | cfd0 | cecf | cdce | cccc | cacb | c9ca | c8c8 |
| 0000640 | c6c7 | c5c6 | c4c4 | c2c3 | c1c2 | c0c0 | bebf | bdbe |
| 0000660 | bcbc | babb | b9ba | b7b8 | b6b7 | b5b5 | b3b4 | b2b2 |
| 0000700 | b0b1 | afb0 | adae | acad | aaab | a9aa | a7a8 | a6a7 |
| 0000720 | a4a5 | a3a4 | a1a2 | a0a1 | 9e9f | 9d9e | 9b9c | 9a9b |
| 0000740 | 9899 | 9797 | 9596 | 9494 | 9293 | 9091 | 8f90 | 8d8e |
| 0000760 | 8c8d | 8a8b | 8989 | 8788 | 8586 | 8485 | 8283 | 8182 |
| 0001000 | 7f80 | 7e7e | 7c7d | 7b7b | 797a | 7778 | 7677 | 7475 |
| 0001020 | 7373 | 7172 | 7070 | 6e6f | 6c6d | 6b6c | 696a | 6869 |
| 0001040 | 6667 | 6565 | 6364 | 6262 | 6061 | 5f5f | 5d5e | 5c5c |
| 0001060 | 5a5b | 5959 | 5758 | 5656 | 5455 | 5353 | 5152 | 5050 |
| 0001100 | 4e4f | 4d4e | 4b4c | 4a4b | 4949 | 4748 | 4646 | 4445 |
| 0001120 | 4344 | 4242 | 4041 | 3f40 | 3e3e | 3c3d | 3b3c | 3a3a |
| 0001140 | 3839 | 3738 | 3636 | 3435 | 3334 | 3232 | 3131 | 2f30 |
| 0001160 | 2e2f | 2d2e | 2c2c | 2b2b | 292a | 2829 | 2728 | 2627 |
| 0001200 | 2525 | 2424 | 2323 | 2222 | 2121 | 2020 | 1f1f | 1e1e |
| 0001220 | 1d1d | 1c1c | 1b1b | 1a1a | 1919 | 1818 | 1717 | 1616 |
| 0001240 | 1516 | 1415 | 1314 | 1313 | 1212 | 1111 | 1011 | 0f10 |
| 0001260 | 0f0f | 0e0e | 0d0e | 0d0d | 0c0c | 0b0c | 0b0b | 0a0a |
| 0001300 | 090a | 0909 | 0809 | 0808 | 0707 | 0707 | 0606 | 0606 |
| 0001320 | 0506 | 0505 | 0405 | 0404 | 0404 | 0303 | 0303 | 0303 |
| 0001340 | 0202 | 0202 | 0202 | 0202 | 0101 | 0101 | 0101 | 0101 |
| 0001360 | 0102 | 0000 | 0000 | 0000 | 0000 | 0000 | 0000 | 0000 |
| 0001400 | 0000 | 0000 | 0000 | 0000 | 0000 | 0000 | 0000 | 0000 |
| 0001420 | 0101 | 0101 | 0101 | 0101 | 0201 | 0202 | 0202 | 0202 |
| 0001440 | 0302 | 0303 | 0303 | 0403 | 0404 | 0404 | 0505 | 0505 |
| 0001460 | 0606 | 0606 | 0706 | 0707 | 0807 | 0808 | 0909 | 0909 |
| 0001500 | 0a0a | 0b0a | 0b0b | 0c0c | 0d0c | 0d0d | 0e0e | 0f0e |
| 0001520 | 0f0f | 1010 | 1111 | 1211 | 1312 | 1313 | 1414 | 1515 |
| 0001540 | 1616 | 1716 | 1817 | 1918 | 1a19 | 1b1a | 1c1b | 1d1c |
| 0001560 | 1e1d | 1f1e | 201f | 2120 | 2221 | 2322 | 2423 | 2524 |
| 0001600 | 2625 | 2727 | 2828 | 2929 | 2b2a | 2c2b | 2d2c | 2e2e |
| 0001620 | 2f2f | 3130 | 3231 | 3332 | 3434 | 3635 | 3736 | 3838 |
| 0001640 | 3a39 | 3b3a | 3c3c | 3e3d | 3f3e | 4040 | 4241 | 4342 |
| 0001660 | 4444 | 4645 | 4746 | 4948 | 4a49 | 4b4b | 4d4c | 4e4e |
| 0001700 | 504f | 5150 | 5352 | 5453 | 5655 | 5756 | 5958 | 5a59 |
| 0001720 | 5c5b | 5d5c | 5f5e | 605f | 6261 | 6362 | 6564 | 6665 |
| 0001740 | 6867 | 6969 | 6b6a | 6c6c | 6e6d | 706f | 7170 | 7372 |
| 0001760 | 7473 | 7675 | 7777 | 7978 | 7b7a | 7c7b | 7e7d | 7f7e |
| 0002000 | | | | | | | | |

TABLE 4

U55: ROM 204 (FIG. 2)

Burst accumulate sequencer ROM.
address data

| | | | | | | | | |
|---|---|---|---|---|---|---|---|---|
| 0000000 | 0111 | 1111 | 7971 | 9999 | f9f9 | d9d9 | f9f9 | d9d9 |
| 0000020 | f9f9 | d9d9 | f9f9 | d9d9 | f9f9 | 9999 | 7979 | 150d |
| 0000040 | 1515 | 1515 | 1515 | 1515 | 1515 | 1515 | 1010 | 1111 |
| 0000060 | 1111 | 1111 | 1111 | 1111 | 1111 | 1111 | 1111 | 1111 |
| 0000100 | d9f9 | f9d9 | d9f9 | f9d9 | d9f9 | 0dd9 | 1515 | 1515 |
| 0000120 | 1515 | 1515 | 1515 | 1515 | 1015 | 1110 | 1111 | 1111 |
| 0000140 | 1111 | 1111 | 1111 | 1111 | 1111 | 1111 | 1111 | 1111 |
| * | | | | | | | | |
| 0000200 | 0111 | 1111 | 5951 | b9b9 | d9d9 | f9f9 | d9d9 | f9f9 |
| 0000220 | d9d9 | f9f9 | d9d9 | f9f9 | d9d9 | b9b9 | 5959 | 150d |
| 0000240 | 1515 | 1515 | 1515 | 1515 | 1515 | 1515 | 1010 | 1111 |

TABLE 4-continued

U55: ROM 204 (FIG. 2)

| 0000260 | 1111 | 1111 | 1111 | 1111 | 1111 | 1111 | 1111 | 1111 |
|---|---|---|---|---|---|---|---|---|
| 0000300 | f9d9 | d9f9 | f9d9 | d9f9 | f9d9 | 0df9 | 1515 | 1515 |
| 0000320 | 1515 | 1515 | 1515 | 1515 | 1015 | 1110 | 1111 | 1111 |
| 0000340 | 1111 | 1111 | 1111 | 1111 | 1111 | 1111 | 1111 | 1111 |
| *     |      |      |      |      |      |      |      |      |
| 0000400 | 0110 | 1111 | 7971 | 9999 | f9f9 | d9d9 | f9f9 | d9d9 |
| 0000420 | f9f9 | d9d9 | f9f9 | d9d9 | f9f9 | 9999 | 7979 | 150d |
| 0000440 | 1515 | 1515 | 1515 | 1515 | 1515 | 1515 | 1010 | 1111 |
| 0000460 | 1111 | 1111 | 1111 | 1111 | 1111 | 1111 | 1111 | 1111 |
| 0000500 | d9e0 | f9d9 | d9f9 | f9d9 | d9f9 | 0dd9 | 1515 | 1515 |
| 0000520 | 1515 | 1515 | 1515 | 1515 | 1015 | 1110 | 1111 | 1111 |
| 0000540 | 1111 | 1111 | 1111 | 1111 | 1111 | 1111 | 1111 | 1111 |
| *     |      |      |      |      |      |      |      |      |
| 0000600 | 0110 | 1111 | 5951 | b9b9 | d9d9 | f9f9 | d9d9 | f9f9 |
| 0000620 | d9d9 | f9f9 | d9d9 | f9f9 | d9d9 | b9b9 | 5959 | 150d |
| 0000640 | 1515 | 1515 | 1515 | 1515 | 1515 | 1515 | 1010 | 1111 |
| 0000660 | 1111 | 1111 | 1111 | 1111 | 1111 | 1111 | 1111 | 1111 |
| 0000700 | f9c0 | d9f9 | f9d9 | d9f9 | f9d9 | 0df9 | 1515 | 1515 |
| 0000720 | 1515 | 1515 | 1515 | 1515 | 1015 | 1110 | 1111 | 1111 |
| 0000740 | 1111 | 1111 | 1111 | 1111 | 1111 | 1111 | 1111 | 1111 |
| *     |      |      |      |      |      |      |      |      |
| 0001000 | 0111 | 1111 | 7971 | 9999 | f9f9 | d9d9 | f9f9 | d9d9 |
| 0001020 | f9f9 | d9d9 | f9f9 | d9d9 | f9f9 | 9999 | 7979 | 151d |
| 0001040 | 1515 | 1515 | 1515 | 1515 | 1515 | 1515 | 1010 | 1111 |
| 0001060 | 1111 | 1111 | 1111 | 1111 | 1111 | 1111 | 1111 | 1111 |
| 0001100 | d9f9 | f9d9 | d9f9 | f9d9 | d9f9 | 1dd9 | 1515 | 1515 |
| 0001120 | 1515 | 1515 | 1515 | 1515 | 1015 | 1110 | 1111 | 1111 |
| 0001140 | 1111 | 1111 | 1111 | 1111 | 1111 | 1111 | 1111 | 1111 |
| *     |      |      |      |      |      |      |      |      |
| 0001200 | 0111 | 1111 | 5951 | b9b9 | d9d9 | f9f9 | d9d9 | f9f9 |
| 0001220 | d9d9 | f9f9 | d9d9 | f9f9 | d9d9 | b9b9 | 5959 | 151d |
| 0001240 | 1515 | 1515 | 1515 | 1515 | 1515 | 1515 | 1010 | 1111 |
| 0001260 | 1111 | 1111 | 1111 | 1111 | 1111 | 1111 | 1111 | 1111 |
| 0001300 | f9d9 | d9f9 | f9d9 | d9f9 | f9d9 | 1df9 | 1515 | 1515 |
| 0001320 | 1515 | 1515 | 1515 | 1515 | 1015 | 1110 | 1111 | 1111 |
| 0001340 | 1111 | 1111 | 1111 | 1111 | 1111 | 1111 | 1111 | 1111 |
| *     |      |      |      |      |      |      |      |      |
| 0001400 | 0110 | 1111 | 7971 | 9999 | f9f9 | d9d9 | f9f9 | d9d9 |
| 0001420 | f9f9 | d9d9 | f9f9 | d9d9 | f9f9 | 9999 | 7979 | 151d |
| 0001440 | 1515 | 1515 | 1515 | 1515 | 1515 | 1515 | 1010 | 1111 |
| 0001460 | 1111 | 1111 | 1111 | 1111 | 1111 | 1111 | 1111 | 1111 |
| 0001500 | d9e0 | f9d9 | d9f9 | f9d9 | d9f9 | 1dd9 | 1515 | 1515 |
| 0001520 | 1515 | 1515 | 1515 | 1515 | 1015 | 1110 | 1111 | 1111 |
| 0001540 | 1111 | 1111 | 1111 | 1111 | 1111 | 1111 | 1111 | 1111 |
| *     |      |      |      |      |      |      |      |      |
| 0001600 | 0110 | 1111 | 5951 | b9b9 | d9d9 | f9f9 | d9d9 | f9f9 |
| 0001620 | d9d9 | f9f9 | d9d9 | f9f9 | d9d9 | b9b9 | 5959 | 151d |
| 0001640 | 1515 | 1515 | 1515 | 1515 | 1515 | 1515 | 1010 | 1111 |
| 0001660 | 1111 | 1111 | 1111 | 1111 | 1111 | 1111 | 1111 | 1111 |
| 0001700 | f9c0 | d9f9 | f9d9 | d9f9 | f9d9 | 1df9 | 1515 | 1515 |
| 0001720 | 1515 | 1515 | 1515 | 1515 | 1015 | 1110 | 1111 | 1111 |
| 0001740 | 1111 | 1111 | 1111 | 1111 | 1111 | 1111 | 1111 | 1111 |
| *     |      |      |      |      |      |      |      |      |
| 0002000 |      |      |      |      |      |      |      |      |

TABLE 5

U31: ROM And Latch 626 (FIG. 6)

Frequency and phase accumulator control ROM.

| address | data |  |  |  |  |  |  |  |
|---|---|---|---|---|---|---|---|---|
| 0000000 | 5455 | b511 | 55b5 | 5555 | 5555 | 5555 | 5555 | 5555 |
| 0000020 | 5456 | b612 | 56b6 | 5656 | 5656 | 5656 | 5656 | 5656 |
| 0000040 | 5457 | b713 | 57b7 | 5757 | 5757 | 5757 | 5757 | 5757 |
| 0000060 | 5454 | b410 | 54b4 | 5454 | 5454 | 5454 | 5454 | 5454 |
| 0000100 | 5859 | b911 | 59b9 | 5959 | 5959 | 5959 | 5959 | 5959 |
| 0000120 | 585a | ba12 | 5aba | 5a5a | 5a5a | 5a5a | 5a5a | 5a5a |
| 0000140 | 585b | bb13 | 5bbb | 5b5b | 5b5b | 5b5b | 5b5b | 5b5b |
| 0000160 | 5858 | b810 | 58b8 | 5858 | 5858 | 5858 | 5858 | 5858 |
| 0000200 | 5c5d | bd11 | 5dbd | 5d5d | 5d5d | 5d5d | 5d5d | 5d5d |
| 0000220 | 5c5e | be12 | 5ebe | 5e5e | 5e5e | 5e5e | 5e5e | 5e5e |
| 0000240 | 5c5f | bf13 | 5fbf | 5f5f | 5f5f | 5f5f | 5f5f | 5f5f |
| 0000260 | 5c5c | bc10 | 5cbc | 5c5c | 5c5c | 5c5c | 5c5c | 5c5c |
| 0000300 | 5051 | b111 | 51b1 | 5151 | 5151 | 5151 | 5151 | 5151 |
| 0000320 | 5052 | b212 | 52b2 | 5252 | 5252 | 5252 | 5252 | 5252 |
| 0000340 | 5053 | b313 | 53b3 | 5353 | 5353 | 5353 | 5353 | 5353 |
| 0000360 | 5050 | b010 | 50b0 | 5050 | 5050 | 5050 | 5050 | 5050 |
| 0000400 | 5455 | c541 | 55c5 | 7575 | 5555 | 5555 | 5555 | 5555 |
| 0000420 | 5456 | c642 | 56c6 | 7676 | 5656 | 5656 | 5656 | 5656 |
| 0000440 | 5457 | c743 | 57c7 | 7777 | 5757 | 5757 | 5757 | 5757 |

TABLE 5-continued

U31: ROM And Latch 626 (FIG. 6)

| 0000460 | 5454 | c440 | 54c4 | 7474 | 5454 | 5454 | 5454 | 5454 |
|---|---|---|---|---|---|---|---|---|
| 0000500 | 5859 | c941 | 59c9 | 7979 | 5959 | 5959 | 5959 | 5959 |
| 0000520 | 585a | ca42 | 5aca | 7a7a | 5a5a | 5a5a | 5a5a | 5a5a |
| 0000540 | 585b | cb43 | 5bcb | 7b7b | 5b5b | 5b5b | 5b5b | 5b5b |
| 0000560 | 5858 | c840 | 58c8 | 7878 | 5858 | 5858 | 5858 | 5858 |
| 0000600 | 5c5d | cd41 | 5dcd | 7d7d | 5d5d | 5d5d | 5d5d | 5d5d |
| 0000620 | 5c5e | ce42 | 5ece | 7e7e | 5e5e | 5e5e | 5e5e | 5e5e |
| 0000640 | 5c5f | cf43 | 5fcf | 7f7f | 5f5f | 5f5f | 5f5f | 5f5f |
| 0000660 | 5c5c | cc40 | 5ccc | 7c7c | 5c5c | 5c5c | 5c5c | 5c5c |
| 0000700 | 5051 | c141 | 51c1 | 7171 | 5151 | 5151 | 5151 | 5151 |
| 0000720 | 5052 | c242 | 52c2 | 7272 | 5252 | 5252 | 5252 | 5252 |
| 0000740 | 5053 | c343 | 53c3 | 7373 | 5353 | 5353 | 5353 | 5353 |
| 0000760 | 5050 | c040 | 50c0 | 7070 | 5050 | 5050 | 5050 | 5050 |
| 0001000 | 5655 | b511 | 55b5 | 5555 | 5555 | 5555 | 5555 | 5555 |
| 0001020 | 5656 | b612 | 56b6 | 5656 | 5656 | 5656 | 5656 | 5656 |
| 0001040 | 5657 | b713 | 57b7 | 5757 | 5757 | 5757 | 5757 | 5757 |
| 0001060 | 5654 | b410 | 54b4 | 5454 | 5454 | 5454 | 5454 | 5454 |
| 0001100 | 5a59 | b911 | 59b9 | 5959 | 5959 | 5959 | 5959 | 5959 |
| 0001120 | 5a5a | ba12 | 5aba | 5a5a | 5a5a | 5a5a | 5a5a | 5a5a |
| 0001140 | 5a5b | bb13 | 5bbb | 5b5b | 5b5b | 5b5b | 5b5b | 5b5b |
| 0001160 | 5a58 | b810 | 58b8 | 5858 | 5858 | 5858 | 5858 | 5858 |
| 0001200 | 5e5d | bd11 | 5dbd | 5d5d | 5d5d | 5d5d | 5d5d | 5d5d |
| 0001220 | 5e5e | be12 | 5ebe | 5e5e | 5e5e | 5e5e | 5e5e | 5e5e |
| 0001240 | 5e5f | bf13 | 5fbf | 5f5f | 5f5f | 5f5f | 5f5f | 5f5f |
| 0001260 | 5e5c | bc10 | 5cbc | 5c5c | 5c5c | 5c5c | 5c5c | 5c5c |
| 0001300 | 5251 | b111 | 51b1 | 5151 | 5151 | 5151 | 5151 | 5151 |
| 0001320 | 5252 | b212 | 52b2 | 5252 | 5252 | 5252 | 5252 | 5252 |
| 0001340 | 5253 | b313 | 53b3 | 5353 | 5353 | 5353 | 5353 | 5353 |
| 0001360 | 5250 | b010 | 50b0 | 5050 | 5050 | 5050 | 5050 | 5050 |
| 0001400 | 5655 | c541 | 55c5 | 7575 | 5555 | 5555 | 5555 | 5555 |
| 0001420 | 5656 | c642 | 56c6 | 7676 | 5656 | 5656 | 5656 | 5656 |
| 0001440 | 5657 | c743 | 57c7 | 7777 | 5757 | 5757 | 5757 | 5757 |
| 0001460 | 5654 | c440 | 54c4 | 7474 | 5454 | 5454 | 5454 | 5454 |
| 0001500 | 5a59 | c941 | 59c9 | 7979 | 5959 | 5959 | 5959 | 5959 |
| 0001520 | 5a5a | ca42 | 5aca | 7a7a | 5a5a | 5a5a | 5a5a | 5a5a |
| 0001540 | 5a5b | cb43 | 5bcb | 7b7b | 5b5b | 5b5b | 5b5b | 5b5b |
| 0001560 | 5a58 | c840 | 58c8 | 7878 | 5858 | 5858 | 5858 | 5858 |
| 0001600 | 5e5d | cd41 | 5dcd | 7d7d | 5d5d | 5d5d | 5d5d | 5d5d |
| 0001620 | 5e5e | ce42 | 5ece | 7e7e | 5e5e | 5e5e | 5e5e | 5e5e |
| 0001640 | 5e5f | cf43 | 5fcf | 7f7f | 5f5f | 5f5f | 5f5f | 5f5f |
| 0001660 | 5e5c | cc40 | 5ccc | 7c7c | 5c5c | 5c5c | 5c5c | 5c5c |
| 0001700 | 5251 | c141 | 51c1 | 7171 | 5151 | 5151 | 5151 | 5151 |
| 0001720 | 5252 | c242 | 52c2 | 7272 | 5252 | 5252 | 5252 | 5252 |
| 0001740 | 5253 | c343 | 53c3 | 7373 | 5353 | 5353 | 5353 | 5353 |
| 0001760 | 5250 | c040 | 50c0 | 7070 | 5050 | 5050 | 5050 | 5050 |
| 0002000 | | | | | | | | |

TABLE 6

U2: Weighting ROM 808 (FIG. 8)

Output velocity compensation processor weighting coefficient ROM.
address data

| 0000000 | 0100 | 0302 | 0504 | 0706 | 0908 | 0b0a | 0d0c | 0f0e |
|---|---|---|---|---|---|---|---|---|
| 0000020 | 1110 | 1312 | 1514 | 1716 | 1918 | 1b1a | 1d1c | 1f1e |
| 0000040 | 2120 | 2322 | 2524 | 2726 | 2928 | 2b2a | 2d2c | 2f2e |
| 0000060 | 3130 | 3332 | 3534 | 3736 | 3938 | 3b3a | 3d3c | 3f3e |
| 0000100 | 4140 | 4342 | 4544 | 4746 | 4948 | 4b4a | 4d4c | 4f4e |
| 0000120 | 5150 | 5352 | 5554 | 5756 | 5958 | 5b5a | 5d5c | 5f5e |
| 0000140 | 6160 | 6362 | 6564 | 6766 | 6968 | 6b6a | 6d6c | 6f6e |
| 0000160 | 7170 | 7372 | 7574 | 7776 | 7978 | 7b7a | 7d7c | 7f7e |
| 0000200 | 8180 | 8382 | 8584 | 8786 | 8988 | 8b8a | 8d8c | 8f8e |
| 0000220 | 9190 | 9392 | 9594 | 9796 | 9998 | 9b9a | 9d9c | 9f9e |
| 0000240 | a1a0 | a3a2 | a5a4 | a7a6 | a9a8 | abaa | adac | afae |
| 0000260 | b1b0 | b3b2 | b5b4 | b7b6 | b9b8 | bbba | bdbc | bfbe |
| 0000300 | c1c0 | c3c2 | c5c4 | c7c6 | c9c8 | cbca | cdcc | cfce |
| 0000320 | d1d0 | d3d2 | d5d4 | d7d6 | d9d8 | dbda | dddc | dfde |
| 0000340 | e1e0 | e3e2 | e5e4 | e7e6 | e9e8 | ebea | edec | efee |
| 0000360 | f1f0 | f3f2 | f5f4 | f7f6 | f9f8 | fbfa | fdfc | fffe |
| 0000400 | 0000 | 0000 | 0100 | 0101 | 0101 | 0101 | 0201 | 0202 |
| 0000420 | 0202 | 0202 | 0302 | 0303 | 0303 | 0303 | 0403 | 0404 |
| 0000440 | 0404 | 0404 | 0504 | 0505 | 0505 | 0505 | 0605 | 0606 |
| 0000460 | 0606 | 0606 | 0706 | 0707 | 0707 | 0707 | 0807 | 0808 |
| 0000500 | 0808 | 0808 | 0908 | 0909 | 0909 | 0909 | 0a09 | 0a0a |
| 0000520 | 0a0a | 0a0a | 0b0a | 0b0b | 0b0b | 0b0b | 0c0b | 0c0c |
| 0000540 | 0c0c | 0c0c | 0d0c | 0d0d | 0d0d | 0d0d | 0e0d | 0e0e |
| 0000560 | 0e0e | 0e0e | 0f0e | 0f0f | 0f0f | 0f0f | 100f | 1010 |
| 0000600 | f0f0 | f0f0 | f1f1 | f1f1 | f1f1 | f1f1 | f2f2 | f2f2 |
| 0000620 | f2f2 | f2f2 | f3f3 | f3f3 | f3f3 | f3f3 | f4f4 | f4f4 |
| 0000640 | f4f4 | f4f4 | f5f5 | f5f5 | f5f5 | f5f5 | f6f6 | f6f6 |

TABLE 6-continued

| U2: Weighting ROM 808 (FIG. 8) | | | | | | | |
|---|---|---|---|---|---|---|---|
| 0000660 | f6f6 | f6f6 | f7f7 | f7f7 | f7f7 | f7f7 | f8f8 | f8f8 |
| 0000700 | f8f8 | f8f8 | f8f8 | f9f9 | f9f9 | f9f9 | fafa | fafa |
| 0000720 | fafa | fafa | fbfb | fbfb | fbfb | fbfb | fcfc | fcfc |
| 0000740 | fcfc | fcfc | fdfd | fdfd | fdfd | fdfd | fefe | fefe |
| 0000760 | fefe | fefe | ffff | ffff | ffff | ffff | 0000 | 0000 |
| 0001000 | 0000 | 0000 | 0000 | 0000 | 0000 | 0000 | 0000 | 0000 |
| * | | | | | | | | |
| 0003020 | 0000 | 0000 | 0000 | 0000 | 0000 | 0101 | 0101 | 0101 |
| 0003040 | 0101 | 0101 | 0101 | 0101 | 0101 | 0101 | 0101 | 0101 |
| * | | | | | | | | |
| 0003100 | 0101 | 0101 | 0101 | 0101 | 0101 | 0101 | 0202 | 0202 |
| 0003120 | 0202 | 0202 | 0202 | 0202 | 0202 | 0202 | 0202 | 0202 |
| * | | | | | | | | |
| 0003200 | fefe | fefe | fefe | fefe | fefe | fefe | fefe | fefe |
| * | | | | | | | | |
| 0003260 | fefe | fefe | fffe | ffff | ffff | ffff | ffff | ffff |
| 0003300 | ffff | ffff | ffff | ffff | ffff | ffff | ffff | ffff |
| * | | | | | | | | |
| 0003340 | ffff | ffff | ffff | 00ff | 0000 | 0000 | 0000 | 0000 |
| 0003360 | 0000 | 0000 | 0000 | 0000 | 0000 | 0000 | 0000 | 0000 |
| 0003400 | 0000 | 0000 | 0000 | 0000 | 0000 | 0000 | ff00 | ffff |
| 0003420 | ffff | ffff | ffff | ffff | ffff | ffff | ffff | ffff |
| 0003440 | ffff | ffff | ffff | fefe | fefe | fefe | fefe | fefe |
| 0003460 | fefe | fefe | fefe | fefe | fefe | fefe | fefe | fdfe |
| 0003500 | fdfd | fdfd | fdfd | fdfd | fdfd | fdfd | fdfd | fdfd |
| 0003520 | fdfd | fdfd | fdfd | fdfd | fcfc | fcfc | fcfc | fcfc |
| 0003540 | fcfc | fcfc | fcfc | fcfc | fcfc | fcfc | fcfc | fcfc |
| 0003560 | fbfc | fbfb | fbfb | fbfb | fbfb | fbfb | fbfb | fbfb |
| 0003600 | 0505 | 0505 | 0505 | 0505 | 0505 | 0505 | 0505 | 0505 |
| 0003620 | 0404 | 0404 | 0404 | 0404 | 0404 | 0404 | 0404 | 0404 |
| 0003640 | 0404 | 0404 | 0404 | 0404 | 0304 | 0303 | 0303 | 0303 |
| 0003660 | 0303 | 0303 | 0303 | 0303 | 0303 | 0303 | 0303 | 0303 |
| 0003700 | 0303 | 0202 | 0202 | 0202 | 0202 | 0202 | 0202 | 0202 |
| 0003720 | 0202 | 0202 | 0202 | 0202 | 0202 | 0102 | 0101 | 0101 |
| 0003740 | 0101 | 0101 | 0101 | 0101 | 0101 | 0101 | 0101 | 0101 |
| 0003760 | 0101 | 0101 | 0000 | 0000 | 0000 | 0000 | 0000 | 0000 |
| 0004000 | 0000 | 0000 | 0000 | 0101 | 0101 | 0101 | 0101 | 0101 |
| 0004020 | 0201 | 0202 | 0202 | 0202 | 0202 | 0202 | 0303 | 0303 |
| 0004040 | 0303 | 0303 | 0303 | 0403 | 0404 | 0404 | 0404 | 0404 |
| 0004060 | 0404 | 0504 | 0505 | 0505 | 0505 | 0505 | 0505 | 0606 |
| 0004100 | 0606 | 0606 | 0606 | 0606 | 0706 | 0707 | 0707 | 0707 |
| 0004120 | 0707 | 0707 | 0808 | 0808 | 0808 | 0808 | 0808 | 0908 |
| 0004140 | 0909 | 0909 | 0909 | 0909 | 0909 | 0909 | 0909 | 0909 |
| * | | | | | | | | |
| 0004200 | f7f7 | f7f7 | f7f7 | f7f7 | f7f7 | f7f7 | f7f7 | f7f7 |
| * | | | | | | | | |
| 0004240 | f7f7 | f8f8 | f8f8 | f8f8 | f8f8 | f8f8 | f9f8 | f9f9 |
| 0004260 | f9f9 | f9f9 | f9f9 | f9f9 | fafa | fafa | fafa | fafa |
| 0004300 | fafa | fbfa | fbfb | fbfb | fbfb | fbfb | fbfb | fcfc |
| 0004320 | fcfc | fcfc | fcfc | fcfc | fcfc | fdfd | fdfd | fdfd |
| 0004340 | fdfd | fdfd | fefd | fefe | fefe | fefe | fefe | fefe |
| 0004360 | ffff | ffff | ffff | ffff | ffff | 00ff | 0000 | 0000 |
| 0004400 | 0000 | 0000 | ff00 | ffff | ffff | ffff | ffff | fefe |
| 0004420 | fefe | fefe | fefe | fefe | fdfd | fdfd | fdfd | fcfd |
| 0004440 | fcfc | fcfc | fcfc | fbfc | fbfb | fbfb | fbfb | fbfb |
| 0004460 | fafa | fafa | fafa | fafa | f9fa | f9f9 | f9f9 | f9f9 |
| 0004500 | f8f9 | f8f8 | f8f8 | f8f8 | f8f8 | f7f7 | f7f7 | f7f7 |
| 0004520 | f7f7 | f6f6 | f6f6 | f6f6 | f6f6 | f5f6 | f5f5 | f5f5 |
| 0004540 | f5f5 | f5f5 | f4f4 | f4f4 | f4f4 | f4f4 | f4f4 | f4f4 |
| 0004560 | f4f4 | f4f4 | f4f4 | f4f4 | f4f4 | f4f4 | f4f4 | f4f4 |
| 0004600 | 0c0c | 0c0c | 0c0c | 0c0c | 0c0c | 0c0c | 0c0c | 0c0c |
| 0004620 | 0c0c | 0c0c | 0c0c | 0c0c | 0c0c | 0c0c | 0c0c | 0b0b |
| 0004640 | 0b0b | 0b0b | 0b0b | 0b0b | 0a0a | 0a0a | 0a0a | 090a |
| 0004660 | 0909 | 0909 | 0909 | 0809 | 0808 | 0808 | 0808 | 0808 |
| 0004700 | 0707 | 0707 | 0707 | 0707 | 0606 | 0606 | 0606 | 0606 |
| 0004700 | 0707 | 0707 | 0707 | 0707 | 0606 | 0606 | 0606 | 0606 |
| 0004720 | 0506 | 0505 | 0505 | 0505 | 0505 | 0404 | 0404 | 0404 |
| 0004740 | 0404 | 0303 | 0303 | 0303 | 0303 | 0203 | 0202 | 0202 |
| 0004760 | 0202 | 0102 | 0101 | 0101 | 0101 | 0101 | 0000 | 0000 |
| 0005000 | 0000 | 0000 | 0101 | 0101 | 0101 | 0202 | 0202 | 0202 |
| 0005020 | 0303 | 0303 | 0303 | 0404 | 0404 | 0404 | 0504 | 0505 |
| 0005040 | 0505 | 0605 | 0606 | 0606 | 0706 | 0707 | 0707 | 0807 |
| 0005060 | 0808 | 0808 | 0808 | 0909 | 0909 | 0909 | 0a0a | 0a0a |
| 0005100 | 0a0a | 0b0b | 0b0b | 0b0b | 0b0b | 0c0c | 0c0c | 0d0c |
| 0005120 | 0d0d | 0d0d | 0e0d | 0e0e | 0e0e | 0f0e | 0f0f | 0f0f |
| 0005140 | 100f | 1010 | 1010 | 1010 | 1111 | 1111 | 1111 | 1212 |
| 0005160 | 1212 | 1212 | 1313 | 1313 | 1313 | 1313 | 1313 | 1313 |
| 0005200 | eded | eded | eded | eded | eded | eded | eeed | eeee |
| 0005220 | eeee | efee | efef | efef | f0ef | f0f0 | f0f0 | f0f0 |
| 0005240 | f1f1 | f1f1 | f1f1 | f2f2 | f2f2 | f2f2 | f3f3 | f3f3 |
| 0005260 | f3f3 | f4f4 | f4f4 | f4f4 | f5f4 | f5f5 | f5f5 | f6f5 |

TABLE 6-continued

| | U2: Weighting ROM 808 (FIG. 8) | | | | | | | |
|---|---|---|---|---|---|---|---|---|
| 0005300 | f6f6 | f6f6 | f7f7 | f7f7 | f7f7 | f8f7 | f8f8 | f8f8 |
| 0005320 | f8f8 | f9f9 | f9f9 | f9f9 | fafa | fafa | fafa | fbfb |
| 0005340 | fbfb | fbfb | fcfc | fcfc | fcfc | fdfc | fdfd | fdfd |
| 0005360 | fefd | fefe | fefe | fffe | ffff | ffff | 00ff | 0000 |
| 0005400 | 0000 | 0101 | 0101 | 0202 | 0302 | 0303 | 0403 | 0404 |
| 0005420 | 0505 | 0605 | 0606 | 0706 | 0707 | 0808 | 0808 | 0909 |
| 0005440 | 0a09 | 0a0a | 0b0b | 0b0b | 0c0c | 0d0c | 0d0d | 0e0d |
| 0005460 | 0e0e | 0f0f | 0f0f | 1010 | 1110 | 1111 | 1212 | 1212 |
| 0005500 | 1313 | 1413 | 1414 | 1514 | 1515 | 1616 | 1616 | 1717 |
| 0005520 | 1817 | 1818 | 1919 | 1919 | 1a1a | 1b1a | 1b1b | 1c1b |
| 0005540 | 1c1c | 1d1d | 1d1d | 1e1e | 1e1e | 1e1e | 1e1e | 1e1e |
| 0005560 | 1e1e | 1e1e | 1e1e | 1e1e | 1e1e | 1e1e | 1e1e | 1e1e |
| 0005600 | e2e2 | e2e2 | e2e2 | e2e2 | e2e2 | e2e2 | e2e2 | e2e2 |
| 0005620 | e2e2 | e2e2 | e2e2 | e2e2 | e2e2 | e3e2 | e3e3 | e4e3 |
| 0005640 | e4e4 | e5e5 | e5e5 | e6e6 | e7e6 | e7e7 | e8e7 | e8e8 |
| 0005660 | e9e9 | eae9 | eaea | ebea | ebeb | ecec | ecec | eded |
| 0005700 | eeed | eeee | efee | efef | f0f0 | f1f0 | f1f1 | f2f1 |
| 0005720 | f2f2 | f3f3 | f3f3 | f4f4 | f5f4 | f5f5 | f6f5 | f6f6 |
| 0005740 | f7f7 | f8f7 | f8f8 | f9f8 | f9f9 | fafa | fafa | fbfb |
| 0005760 | fcfb | fcfc | fdfd | fdfd | fefe | fffe | ffff | 00ff |
| 0006000 | 0000 | 0101 | 0202 | 0303 | 0404 | 0505 | 0606 | 0707 |
| 0006020 | 0808 | 0909 | 0a0a | 0b0b | 0c0c | 0d0d | 0e0e | 0f0f |
| 0006040 | 1010 | 1111 | 1212 | 1313 | 1414 | 1515 | 1616 | 1717 |
| 0006060 | 1818 | 1919 | 1a1a | 1b1b | 1c1c | 1d1d | 1e1e | 1f1f |
| 0006100 | 2020 | 2121 | 2222 | 2323 | 2424 | 2525 | 2626 | 2727 |
| 0006120 | 2828 | 2929 | 2a2a | 2b2b | 2c2c | 2d2d | 2e2e | 2f2f |
| 0006140 | 3030 | 3131 | 3232 | 3333 | 3434 | 3535 | 3636 | 3737 |
| 0006160 | 3838 | 3939 | 3a3a | 3b3b | 3c3c | 3d3d | 3e3e | 3f3f |
| 0006200 | c1c0 | c2c1 | c3c2 | c4c3 | c5c4 | c6c5 | c7c6 | c8c7 |
| 0006220 | c9c8 | cac9 | cbca | cccb | cdcc | cecd | cfce | d0cf |
| 0006240 | d1d0 | d2d1 | d3d2 | d4d3 | d5d4 | d6d5 | d7d6 | d8d7 |
| 0006260 | d9d8 | dad9 | dbda | dcdb | dddc | dedd | dfde | e0df |
| 0006300 | e1e0 | e2e1 | e3e2 | e4e3 | e5e4 | e6e5 | e7e6 | e8e7 |
| 0006320 | e9e8 | eae9 | ebea | eceb | edec | eeed | efee | f0ef |
| 0006340 | f1f0 | f2f1 | f3f2 | f4f3 | f5f4 | f6f5 | f7f6 | f8f7 |
| 0006360 | f9f8 | faf9 | fbfa | fcfb | fdfc | fefd | fffe | 00ff |
| 0006400 | 0100 | 0201 | 0403 | 0504 | 0706 | 0807 | 0a09 | 0b0a |
| 0006420 | 0c0c | 0e0d | 0f0f | 1110 | 1212 | 1413 | 1515 | 1716 |
| 0006440 | 1817 | 1a19 | 1b1a | 1d1c | 1e1d | 201f | 2120 | 2222 |
| 0006460 | 2423 | 2525 | 2726 | 2828 | 2a29 | 2b2b | 2d2c | 2e2d |
| 0006500 | 302f | 3130 | 3332 | 3433 | 3635 | 3736 | 3938 | 3a39 |
| 0006520 | 3b3b | 3d3c | 3e3e | 403f | 4141 | 4342 | 4444 | 4645 |
| 0006540 | 4746 | 4948 | 4a49 | 4c4b | 4c4c | 4c4c | 4c4c | 4c4c |
| 0006560 | 4c4c | 4c4c | 4c4c | 4c4c | 4c4c | 4c4c | 4c4c | 4c4c |
| 0006600 | b4b4 | b4b4 | b4b4 | b4b4 | b4b4 | b4b4 | b4b4 | b4b4 |
| 0006620 | b4b4 | b4b4 | b4b4 | b4b4 | b4b4 | b6b5 | b7b7 | b9b8 |
| 0006640 | baba | bcbb | bdbc | bfbe | c0bf | c2c1 | c3c2 | c5c4 |
| 0006660 | c6c5 | c7c7 | c9c8 | caca | cccb | cdcd | cfce | d0d0 |
| 0006700 | d2d1 | d3d3 | d5d4 | d6d5 | d8d7 | d9d8 | dbda | dcdb |
| 0006720 | dedd | dfde | e0e0 | e2e1 | e3e3 | e5e4 | e6e6 | e8e7 |
| 0006740 | e9e9 | ebea | eceb | eeed | efee | f1f0 | f2f1 | f4f3 |
| 0006760 | f5f4 | f6f6 | f8f7 | f9f9 | fbfa | fcfc | fefd | ffff |
| 0007000 | 0100 | 0302 | 0403 | 0605 | 0807 | 0909 | 0b0a | 0d0c |
| 0007020 | 0f0e | 100f | 1211 | 1413 | 1615 | 1716 | 1918 | 1b1a |
| 0007040 | 1c1c | 1e1d | 201f | 2221 | 2322 | 2524 | 2726 | 2828 |
| 0007060 | 2a29 | 2c2b | 2e2d | 2f2e | 3130 | 3332 | 3534 | 3635 |
| 0007100 | 3837 | 3a39 | 3b3b | 3d3c | 3f3e | 4140 | 4241 | 4443 |
| 0007120 | 4645 | 4747 | 4948 | 4b4a | 4d4c | 4e4d | 504f | 5251 |
| 0007140 | 5453 | 5554 | 5756 | 5958 | 5a5a | 5c5b | 5e5d | 605f |
| 0007160 | 6160 | 6362 | 6564 | 6565 | 6565 | 6565 | 6565 | 6565 |
| 0007200 | 9b9b | 9b9b | 9b9b | 9b9b | 9b9b | 9b9b | 9d9c | 9f9e |
| 0007220 | a0a0 | a2a1 | a4a3 | a6a5 | a7a6 | a9a8 | abaa | acac |
| 0007240 | aead | b0af | b2b1 | b3b3 | b5b4 | b7b6 | b9b8 | bab9 |
| 0007260 | bcbb | bebd | bfbf | c1c0 | c3c2 | c5c4 | c6c5 | c8c7 |
| 0007300 | cac9 | cbcb | cdcc | cfce | d1d0 | d2d2 | d4d3 | d6d5 |
| 0007320 | d8d7 | d9d8 | dbda | dddc | dede | e0df | e2e1 | e4e3 |
| 0007340 | e5e4 | e7e6 | e9e8 | eaea | eceb | eeed | f0ef | f1f1 |
| 0007360 | f3f2 | f5f4 | f7f6 | f8f7 | faf9 | fcfb | fdfd | fffe |
| 0007400 | 0100 | 0302 | 0504 | 0706 | 0908 | 0b0a | 0d0c | 0f0e |
| 0007420 | 1110 | 1312 | 1514 | 1716 | 1918 | 1b1a | 1d1c | 1f1e |
| 0007440 | 2120 | 2322 | 2524 | 2726 | 2928 | 2b2a | 2d2c | 2f2e |
| 0007460 | 3130 | 3332 | 3534 | 3736 | 3938 | 3b3a | 3d3c | 3f3e |
| 0007500 | 4140 | 4342 | 4544 | 4746 | 4948 | 4b4a | 4d4c | 4f4e |
| 0007520 | 5150 | 5352 | 5554 | 5756 | 5958 | 5b5a | 5d5c | 5f5e |
| 0007540 | 6160 | 6362 | 6564 | 6766 | 6968 | 6b6a | 6d6c | 6f6e |
| 0007560 | 7170 | 7372 | 7574 | 7776 | 7978 | 7b7a | 7d7c | 7f7e |
| 0007600 | 8180 | 8382 | 8584 | 8786 | 8988 | 8b8a | 8d8c | 8f8e |
| 0007620 | 9190 | 9392 | 9594 | 9796 | 9998 | 9b9a | 9d9c | 9f9e |
| 0007640 | a1a0 | a3a2 | a5a4 | a7a6 | a9a8 | abaa | adac | afae |
| 0007660 | b1b0 | b3b2 | b5b4 | b7b6 | b9b8 | bbba | bdbc | bfbe |
| 0007700 | c1c0 | c3c2 | c5c4 | c7c6 | c9c8 | cbca | cdcc | cfce |

TABLE 6-continued

| U2: Weighting ROM 808 (FIG. 8) | | | | | | | |
|---|---|---|---|---|---|---|---|
| 0007720 | d1d0 | d3d2 | d5d4 | d7d6 | d9d8 | dbda | dddc | dfde |
| 0007740 | e1e0 | e3e2 | e5e4 | e7e6 | e9e8 | ebea | edec | efee |
| 0007760 | f1f0 | f3f2 | f5f4 | f7f6 | f9f8 | fbfa | fdfc | fffe |
| 0010000 | ffff | ffff | ffff | ffff | ffff | ffff | ffff | ffff |
| *       |      |      |      |      |      |      |      |      |
| 0040000 |      |      |      |      |      |      |      |      |

TABLE 7

| U13: ROM And Latch 908 (FIG. 9) |
|---|

Output velocity compensator math control ROM.

| address | data | | | | | | | |
|---|---|---|---|---|---|---|---|---|
| 0000000 | 0101 | 0101 | 0101 | 0101 | 2701 | 0101 | 0107 | 0101 |
| 0000020 | 1d1f | ff01 | fdff | fef7 | ffff | ffff | ffff | ffff |
| 0000040 | ffff | ffff | 0101 | 0101 | 0101 | 0101 | 0101 | 0101 |
| 0000060 | 0101 | 0101 | 0101 | 0101 | 0101 | 0101 | 0101 | 0101 |
| 0000100 | 0101 | 0101 | 0101 | 0101 | 2701 | 0101 | 0107 | 0101 |
| 0000120 | 1d1f | ff01 | fdff | fef7 | ffff | ffff | ffff | ffff |
| 0000140 | ffff | ffff | 0101 | 0101 | 0101 | 0101 | 0101 | 0101 |
| 0000160 | 0101 | 0101 | 0101 | 0101 | 0101 | 0101 | 0101 | 0101 |
| 0000200 | 0101 | 0101 | 0101 | 0101 | 2701 | 0101 | 0107 | 0101 |
| 0000220 | 1d1f | ff01 | fdff | fef7 | ffff | ffff | ffff | ffff |
| 0000240 | ffff | ffff | ffff | 0101 | 0101 | 0101 | 0101 | 0101 |
| 0000260 | 0101 | 0101 | 0101 | 0101 | 0101 | 0101 | 0101 | 0101 |
| 0000300 | 0101 | 0101 | 0101 | 0101 | 2701 | 0101 | 0107 | 0101 |
| 0000320 | 1d1f | ff01 | fdff | fef7 | ffff | ffff | ffff | ffff |
| 0000340 | ffff | ffff | ffff | 0101 | 0101 | 0101 | 0101 | 0101 |
| 0000360 | 0101 | 0101 | 0101 | 0101 | 0101 | 0101 | 0101 | 0101 |
| 0000400 | 0101 | 0101 | 0101 | 0101 | 2701 | 0101 | 0107 | 0101 |
| 0000420 | 1d1f | ff01 | fdff | fef7 | ffff | ffff | ffff | ffff |
| 0000440 | ffff | ffff | 0101 | 0101 | 0101 | 0101 | 0101 | 0101 |
| 0000460 | 0101 | 0101 | 0101 | 0101 | 0101 | 0101 | 0101 | 0101 |
| 0000500 | 0101 | 0101 | 0101 | 0101 | 2701 | 0101 | 0107 | 0101 |
| 0000520 | 1d1f | ff01 | fdff | fef7 | ffff | ffff | ffff | ffff |
| 0000540 | ffff | ffff | 0101 | 0101 | 0101 | 0101 | 0101 | 0101 |
| 0000560 | 0101 | 0101 | 0101 | 0101 | 0101 | 0101 | 0101 | 0101 |
| 0000600 | 0101 | 0101 | 0101 | 0101 | 2701 | 0101 | 0107 | 0101 |
| 0000620 | 1d1f | ff01 | fdff | fef7 | ffff | ffff | ffff | ffff |
| 0000640 | ffff | ffff | ffff | 0101 | 0101 | 0101 | 0101 | 0101 |
| 0000660 | 0101 | 0101 | 0101 | 0101 | 0101 | 0101 | 0101 | 0101 |
| 0000700 | 0101 | 0101 | 0101 | 0101 | 2701 | 0101 | 0107 | 0101 |
| 0000720 | 1d1f | ff01 | fdff | fef7 | ffff | ffff | ffff | ffff |
| 0000740 | ffff | ffff | ffff | 0101 | 0101 | 0101 | 0101 | 0101 |
| 0000760 | 0101 | 0101 | 0101 | 0101 | 0101 | 0101 | 0101 | 0101 |
| 0001000 | 0101 | 0101 | 0101 | 0101 | 2701 | 0101 | e7a7 | 0101 |
| 0001020 | 1d1f | ff01 | fdff | fef7 | ffff | ffff | ffff | ffff |
| 0001040 | ffff | ffff | 0101 | 0101 | 0101 | 0101 | 0101 | 0101 |
| 0001060 | 0101 | 0101 | 0101 | 0101 | 0101 | 0101 | 0101 | 0101 |
| 0001100 | 0101 | 0101 | 0101 | 0101 | 2701 | 0101 | e7a7 | 0101 |
| 0001120 | 1d1f | ff01 | fdff | fef7 | ffff | ffff | ffff | ffff |
| 0001140 | ffff | ffff | 0101 | 0101 | 0101 | 0101 | 0101 | 0101 |
| 0001160 | 0101 | 0101 | 0101 | 0101 | 0101 | 0101 | 0101 | 0101 |
| 0001200 | 0101 | 0101 | 0101 | 0101 | 2701 | 0101 | e7a7 | 0101 |
| 0001220 | 1d1f | ff01 | fdff | fef7 | ffff | ffff | ffff | ffff |
| 0001240 | ffff | ffff | ffff | 0101 | 0101 | 0101 | 0101 | 0101 |
| 0001260 | 0101 | 0101 | 0101 | 0101 | 0101 | 0101 | 0101 | 0101 |
| 0001300 | 0101 | 0101 | 0101 | 0101 | 2701 | 0101 | e7a7 | 0101 |
| 0001320 | 1d1f | ff01 | fdff | fef7 | ffff | ffff | ffff | ffff |
| 0001340 | ffff | ffff | ffff | 0101 | 0101 | 0101 | 0101 | 0101 |
| 0001360 | 0101 | 0101 | 0101 | 0101 | 0101 | 0101 | 0101 | 0101 |
| 0001400 | 0101 | 0101 | 0101 | 0101 | 2701 | 0101 | 97b7 | 01d7 |
| 0001420 | 1d1f | ff01 | fdff | fef7 | ffff | ffff | ffff | ffff |
| 0001440 | ffff | ffff | 0101 | 0101 | 0101 | 0101 | 0101 | 0101 |
| 0001460 | 0101 | 0101 | 0101 | 0101 | 0101 | 0101 | 0101 | 0101 |
| 0001500 | 0101 | 0101 | 0101 | 0101 | 2701 | 0101 | 97b7 | 01d7 |
| 0001520 | 1d1f | ff01 | fdff | fef7 | ffff | ffff | ffff | ffff |
| 0001540 | ffff | ffff | 0101 | 0101 | 0101 | 0101 | 0101 | 0101 |
| 0001560 | 0101 | 0101 | 0101 | 0101 | 0101 | 0101 | 0101 | 0101 |
| 0001600 | 0101 | 0101 | 0101 | 0101 | 2701 | 0101 | 97b7 | 01d7 |
| 0001620 | 1d1f | ff01 | fdff | fef7 | ffff | ffff | ffff | ffff |
| 0001640 | ffff | ffff | ffff | 0101 | 0101 | 0101 | 0101 | 0101 |
| 0001660 | 0101 | 0101 | 0101 | 0101 | 0101 | 0101 | 0101 | 0101 |
| 0001700 | 0101 | 0101 | 0101 | 0101 | 2701 | 0101 | 97b7 | 01d7 |
| 0001720 | 1d1f | ff01 | fdff | fef7 | ffff | ffff | ffff | ffff |
| 0001740 | ffff | ffff | ffff | 0101 | 0101 | 0101 | 0101 | 0101 |
| 0001760 | 0101 | 0101 | 0101 | 0101 | 0101 | 0101 | 0101 | 0101 |
| 0002000 | 0101 | 0101 | 0101 | 0101 | 2701 | 0101 | c7c7 | 0101 |
| 0002020 | 1d1f | ff01 | fdff | fef7 | ffff | ffff | ffff | ffff |
| 0002040 | ffff | ffff | 0101 | 0101 | 0101 | 0101 | 0101 | 0101 |

TABLE 7-continued

| U13: ROM And Latch 908 (FIG. 9) | | | | | | | |
|---|---|---|---|---|---|---|---|
| address | | | | | | | |
| 0002060 | 0101 | 0101 | 0101 | 0101 | 0101 | 0101 | 0101 |
| 0002100 | 0101 | 0101 | 0101 | 0101 | 2701 | 0101 | c7c7 | 0101 |
| 0002120 | ldlf | ff01 | fdff | fef7 | ffff | ffff | ffff | ffff |
| 0002140 | ffff | ffff | 0101 | 0101 | 0101 | 0101 | 0101 | 0101 |
| 0002160 | 0101 | 0101 | 0101 | 0101 | 0101 | 0101 | 0101 | 0101 |
| 0002200 | 0101 | 0101 | 0101 | 0101 | 2701 | 0101 | c7c7 | 0101 |
| 0002220 | ldlf | ff01 | fdff | fef7 | ffff | ffff | ffff | ffff |
| 0002240 | ffff | ffff | ffff | 0101 | 0101 | 0101 | 0101 | 0101 |
| 0002260 | 0101 | 0101 | 0101 | 0101 | 0101 | 0101 | 0101 | 0101 |
| 0002300 | 0101 | 0101 | 0101 | 0101 | 2701 | 0101 | c7c7 | 0101 |
| 0002320 | ldlf | ff01 | fdff | fef7 | ffff | ffff | ffff | ffff |
| 0002340 | ffff | ffff | ffff | 0101 | 0101 | 0101 | 0101 | 0101 |
| 0002360 | 0101 | 0101 | 0101 | 0101 | 0101 | 0101 | 0101 | 0101 |
| 0002400 | 0101 | 0101 | 0101 | 0101 | 2701 | 0101 | c7c7 | 0101 |
| 0002420 | ldlf | ff01 | fdff | fef7 | ffff | ffff | ffff | ffff |
| 0002440 | ffff | ffff | 0101 | 0101 | 0101 | 0101 | 0101 | 0101 |
| 0002460 | 0101 | 0101 | 0101 | 0101 | 0101 | 0101 | 0101 | 0101 |
| 0002500 | 0101 | 0101 | 0101 | 0101 | 2701 | 0101 | c7c7 | 0101 |
| 0002520 | ldlf | ff01 | fdff | fef7 | ffff | ffff | ffff | ffff |
| 0002540 | ffff | ffff | 0101 | 0101 | 0101 | 0101 | 0101 | 0101 |
| 0002560 | 0101 | 0101 | 0101 | 0101 | 0101 | 0101 | 0101 | 0101 |
| 0002600 | 0101 | 0101 | 0101 | 0101 | 2701 | 0101 | c7c7 | 0101 |
| 0002620 | ldlf | ff01 | fdff | fef7 | ffff | ffff | ffff | ffff |
| 0002640 | ffff | ffff | ffff | 0101 | 0101 | 0101 | 0101 | 0101 |
| 0002660 | 0101 | 0101 | 0101 | 0101 | 0101 | 0101 | 0101 | 0101 |
| 0002700 | 0101 | 0101 | 0101 | 0101 | 2701 | 0101 | c7c7 | 0101 |
| 0002720 | ldlf | ff01 | fdff | fef7 | ffff | ffff | ffff | ffff |
| 0002740 | ffff | ffff | ffff | 0101 | 0101 | 0101 | 0101 | 0101 |
| 0002760 | 0101 | 0101 | 0101 | 0101 | 0101 | 0101 | 0101 | 0101 |
| 0003000 | 0101 | 0101 | 0101 | 0101 | 2701 | 0101 | 97d7 | 01b7 |
| 0003020 | ldlf | ff01 | fdff | fef7 | ffff | ffff | ffff | ffff |
| 0003040 | ffff | ffff | 0101 | 0101 | 0101 | 0101 | 0101 | 0101 |
| 0003060 | 0101 | 0101 | 0101 | 0101 | 0101 | 0101 | 0101 | 0101 |
| 0003100 | 0101 | 0101 | 0101 | 0101 | 2701 | 0101 | 97d7 | 01b7 |
| 0003120 | ldlf | ff01 | fdff | fef7 | ffff | ffff | ffff | ffff |
| 0003140 | ffff | ffff | 0101 | 0101 | 0101 | 0101 | 0101 | 0101 |
| 0003160 | 0101 | 0101 | 0101 | 0101 | 0101 | 0101 | 0101 | 0101 |
| 0003200 | 0101 | 0101 | 0101 | 0101 | 2701 | 0101 | 97d7 | 01b7 |
| 0003220 | ldlf | ff01 | fdff | fef7 | ffff | ffff | ffff | ffff |
| 0003240 | ffff | ffff | ffff | 0101 | 0101 | 0101 | 0101 | 0101 |
| 0003260 | 0101 | 0101 | 0101 | 0101 | 0101 | 0101 | 0101 | 0101 |
| 0003300 | 0101 | 0101 | 0101 | 0101 | 2701 | 0101 | 97d7 | 01b7 |
| 0003320 | ldlf | ff01 | fdff | fef7 | ffff | ffff | ffff | ffff |
| 0003340 | ffff | ffff | ffff | 0101 | 0101 | 0101 | 0101 | 0101 |
| 0003360 | 0101 | 0101 | 0101 | 0101 | 0101 | 0101 | 0101 | 0101 |
| 0003400 | 0101 | 0101 | 0101 | 0101 | 2701 | 0101 | a7e7 | 0101 |
| 0003420 | ldlf | ff01 | fdff | fef7 | ffff | ffff | ffff | ffff |
| 0003440 | ffff | ffff | 0101 | 0101 | 0101 | 0101 | 0101 | 0101 |
| 0003460 | 0101 | 0101 | 0101 | 0101 | 0101 | 0101 | 0101 | 0101 |
| 0003500 | 0101 | 0101 | 0101 | 0101 | 2701 | 0101 | a7e7 | 0101 |
| 0003520 | ldlf | ff01 | fdff | fef7 | ffff | ffff | ffff | ffff |
| 0003540 | ffff | ffff | 0101 | 0101 | 0101 | 0101 | 0101 | 0101 |
| 0003560 | 0101 | 0101 | 0101 | 0101 | 0101 | 0101 | 0101 | 0101 |
| 0003600 | 0101 | 0101 | 0101 | 0101 | 2701 | 0101 | a7e7 | 0101 |
| 0003620 | ldlf | ff01 | fdff | fef7 | ffff | ffff | ffff | ffff |
| 0003640 | ffff | ffff | ffff | 0101 | 0101 | 0101 | 0101 | 0101 |
| 0003660 | 0101 | 0101 | 0101 | 0101 | 0101 | 0101 | 0101 | 0101 |
| 0003700 | 0101 | 0101 | 0101 | 0101 | 2701 | 0101 | a7e7 | 0101 |
| 0003720 | ldlf | ff01 | fdff | fef7 | ffff | ffff | ffff | ffff |
| 0003740 | ffff | ffff | ffff | 0101 | 0101 | 0101 | 0101 | 0101 |
| 0003760 | 0101 | 0101 | 0101 | 0101 | 0101 | 0101 | 0101 | 0101 |
| 0004000 | | | | | | | | |

TABLE 8

U19: ROM And Latch 906 (FIG. 9)

Output velocity compensator register control ROM.

| address | data | | | | | | | |
|---|---|---|---|---|---|---|---|---|
| 0000000 | cbcb | cbcb | cbcb | cbcb | 4bcb | cb2b | cb4b | 2bcb |
| 0000020 | 233b | 7f0b | 4343 | 1727 | 1616 | 1717 | 1717 | 1717 |
| 0000040 | 1717 | 1717 | ebeb | cbcb | cbcb | cbcb | cbcb | cbcb |
| 0000060 | cbcb | cbcb | cbcb | cbcb | cbcb | cbcb | cbcb | cbcb |
| 0000100 | cbcb | cbcb | cbcb | cbcb | 4bcb | cb2b | cb4b | 2bcb |
| 0000120 | 233b | 7f0b | 4343 | 1727 | 1616 | 1717 | 1717 | 1717 |
| 0000140 | 1717 | 1717 | ebeb | cbcb | cbcb | cbcb | cbcb | cbcb |
| 0000160 | cbcb | cbcb | cbcb | cbcb | cbcb | cbcb | cbcb | cbcb |
| 0000200 | cbcb | cbcb | cbcb | cbcb | 4bcb | cb2b | cb4b | 2bcb |
| 0000220 | 233b | 7f0b | 4343 | 1727 | 1717 | 1717 | 1717 | 1717 |
| 0000240 | 1717 | 1717 | 1e1e | cbcb | cbcb | cbcb | cbcb | cbcb |

TABLE 8-continued

| U19: ROM And Latch 906 (FIG. 9) | | | | | | | | |
|---|---|---|---|---|---|---|---|---|
| 0000260 | cbcb | cbcb | cbcb | cbcb | cbcb | cbcb | cbcb | cbcb |
| 0000300 | cbcb | cbcb | cbcb | cbcb | 4bcb | cb2b | cb4b | 2bcb |
| 0000320 | 233b | 7f0b | 4343 | 1727 | 1717 | 1717 | 1717 | 1717 |
| 0000340 | 1717 | 1717 | 1e1e | cbcb | cbcb | cbcb | cbcb | cbcb |
| 0000360 | cbcb | cbcb | cbcb | cbcb | cbcb | cbcb | cbcb | cbcb |
| 0000400 | cbcb | cbcb | cbcb | cbcb | 4bcb | cb2b | cb4b | 2bcb |
| 0000420 | 233b | 7f0b | 4343 | 1727 | 1616 | 1717 | 1717 | 1717 |
| 0000440 | 1717 | 1717 | ebeb | cbcb | cbcb | cbcb | cbcb | cbcb |
| 0000460 | cbcb | cbcb | cbcb | cbcb | cbcb | cbcb | cbcb | cbcb |
| 0000500 | cbcb | cbcb | cbcb | cbcb | 4bcb | cb2b | cb4b | 2bcb |
| 0000520 | 233b | 7f0b | 4343 | 1727 | 1616 | 1717 | 1717 | 1717 |
| 0000540 | 1717 | 1717 | ebeb | cbcb | cbcb | cbcb | cbcb | cbcb |
| 0000560 | cbcb | cbcb | cbcb | cbcb | cbcb | cbcb | cbcb | cbcb |
| 0000600 | cbcb | cbcb | cbcb | cbcb | 4bcb | cb2b | cb4b | 2bcb |
| 0000620 | 233b | 7f0b | 4343 | 1727 | 1717 | 1717 | 1717 | 1717 |
| 0000640 | 1717 | 1717 | 1e1e | cbcb | cbcb | cbcb | cbcb | cbcb |
| 0000660 | cbcb | cbcb | cbcb | cbcb | cbcb | cbcb | cbcb | cbcb |
| 0000700 | cbcb | cbcb | cbcb | cbcb | 4bcb | cb2b | cb4b | 2bcb |
| 0000720 | 233b | 7f0b | 4343 | 1727 | 1717 | 1717 | 1717 | 1717 |
| 0000740 | 1717 | 1717 | 1e1e | cbcb | cbcb | cbcb | cbcb | cbcb |
| 0000760 | cbcb | cbcb | cbcb | cbcb | cbcb | cbcb | cbcb | cbcb |
| 0001000 | cbcb | cbcb | cbcb | cbcb | 4bcb | cb2b | 4b3b | 2bcb |
| 0001020 | 233b | 7f0b | 4343 | 1727 | 1616 | 1717 | 1717 | 1717 |
| 0001040 | 1717 | 1717 | ebeb | cbcb | cbcb | cbcb | cbcb | cbcb |
| 0001060 | cbcb | cbcb | cbcb | cbcb | cbcb | cbcb | cbcb | cbcb |
| 0001100 | cbcb | cbcb | cbcb | cbcb | 4bcb | cb2b | 4b3b | 2bcb |
| 0001120 | 233b | 7f0b | 4343 | 1727 | 1616 | 1717 | 1717 | 1717 |
| 0001140 | 1717 | 1717 | ebeb | cbcb | cbcb | cbcb | cbcb | cbcb |
| 0001160 | cbcb | cbcb | cbcb | cbcb | cbcb | cbcb | cbcb | cbcb |
| 0001200 | cbcb | cbcb | cbcb | cbcb | 4bcb | cb2b | 4b3b | 2bcb |
| 0001220 | 233b | 7f0b | 4343 | 1727 | 1717 | 1717 | 1717 | 1717 |
| 0001240 | 1717 | 1717 | 1e1e | cbcb | cbcb | cbcb | cbcb | cbcb |
| 0001260 | cbcb | cbcb | cbcb | cbcb | cbcb | cbcb | cbcb | cbcb |
| 0001300 | cbcb | cbcb | cbcb | cbcb | 4bcb | cb2b | 4b3b | 2bcb |
| 0001320 | 233b | 7f0b | 4343 | 1727 | 1717 | 1717 | 1717 | 1717 |
| 0001340 | 1717 | 1717 | 1e1e | cbcb | cbcb | cbcb | cbcb | cbcb |
| 0001360 | cbcb | cbcb | cbcb | cbcb | cbcb | cbcb | cbcb | cbcb |
| 0001400 | cbcb | cbcb | cbcb | cbcb | 4bcb | cb2b | 333b | 2b4b |
| 0001420 | 233b | 7f0b | 4343 | 1727 | 1616 | 1717 | 1717 | 1717 |
| 0001440 | 1717 | 1717 | ebeb | cbcb | cbcb | cbcb | cbcb | cbcb |
| 0001460 | cbcb | cbcb | cbcb | cbcb | cbcb | cbcb | cbcb | cbcb |
| 0001500 | cbcb | cbcb | cbcb | cbcb | 4bcb | cb2b | 333b | 2b4b |
| 0001520 | 233b | 7f0b | 4343 | 1727 | 1616 | 1717 | 1717 | 1717 |
| 0001540 | 1717 | 1717 | ebeb | cbcb | cbcb | cbcb | cbcb | cbcb |
| 0001560 | cbcb | cbcb | cbcb | cbcb | cbcb | cbcb | cbcb | cbcb |
| 0001600 | cbcb | cbcb | cbcb | cbcb | 4bcb | cb2b | 333b | 2b4b |
| 0001620 | 233b | 7f0b | 4343 | 1727 | 1717 | 1717 | 1717 | 1717 |
| 0001640 | 1717 | 1717 | 1e1e | cbcb | cbcb | cbcb | cbcb | cbcb |
| 0001660 | cbcb | cbcb | cbcb | cbcb | cbcb | cbcb | cbcb | cbcb |
| 0001700 | cbcb | cbcb | cbcb | cbcb | 4bcb | cb2b | 333b | 2b4b |
| 0001720 | 233b | 7f0b | 4343 | 1727 | 1717 | 1717 | 1717 | 1717 |
| 0001740 | 1717 | 1717 | 1e1e | cbcb | cbcb | cbcb | cbcb | cbcb |
| 0001760 | cbcb | cbcb | cbcb | cbcb | cbcb | cbcb | cbcb | cbcb |
| 0002000 | cbcb | cbcb | cbcb | cbcb | 4bcb | cb2b | 4333 | 2bcb |
| 0002020 | 233b | 7f0b | 4343 | 1727 | 1616 | 1717 | 1717 | 1717 |
| 0002040 | 1717 | 1717 | ebeb | cbcb | cbcb | cbcb | cbcb | cbcb |
| 0002060 | cbcb | cbcb | cbcb | cbcb | cbcb | cbcb | cbcb | cbcb |
| 0002100 | cbcb | cbcb | cbcb | cbcb | 4bcb | cb2b | 4333 | 2bcb |
| 0002120 | 233b | 7f0b | 4343 | 1727 | 1616 | 1717 | 1717 | 1717 |
| 0002140 | 1717 | 1717 | ebeb | cbcb | cbcb | cbcb | cbcb | cbcb |
| 0002160 | cbcb | cbcb | cbcb | cbcb | cbcb | cbcb | cbcb | cbcb |
| 0002200 | cbcb | cbcb | cbcb | cbcb | 4bcb | cb2b | 4333 | 2bcb |
| 0002220 | 233b | 7f0b | 4343 | 1727 | 1717 | 1717 | 1717 | 1717 |
| 0002240 | 1717 | 1717 | 1e1e | cbcb | cbcb | cbcb | cbcb | cbcb |
| 0002260 | cbcb | cbcb | cbcb | cbcb | cbcb | cbcb | cbcb | cbcb |
| 0002300 | cbcb | cbcb | cbcb | cbcb | 4bcb | cb2b | 4333 | 2bcb |
| 0002320 | 233b | 7f0b | 4343 | 1727 | 1717 | 1717 | 1717 | 1717 |
| 0002340 | 1717 | 1717 | 1e1e | cbcb | cbcb | cbcb | cbcb | cbcb |
| 0002360 | cbcb | cbcb | cbcb | cbcb | cbcb | cbcb | cbcb | cbcb |
| 0002400 | cbcb | cbcb | cbcb | cbcb | 4bcb | cb2b | 4333 | 2bcb |
| 0002420 | 233b | 7f0b | 4343 | 1727 | 1616 | 1717 | 1717 | 1717 |
| 0002440 | 1717 | 1717 | ebeb | cbcb | cbcb | cbcb | cbcb | cbcb |
| 0002460 | cbcb | cbcb | cbcb | cbcb | cbcb | cbcb | cbcb | cbcb |
| 0002500 | cbcb | cbcb | cbcb | cbcb | 4bcb | cb2b | 4333 | 2bcb |
| 0002520 | 233b | 7f0b | 4343 | 1727 | 1616 | 1717 | 1717 | 1717 |
| 0002540 | 1717 | 1717 | ebeb | cbcb | cbcb | cbcb | cbcb | cbcb |
| 0002560 | cbcb | cbcb | cbcb | cbcb | cbcb | cbcb | cbcb | cbcb |
| 0002600 | cbcb | cbcb | cbcb | cbcb | 4bcb | cb2b | 4333 | 2bcb |
| 0002620 | 233b | 7f0b | 4343 | 1727 | 1717 | 1717 | 1717 | 1717 |
| 0002640 | 1717 | 1717 | 1e1e | cbcb | cbcb | cbcb | cbcb | cbcb |
| 0002660 | cbcb | cbcb | cbcb | cbcb | cbcb | cbcb | cbcb | cbcb |

TABLE 8-continued

| U19: ROM And Latch 906 (FIG. 9) | | | | | | | | |
|---|---|---|---|---|---|---|---|---|
| 0002700 | cbcb | cbcb | cbcb | cbcb | 4bcb | cb2b | 4333 | 2bcb |
| 0002720 | 233b | 7f0b | 4343 | 1727 | 1717 | 1717 | 1717 | 1717 |
| 0002740 | 1717 | 1717 | 1e1e | cbcb | cbcb | cbcb | cbcb | cbcb |
| 0002760 | cbcb | cbcb | cbcb | cbcb | cbcb | cbcb | cbcb | cbcb |
| 0003000 | cbcb | cbcb | cbcb | cbcb | 4bcb | cb2b | 2b33 | 2b43 |
| 0003020 | 233b | 7f0b | 4343 | 1727 | 1616 | 1717 | 1717 | 1717 |
| 0003040 | 1717 | 1717 | ebeb | cbcb | cbcb | cbcb | cbcb | cbcb |
| 0003060 | cbcb | cbcb | cbcb | cbcb | cbcb | cbcb | cbcb | cbcb |
| 0003100 | cbcb | cbcb | cbcb | cbcb | 4bcb | cb2b | 2b33 | 2b43 |
| 0003120 | 233b | 7f0b | 4343 | 1727 | 1616 | 1717 | 1717 | 1717 |
| 0003140 | 1717 | 1717 | ebeb | cbcb | cbcb | cbcb | cbcb | cbcb |
| 0003160 | cbcb | cbcb | cbcb | cbcb | cbcb | cbcb | cbcb | cbcb |
| 0003200 | cbcb | cbcb | cbcb | cbcb | 4bcb | cb2b | 2b33 | 2b43 |
| 0003220 | 233b | 7f0b | 4343 | 1727 | 1717 | 1717 | 1717 | 1717 |
| 0003240 | 1717 | 1717 | 1e1e | cbcb | cbcb | cbcb | cbcb | cbcb |
| 0003260 | cbcb | cbcb | cbcb | cbcb | cbcb | cbcb | cbcb | cbcb |
| 0003300 | cbcb | cbcb | cbcb | cbcb | 4bcb | cb2b | 2b33 | 2b43 |
| 0003320 | 233b | 7f0b | 4343 | 1727 | 1717 | 1717 | 1717 | 1717 |
| 0003340 | 1717 | 1717 | 1e1e | cbcb | cbcb | cbcb | cbcb | cbcb |
| 0003360 | cbcb | cbcb | cbcb | cbcb | cbcb | cbcb | cbcb | cbcb |
| 0003400 | cbcb | cbcb | cbcb | cbcb | 4bcb | cb2b | 4333 | 2bcb |
| 0003420 | 233b | 7f0b | 4343 | 1727 | 1616 | 1717 | 1717 | 1717 |
| 0003440 | 1717 | 1717 | ebeb | cbcb | cbcb | cbcb | cbcb | cbcb |
| 0003460 | cbcb | cbcb | cbcb | cbcb | cbcb | cbcb | cbcb | cbcb |
| 0003500 | cbcb | cbcb | cbcb | cbcb | 4bcb | cb2b | 4333 | 2bcb |
| 0003520 | 233b | 7f0b | 4343 | 1727 | 1616 | 1717 | 1717 | 1717 |
| 0003540 | 1717 | 1717 | ebeb | cbcb | cbcb | cbcb | cbcb | cbcb |
| 0003560 | cbcb | cbcb | cbcb | cbcb | cbcb | cbcb | cbcb | cbcb |
| 0003600 | cbcb | cbcb | cbcb | cbcb | 4bcb | cb2b | 4333 | 2bcb |
| 0003620 | 233b | 7f0b | 4343 | 1727 | 1717 | 1717 | 1717 | 1717 |
| 0003640 | 1717 | 1717 | 1e1e | cbcb | cbcb | cbcb | cbcb | cbcb |
| 0003660 | cbcb | cbcb | cbcb | cbcb | cbcb | cbcb | cbcb | cbcb |
| 0003700 | cbcb | cbcb | cbcb | cbcb | 4bcb | cb2b | 4333 | 2bcb |
| 0003720 | 233b | 7f0b | 4343 | 1727 | 1717 | 1717 | 1717 | 1717 |
| 0003740 | 1717 | 1717 | 1e1e | cbcb | cbcb | cbcb | cbcb | cbcb |
| 0003760 | cbcb | cbcb | cbcb | cbcb | cbcb | cbcb | cbcb | cbcb |
| 0004000 | | | | | | | | |

TABLE 9

| U15: ROM And Register 1002 (FIG. 10) | | | | | | | | |
|---|---|---|---|---|---|---|---|---|
| Output velocity compensator sine table lookup ROM. | | | | | | | | |
| address data | | | | | | | | |
| 0000000 | ffff | ffff | ffff | ffff | ffff | ffff | fefe | fdfe |
| 0000020 | fcfd | fcfc | fbfb | fafa | f8f9 | f7f8 | f6f7 | f4f5 |
| 0000040 | f3f4 | f1f2 | f0f1 | eeef | eced | eaeb | e8e9 | e6e7 |
| 0000060 | e4e5 | e2e3 | dfe0 | ddde | dadc | d8d9 | d5d7 | d3d4 |
| 0000100 | d0d1 | cdce | cacc | c7c9 | c4c6 | c1c3 | bec0 | bbbd |
| 0000120 | b8ba | b5b6 | b1b3 | aeb0 | abad | a8a9 | a4a6 | a1a2 |
| 0000140 | 9d9f | 9a9c | 9698 | 9395 | 8f91 | 8c8e | 888a | 8587 |
| 0000160 | 8183 | 7e80 | 7a7c | 7778 | 7375 | 7071 | 6c6e | 696a |
| 0000200 | 6967 | 6c6a | 706e | 7371 | 7775 | 7a78 | 7e7c | 8180 |
| 0000220 | 8583 | 8887 | 8c8a | 8f8e | 9391 | 9695 | 9a98 | 9d9c |
| 0000240 | a19f | a4a2 | a8a6 | aba9 | aead | b1b0 | b5b3 | b8b6 |
| 0000260 | bbba | bebd | c1c0 | c4c3 | c7c6 | cac9 | cdcc | d0ce |
| 0000300 | d3d1 | d5d4 | d8d7 | dad9 | ddde | dfde | e2e0 | e4e3 |
| 0000320 | e6e5 | e8e7 | eae9 | eceb | eeed | f0ef | f1f1 | f3f2 |
| 0000340 | f4f4 | f6f5 | f7f7 | f8f8 | faf9 | fbfa | fcfb | fcfc |
| 0000360 | fdfd | fefe | fffe | ffff | ffff | ffff | ffff | ffff |
| 0000400 | 7e80 | 7b7c | 7779 | 7475 | 7072 | 6d6e | 696b | 6667 |
| 0000420 | 6264 | 5f61 | 5b5d | 585a | 5556 | 5153 | 4e50 | 4b4c |
| 0000440 | 4849 | 4546 | 4143 | 3e40 | 3b3d | 383a | 3537 | 3334 |
| 0000460 | 3031 | 2d2e | 2a2c | 2829 | 2527 | 2324 | 2022 | 1e1f |
| 0000500 | 1c1d | 1a1b | 1819 | 1617 | 1415 | 1213 | 1011 | 0e0f |
| 0000520 | 0d0e | 0b0c | 0a0b | 0909 | 0708 | 0607 | 0506 | 0405 |
| 0000540 | 0304 | 0303 | 0202 | 0102 | 0101 | 0101 | 0000 | 0000 |
| 0000560 | 0000 | 0000 | 0000 | 0000 | 0100 | 0101 | 0201 | 0202 |
| 0000600 | fefe | fefe | ffff | ffff | ffff | ffff | ffff | ffff |
| 0000620 | ffff | ffff | ffff | ffff | ffff | fefe | fdfe | fdfd |
| 0000640 | fcfc | fbfb | fafa | f9f9 | f7f8 | f6f7 | f5f5 | f3f4 |
| 0000660 | f2f2 | f0f1 | eeef | eced | eaeb | e8e9 | e6e7 | e4e5 |
| 0000700 | e2e3 | e0e1 | ddde | dbdc | d8d9 | d6d7 | d3d4 | d0d2 |
| 0000720 | cdcf | cbcc | c8c9 | c5c6 | c2c3 | bfc0 | bbbd | b8ba |
| 0000740 | b5b7 | b2b4 | afb0 | abad | a8aa | a5a6 | a1a3 | 9e9f |
| 0000760 | 9a9c | 9799 | 9395 | 9092 | 8c8e | 898b | 8587 | 8284 |
| 0001000 | 8280 | 8584 | 8987 | 8c8b | 908e | 9392 | 9795 | 9a99 |
| 0001020 | 9e9c | a19f | a5a3 | a8a6 | abaa | afad | b2b0 | b5b4 |
| 0001040 | b8b7 | bbba | bfbd | c2c0 | c5c3 | c8c6 | cbc9 | cdcc |
| 0001060 | d0cf | d3d2 | d6d4 | d8d7 | dbd9 | dddc | e0de | e2e1 |

TABLE 9-continued

U15: ROM And Register 1002 (FIG. 10)

| | | | | | | | |
|---|---|---|---|---|---|---|---|
| 0001100 | e4e3 | e6e5 | e8e7 | eae9 | eceb | eeed | f0ef | f2f1 |
| 0001120 | f3f2 | f5f4 | f6f5 | f7f7 | f9f8 | faf9 | fbfa | fcfb |
| 0001140 | fdfc | fdfd | fefe | fffe | ffff | ffff | ffff | ffff |
| 0001160 | ffff | ffff | ffff | ffff | ffff | ffff | feff | fefe |
| 0001200 | 0202 | 0202 | 0101 | 0101 | 0000 | 0000 | 0000 | 0000 |
| 0001220 | 0000 | 0000 | 0100 | 0101 | 0101 | 0202 | 0303 | 0303 |
| 0001240 | 0404 | 0505 | 0606 | 0707 | 0908 | 0a09 | 0b0b | 0d0c |
| 0001260 | 0e0e | 100f | 1211 | 1413 | 1615 | 1817 | 1a19 | 1c1b |
| 0001300 | 1e1d | 201f | 2322 | 2524 | 2827 | 2a29 | 2d2c | 302e |
| 0001320 | 3331 | 3534 | 3837 | 3b3a | 3e3d | 4140 | 4543 | 4846 |
| 0001340 | 4b49 | 4e4c | 5150 | 5553 | 5856 | 5b5a | 5f5d | 6261 |
| 0001360 | 6664 | 6967 | 6d6b | 706e | 7472 | 7775 | 7b79 | 7e7c |
| 0001400 | 0000 | 0000 | 0000 | 0100 | 0101 | 0101 | 0202 | 0302 |
| 0001420 | 0403 | 0404 | 0505 | 0606 | 0807 | 0908 | 0a09 | 0c0b |
| 0001440 | 0d0c | 0f0e | 100f | 1211 | 1413 | 1615 | 1817 | 1a19 |
| 0001460 | 1c1b | 1e1d | 2120 | 2322 | 2624 | 2827 | 2b29 | 2d2c |
| 0001500 | 302f | 3332 | 3634 | 3937 | 3c3a | 3f3d | 4240 | 4543 |
| 0001520 | 4846 | 4b4a | 4f4d | 5250 | 5553 | 5857 | 5c5a | 5f5e |
| 0001540 | 6361 | 6664 | 6a68 | 6d6b | 716f | 7472 | 7876 | 7b79 |
| 0001560 | 7f7d | 8280 | 8684 | 8988 | 8d8b | 908f | 9492 | 9796 |
| 0001600 | 9799 | 9496 | 9092 | 8d8f | 898b | 8688 | 8284 | 7f80 |
| 0001620 | 7b7d | 7879 | 7476 | 7172 | 6d6f | 6a6b | 6668 | 6364 |
| 0001640 | 5f61 | 5c5e | 585a | 5557 | 5253 | 4f50 | 4b4d | 484a |
| 0001660 | 4546 | 4243 | 3f40 | 3c3d | 393a | 3637 | 3334 | 3032 |
| 0001700 | 2d2f | 2b2c | 2829 | 2627 | 2324 | 2122 | 1e20 | 1c1d |
| 0001720 | 1a1b | 1819 | 1617 | 1415 | 1213 | 1011 | 0f0f | 0d0e |
| 0001740 | 0c0c | 0a0b | 0909 | 0808 | 0607 | 0506 | 0405 | 0404 |
| 0001760 | 0303 | 0202 | 0102 | 0101 | 0101 | 0000 | 0000 | 0000 |
| 0002000 | | | | | | | | |

While there has been described the preferred embodiment of the invention, it will be understood by those skilled in the art that numerous modifications may be without departing from the true spirit of the invention. It is therefore intended by the appended claims to define the true spirit and scope of the invention.

What is claimed is:

1. A system for correcting timing errors in a video signal which includes colorburst signals and horizontal lines, and which is passed through an analog-to-digital convertor operating generally in synchronism with the video signal and through a digital-to-analog convertor operating in general synchronism with a stable reference signal, comprising:

means receiving said video signal for generating a first clock signal that is generally synchronized with the color burst of the incoming video signal;

phase error measurement means responsive to digital values from the analog-to-digital convertor for measuring digitally during the color burst signal any phase error between the video signal and the first clock signal of said analog-to-digital convertor, and for supplying digital phase error values indicative of the magnitude of any error;

first digital phase error correction means responsive to said phase error measurement means and to said generating means, for digitally providing said first clock signal whose phase is adjusted during the color burst signal in response to the magnitude of said phase error values, to sample the video signal in phase with the color burst signal;

phase error storage means for storing and supplying a plurality of said phase error values during respective horizontal lines of the video signal; and second digital phase error correction means responsive to said phase error storage means for digitally supplying to said digital-to-analog convertor a second clock signal in phase with said stable reference signal at the start of each horizontal line, said second clock signal being shifted in phase relative to said stable reference signal during the line in response to said phase error values.

2. A system in accordance with claim 1 wherein the generating means comprises:

phase error digital-to-analog conversion means responsive to said phase error values for producing an analog phase error signal indicative of said phase error values;

analog phase-locked oscillator means receiving the incoming video signal for producing a first signal approximately phase synchronized with said video signal; and analog phase shifting means connecting to said analog phase-locked oscillator means and accepting said first signal for providing said first clock signal whose phase, with respect to said first signal, is adjusted in response to said analog phase error signal.

3. A system in accordance with claim 2 wherein the phase error digital-to-analog conversion means includes filtering means for filtering the analog phase error signal to slow its response to changes in the magnitude of said phase error values.

4. A system in accordance with claim 1 wherein the analog-to-digital convertor produces multiple digital samples of the incoming video during each color subcarrier cycle interval, and wherein the phase error measurement means comprises:

first selection and summing means for selecting every other of said digital samples, alternatingly adding and subtracting the selected samples into a first accumulated sum;

second selection and summing means for selecting the remaining digital samples not selected by said first selection means, alternatingly adding and subtracting the selected samples into a second accumulated sum; and phase error computation means for computing the phase error value as the arcsin or arccosine of the ratio of said accumulated sums.

5. A system in accordance with claim 4 wherein the phase error computation means comprises a read-only memory for receiving said accumulated sums as address values and for supplying the properly-scaled phase error value.

6. A system in accordance with claim 4 which further includes scaling means interposed between said first and second selection and summing means and said analog-to-digital conversion means for scaling the incoming samples during the color burst interval to increase the magnitude of samples towards the middle of the color burst interval and to decrease the magnitude of samples towards the start and end of the color burst interval.

7. A system in accordance with claim 1 wherein the first phase error correction means comprises:
- a phase shift register containing a digital phase shift value;
- means for presenting said first clock signal four times during each cycle of said color burst signals as first digital values whose magnitude indicates phase angles of zero, ninety, one-hundred-eighty, and two-hundred-seventy degrees;
- phase summing means for digitally computing the sum of the first digital values and the phase shift value presented by said phase shift register, to provide the sum as a phase shifted first digital value;
- trigonometric means for computing the sine or cosine of said phase shifted first digital value to provide the result as a digitized first sine wave; and
- digital-to-analog conversion means for producing said phase error correction signal from said digitized first sine wave.

8. A system in accordance with claim 7 to which is added:
- frequency accumulator means for summing a proportion of each phase error value; and
- means for adding the contents of the frequency accumulator means to said phase shift register at regular intervals to compensate for progressive frequency errors in the phase error correction signal.

9. A system in accordance with claim 8 wherein the frequency accumulator means comprises:
- a frequency accumulator register;
- an arithmetic unit having two inputs the first of which connects to said frequency accumulator register, said arithmetic unit also having an output connected to said frequency accumulator register; and
- a read only memory having address inputs connecting to said phase error value and having a data output connecting to the second input of said arithmetic unit, said read only memory containing data such that it scales the phase error values properly before the values are added into said frequency accumulator register.

10. A system in accordance with claim 1 wherein the second phase error correction means comprises:
- a phase shift register containing a digital phase shift value;
- resetting means for resetting said phase shift register to zero at the start of each horizontal line scanning interval;
- computational means responsive to the receipt of the phase error values from said phase error storage means for incrementing or decrementing the digital phase shift value in said phase shift register at periodic intervals;
- means for presenting said stable reference signal multiple times to provide reference digital values whose magnitudes indicates phase angles of zero, ninety, one-hundred-eight, and two-hundred-seventy degrees;
- phase summing means for digitally computing the sum of the reference digital values and the phase shaft value presented by said phase shift register, presenting the sum as a phase shifted digital reference value;
- trigonometric means for computing the sine or cosine of said phase shifted digital reference value to provide a digitized sine wave representative of said second clock signal; and
- digital-to-analog conversion means for producing said corrected video signal in response to said second clock signal.

11. A system for correcting timing errors in a video signal comprising:
- an analog-to-digital convertor for sampling the video signal at selected sample times;
- phase error measurement means connected to the analog-to-digital convertor for measuring phase errors in the selected sample times of said analog-to-digital convertor during the color burst interval;
- phase error correction means responsive to said phase error measurement means for correcting the phase errors in the selected sample times of said analog-to-digital convertor commensurate with said phase error measurements;
- frequency error measurement means connected to the phase error measurement means for computing frequency errors in the selected sample times of said analog-to-digital convertor during a line following the respective color burst interval; and
- frequency error correction means responsive to said frequency error measurement means for correcting the frequency errors in the selected sample times of said analog-to-digital convertor commensurate with said frequency error measurements.

12. A system in accordance with claim 11 including:
- a digital-to-analog convertor for receiving lines of the video signal after said analog-to-digital convertor;
- phase error storage means responsive to said phase error measurement means for storing a plurality of values of said phase errors;
- second phase error correction means responsive to said phase error storage means for smoothly shifting the phase of operation of said digital-to-analog convertor commensurate with the phase error values over the duration of a line of video, to compensate for residual progressive velocity errors.

13. A system in accordance with claim 12 wherein said second phase error correction means accepts plural phase error values from said phase error storage means and includes computational means for computing therefrom a rate of phase displacement over each line that causes the rate of phase change to vary relatively smoothly from one line to the next.

14. A system for correcting video signal timing errors and for otherwise processing a video signal including color burst components and horizontal lines of video information, comprising:
- clock means for generating a sampling clock signal;
- video signal sampling means responsive to said clock means for sampling said video signal at times indicated by said clock signal;

video signal processing means for processing the samples provided by said video signal sampling means in ways that combine corresponding information taken from different horizontal lines;

detecting means responsive to the sampled color burst component occurring between consecutive lines of the video signal for detecting the phase of the sampled color burst component relative to the sampling clock signal;

first means responsive to the detecting means for adjusting the phase of the sampling clock signal in response to the detected phase of said sampled color burst component prior to sampling the video information following said sampled color burst component; and second means responsive to the detecting means for adjusting the phase of the sampling clock signal by an amount proportional to the phase detected by said detecting means during a horizontal line, to compensate for progressive frequency errors in the video signal during the line.

15. A system in accordance with claim 14 wherein the video signal is interlaced and provides color phase shifts between some interlaces, and wherein said signal processing means performs processing steps that correct for any error in interlace alteration or color phase error or both as is needed to correct for the presence of such errors due to variations in the speed of presentation of the video signal.

16. A system in accordance with claim 14 including:
third means connecting to said video signal for altering the frequency and phase of said sampling clock signal gradually over the time duration of plural horizontal lines to drive the frequency and phase of said clock means into coincidence with the frequency and phase of the color burst component.

17. A system in accordance with claim 16 wherein said second means includes limiting means preventing the amount used to adjust the sampling clock signal phase from exceeding a predetermined limiting value.

18. A system in accordance with claim 14 which further includes:
stable clock means for generating a stable clock signal;
second video signal sampling means for converting the signal presented by said video signal processing means at times indicated by a second sampling clock signal;
signal phase shifting means coupled to said second video signal sampling means for progressively shifting the phase of said second sampling clock signal relative to said stable clock signal during the horizontal line; and
phase processing means responsive to said detecting means for shifting the phase of said second sampling clock signal in accordance with phase errors generated in the video signal by the video signal possessing means.

19. A system in accordance with claim 18 wherein the phase processing means combines phase values from at least some of the same lines from which corresponding information is taken by said video signal processing means.

20. A system for adjusting the phase of a clock signal used to sample a video signal to compensate for timing errors in the video signal, said video signal including horizontal lines of video information and a color burst synchronizing component between consecutive horizontal lines of video information, comprising;
means responsive to the clock signal for sampling each color burst synchronizing component;
means responsive to the sampled color burst synchronizing component occurring between consecutive horizontal lines of video for detecting the phase of the sampled color burst synchronizing component relative to the phase of the clock signal;
first means responsive to the detecting means for adjusting the phase of the clock signal to the detected phase of said sampled color burst synchronizing component prior to sampling the video information following said sampled color burst synchronizing component; and
second means responsive to the detecting means for adjusting the phase of the clock signal in accordance with the detected phase of the sampled color burst synchronized component, to progressively change the phase of the sampling clock signal during sampling of the video information following said sampled color burst synchronizing component.

21. A system for correcting timing errors in a video signal including horizontal lines of video information and a color burst synchronizing component between consecutive horizontal lines of video information, comprising:
clock means for generating a clock signal;
sampling means responsive to said clock signal for sampling said video signal at times determined by said clock signal;
processing means for processing the samples provided by said sampling means;
detecting means responsive to the sampled color burst synchronizing component occurring between consecutive horizontal lines of video information for detecting the phase of the sampled color burst synchronizing component relative to the phase of the clock signal;
first means responsive to the detecting means for adjusting the phase of the clock signal to the detected phase of said sampled color burst synchronizing component prior to sampling the video information following said sampled color burst synchronizing component;
second means responsive to the detecting means for adjusting the phase of the clock signal in accordance with the detected phase of the sampled color burst synchronizing component, to progressively change the phase of the clock signal during sampling of the video information following said sampled color burst synchronizing component; and
third means coupled to the processing means for receiving video information therefrom and responsive to the detecting means for adjusting the phase of said received video information in accordance with the detected phase of the sampled color burst synchronizing component, to progressively change the phase of the video information occurring prior to said sampled color burst synchronizing component.

22. A system for correcting timing errors in a video signal having horizontal lines of video information, wherein the video information is processed in accordance with a transfer function that may be varied, and wherein said system corrects said timing errors in response to an error correction signal derived from said video signal, comprising:
- means for detecting the occurrence of a variation in the transfer function according to which the video information is processed;
- means for processing the error correction signal in accordance with a selectable transfer function; and
- means responsive to said occurrence for adjusting the transfer function of said processing means to correspond to the transfer function of the video information processing.

23. A system for correcting timing errors and otherwise processing a video signal, including color burst components and horizontal lines of video information, comprising:
- phase sensing means for sensing timing errors in the burst components and presenting phase error information indicating the magnitude of the timing errors;
- first processing means for performing selected modes of video signal processing on said video signal;
- second processing means for performing selected modes of phase error signal processing on said phase error information;
- altering means for altering the mode of processing that is performed by said first and second processing means such that processing steps performed on said phase error information by said second processing means during horizontal lines of video information are similar to those performed by said first processing means on said video signal; and
- signal converting means responsive to the phase error information from said second processing means for clocking the video signal processed by said first processing means in a manner that corrects the timing errors in the video signal during the horizontal lines.

24. A system in accordance with claim 23 wherein the second processing means combines phase information taken from at least some of the same horizontal lines from which corresponding elements of data are combined by said first processing means.

25. A system for correcting timing errors in a video signal including horizontal lines of video information and a color burst synchronizing component between consecutive horizontal lines of video information, comprising:
- clock means for generating a clock signal;
- sampling means responsive to said clock signal for sampling said video signal at times determined by said clock signal;
- first processing means for processing the samples provided by said sampling means in accordance with a transfer function that may be varied;
- detecting means responsive to the sampled color burst synchronizing component occurring between consecutive horizontal lines of video information for detecting the phase of the sampled color burst synchronizing component relative to the phase of the clock signal and generating a corresponding error correction signal;
- second processing means for processing the error correction signal in accordance with a selectable transfer function;
- first means responsive to the detecting means for adjusting the phase of the clock signal to the detected phase of said sampled color burst synchronizing component prior to sampling the video information following said sampled color burst synchronizing component;
- second means responsive to the detecting means for adjusting the phase of the clock signal in accordance with the detected phase of the sampled color burst synchronizing component, to progressively change the phase of the clock signal during sampling of the video information following said sampled color burst synchronizing component;
- third means coupled to the first processing means for receiving video information therefrom and responsive to the second processing means for adjusting the phase of said received video information in accordance with the detected phase of the sampled color burst synchronizing component, to progressively change the phase of the video information occurring prior to said sampled color burst synchronizing component;
- means for detecting the occurrence of a variation in the transfer function according to which said video information is processed by said first processing means; and
- means responsive to said detected occurrence for adjusting the transfer function of said second processing means to correspond to the transfer function of the video information processing.

* * * * *